(12) United States Patent
Charlton et al.

(10) Patent No.: US 9,715,286 B2
(45) Date of Patent: Jul. 25, 2017

(54) HAND-CONTROLLABLE SIGNAL-GENERATING DEVICES AND SYSTEMS

(71) Applicants: Eric J. Charlton, Cary, NC (US); William Wheeler, Cary, NC (US)

(72) Inventors: Eric J. Charlton, Cary, NC (US); William Wheeler, Cary, NC (US)

(73) Assignee: SOLID ART LABS, INC., Acton, MA (US)

( * ) Notice: Subject to any disclaimer, the term of this patent is extended or adjusted under 35 U.S.C. 154(b) by 317 days.

(21) Appl. No.: 14/166,439

(22) Filed: Jan. 28, 2014

(65) Prior Publication Data

US 2015/0212599 A1    Jul. 30, 2015

(51) Int. Cl.
*G06F 3/0354* (2013.01)
*G06F 3/0338* (2013.01)
*G06F 3/02* (2006.01)

(52) U.S. Cl.
CPC ........ *G06F 3/03543* (2013.01); *G06F 3/0219* (2013.01); *G06F 3/0338* (2013.01); *G06F 2203/0332* (2013.01)

(58) Field of Classification Search
CPC ... G06F 3/033; G06F 3/03541; G06F 3/03543
See application file for complete search history.

(56) References Cited

U.S. PATENT DOCUMENTS 2,369,807 A    2/1945 Solon
4,244,659 A    1/1981 Malt
(Continued)

FOREIGN PATENT DOCUMENTS

DE    29723047 U1    6/1998
GB    1016993 A    1/1966
(Continued)

OTHER PUBLICATIONS

PCT US2015/013151, by Eric J. Charlton and William Wheeler, "Hand-Controllable Signal-Generating Devices and Systems," Published As WO2015/116605A1, Claiming Priority to U.S. Appl. No. 14/166,439: International Search Report and Written Opinion Published on Apr. 20, 2015 (8 pages).
(Continued)

*Primary Examiner* — Ilana Spar
*Assistant Examiner* — Mihir K Rayan
(74) *Attorney, Agent, or Firm* — Jay M. Brown

(57) ABSTRACT

Apparatus including: hand-controllable signal-generating device that includes body having top side, and bottom side spaced apart from and facing away from top side, bottom side being configured for facilitating displacements of body over working surface in two-dimensional directions, body having biaxial-displacement detector configured for generating biaxial displacement signals representative of displacements of body in two-dimensional directions; and signal transmitter configured for communicating biaxial displacement signals to external electronic processor. Body has palm rest on top side; palm rest includes palm contact surface having contour for receiving portion of palm of person's hand into contact at position on palm contact surface. Contour of palm contact surface is configured for facilitating control by portion of palm of person's hand, being in contact at position on palm contact surface, of displacements of body in two-dimensional directions over working surface. System including digit-controllable signal generating device and hand-controllable signal generating device. Related processes.

25 Claims, 22 Drawing Sheets

(56) References Cited

U.S. PATENT DOCUMENTS

| | | |
|---|---|---|
| 4,414,537 A | 11/1983 | Grimes |
| 4,517,424 A | 5/1985 | Kroczynski |
| 4,528,428 A | 7/1985 | Gotoh et al. |
| 4,560,844 A | 12/1985 | Takamura et al. |
| 4,597,681 A | 7/1986 | Hodges |
| 4,735,520 A | 4/1988 | Suzuki et al. |
| RE32,977 E | 7/1989 | Gotoh et al. |
| 4,849,732 A | 7/1989 | Dolenc |
| 4,876,415 A | 10/1989 | Clancy |
| 4,913,573 A | 4/1990 | Retter |
| 4,917,516 A | 4/1990 | Retter |
| 5,034,574 A | 7/1991 | Martovitz |
| 5,178,477 A | 1/1993 | Gambaro |
| 5,260,696 A * | 11/1993 | Maynard, Jr. ....... G06F 3/03543 345/157 |
| 5,302,040 A | 4/1994 | Louis |
| 5,311,210 A | 5/1994 | O'Brien et al. |
| 5,313,229 A * | 5/1994 | Gilligan ............ G06F 3/0312 345/157 |
| 5,372,441 A | 12/1994 | Louis |
| 5,446,481 A | 8/1995 | Gillick et al. |
| 5,457,480 A | 10/1995 | White |
| 5,481,263 A | 1/1996 | Choi |
| 5,490,037 A | 2/1996 | Clancy |
| 5,503,484 A | 4/1996 | Louis |
| 5,581,484 A | 12/1996 | Prince |
| 5,583,497 A | 12/1996 | Hankes |
| 5,610,602 A | 3/1997 | Hargreaves |
| 5,661,505 A | 8/1997 | Livits |
| 5,673,040 A | 9/1997 | Hargreaves et al. |
| 5,689,253 A | 11/1997 | Hargreaves et al. |
| 5,706,031 A | 1/1998 | Brendzel et al. |
| 5,731,808 A | 3/1998 | Gaither |
| 5,735,619 A | 4/1998 | Myint |
| 5,764,164 A | 6/1998 | Cartabiano et al. |
| 5,781,127 A | 7/1998 | Kleve |
| 5,796,354 A | 8/1998 | Cartabiano et al. |
| 5,913,497 A * | 6/1999 | Myers ............... A47B 21/0371 248/118.5 |
| 5,936,555 A | 8/1999 | Zagnoev |
| 5,949,406 A | 9/1999 | Kress |
| 5,971,636 A | 10/1999 | Mensick |
| 6,005,496 A | 12/1999 | Hargreaves et al. |
| 6,059,470 A | 5/2000 | Myint |
| 6,084,575 A | 7/2000 | Oktay |
| 6,084,576 A | 7/2000 | Leu et al. |
| 6,088,022 A | 7/2000 | Rakoski |
| 6,137,479 A | 10/2000 | Olsen et al. |
| 6,154,199 A | 11/2000 | Butler |
| 6,157,370 A | 12/2000 | Kravtin et al. |
| 6,184,804 B1 | 2/2001 | Harrison |
| 6,285,356 B1 | 9/2001 | Armstrong |
| 6,292,175 B1 | 9/2001 | Sheehan et al. |
| 6,300,941 B1 | 10/2001 | Segalle |
| D453,334 S | 2/2002 | Hobday |
| 6,377,244 B1 | 4/2002 | Reid et al. |
| 6,380,923 B1 | 4/2002 | Fukumoto et al. |
| 6,396,478 B1 * | 5/2002 | Kravtin ............... G06F 3/03543 248/118.1 |
| 6,429,854 B1 | 8/2002 | McKown |
| 6,441,805 B1 | 8/2002 | Reid et al. |
| 6,509,891 B1 | 1/2003 | Sheehan et al. |
| 6,532,002 B2 | 3/2003 | Segalle |
| 6,543,947 B2 | 4/2003 | Lee |
| 6,595,424 B1 | 7/2003 | Harrison |
| 6,670,894 B2 | 12/2003 | Mehring |
| 6,696,986 B1 | 2/2004 | Harrison, Jr. et al. |
| 6,707,447 B1 | 3/2004 | Goranowski |
| 6,744,421 B2 | 6/2004 | Lilenfeld |
| 6,765,502 B2 | 7/2004 | Boldy et al. |
| 6,781,573 B1 | 8/2004 | Honma et al. |
| 6,802,662 B1 | 10/2004 | Cheng et al. |
| D502,180 S | 2/2005 | Gambaro |
| 6,850,224 B2 | 2/2005 | Baughman |
| 6,853,365 B2 | 2/2005 | Reid et al. |
| 6,854,906 B2 | 2/2005 | Mandel |
| 6,860,661 B1 | 3/2005 | Daoud |
| 7,030,861 B1 | 4/2006 | Westerman et al. |
| 7,131,781 B2 | 11/2006 | Tzeng et al. |
| 7,145,548 B2 | 12/2006 | Large |
| 7,182,533 B1 | 2/2007 | Caplan |
| 7,273,324 B2 | 9/2007 | Mercier |
| 7,295,181 B2 | 11/2007 | Alsio |
| 7,324,019 B2 | 1/2008 | Levenson |
| 7,338,224 B2 | 3/2008 | Jones et al. |
| 7,362,305 B2 | 4/2008 | Alsio et al. |
| 7,507,043 B2 | 3/2009 | Camacho et al. |
| RE40,698 E | 4/2009 | Dellinger |
| 7,688,305 B2 | 3/2010 | Nishi |
| D614,187 S | 4/2010 | Blanchard |
| 7,705,830 B2 | 4/2010 | Westerman et al. |
| D615,544 S | 5/2010 | Pascucci |
| D627,355 S | 11/2010 | Blanchard |
| 7,839,383 B2 | 11/2010 | Li et al. |
| D640,257 S | 6/2011 | Lee |
| 8,004,492 B2 | 8/2011 | Kramer et al. |
| 8,009,138 B2 | 8/2011 | Yasutake |
| 8,054,292 B1 | 11/2011 | Forde et al. |
| 8,314,772 B1 | 11/2012 | Coe |
| 8,405,615 B2 | 3/2013 | Williams |
| 8,581,845 B2 | 11/2013 | Nikfarjam et al. |
| 8,721,204 B2 | 5/2014 | Sauvage et al. |
| 2001/0048837 A1 | 12/2001 | Parkinson |
| 2002/0057258 A1 | 5/2002 | Reid et al. |
| 2002/0093486 A1 | 7/2002 | Gordon et al. |
| 2002/0126092 A1 | 9/2002 | Tiphane et al. |
| 2002/0130841 A1 | 9/2002 | Scott |
| 2003/0030625 A1 | 2/2003 | Kauk et al. |
| 2003/0043117 A1 | 3/2003 | Lantigua |
| 2003/0076296 A1 | 4/2003 | Kolybaba |
| 2003/0090394 A1 | 5/2003 | Zagnoev |
| 2003/0137491 A1 | 7/2003 | Kuo |
| 2003/0201977 A1 | 10/2003 | Hassig et al. |
| 2004/0135771 A1 | 7/2004 | Rieck |
| 2004/0178990 A1 | 9/2004 | Hsu |
| 2004/0263358 A1 | 12/2004 | Madsen et al. |
| 2005/0179655 A1 | 8/2005 | Ludwig |
| 2005/0190155 A1 | 9/2005 | Pollenz |
| 2005/0206619 A1 | 9/2005 | McLoone et al. |
| 2005/0248534 A1 | 11/2005 | Kehlstadt |
| 2006/0007151 A1 * | 1/2006 | Ram .................. G06F 3/03543 345/163 |
| 2006/0012574 A1 | 1/2006 | Kauk et al. |
| 2006/0033714 A1 | 2/2006 | Boldin |
| 2006/0113338 A1 | 6/2006 | Harrison, Jr. |
| 2006/0164392 A1 | 7/2006 | Mao |
| 2006/0274044 A1 | 12/2006 | Gikandi |
| 2006/0290674 A1 | 12/2006 | Blythe |
| 2007/0164878 A1 | 7/2007 | Baier et al. |
| 2007/0164995 A1 | 7/2007 | Pascucci |
| 2007/0176901 A1 | 8/2007 | Fujiyama |
| 2007/0211030 A1 | 9/2007 | Hong et al. |
| 2007/0222754 A1 | 9/2007 | Chen et al. |
| 2007/0258747 A1 | 11/2007 | Caplan |
| 2007/0286663 A1 | 12/2007 | Kinney |
| 2008/0024327 A1 | 1/2008 | Downs et al. |
| 2008/0143670 A1 * | 6/2008 | Vayda .................. G06F 3/0234 345/156 |
| 2008/0186279 A1 | 8/2008 | Van Dalen |
| 2008/0232891 A1 | 9/2008 | Macklin et al. |
| 2008/0303792 A1 | 12/2008 | Chung |
| 2009/0289896 A1 | 11/2009 | Jacob |
| 2009/0295726 A1 | 12/2009 | Kimura |
| 2009/0303183 A1 | 12/2009 | Chen |
| 2010/0040400 A1 | 2/2010 | Hirsch |
| 2010/0245249 A1 | 9/2010 | Ng |
| 2010/0253627 A1 | 10/2010 | Atzmon |
| 2012/0081285 A1 | 4/2012 | Atzmon |
| 2013/0069877 A1 | 3/2013 | Cha |
| 2013/0176225 A1 | 7/2013 | Chung et al. |
| 2013/0328781 A1 | 12/2013 | Pate et al. |
| 2014/0375566 A1 * | 12/2014 | Tagge ................ G06F 3/0233 345/168 |

(56) References Cited

U.S. PATENT DOCUMENTS

FOREIGN PATENT DOCUMENTS

| KR | 1020100137088 A | 12/2010 |
| MX | 20010008830 A | 3/2004 |
| WO | 0079373 A1 | 12/2000 |
| WO | 03021419 A1 | 3/2003 |
| WO | 2004025447 A2 | 3/2004 |
| WO | 2015116605 A1 | 8/2015 |

OTHER PUBLICATIONS

"King's Assembly-A Computer Mouse Full of Awesome," by Eric Charlton and Solid Art Labs, Downloaded From www.kickstarter.com on Feb. 11, 2014 (10 Pages).

Spacepilot Pro, Downloaded on Dec. 2, 2013 From http://www.3dconnexion.com/products/spacepilot-pro.html (5 Pages).

"Spacepilot Pro" Photograph, Downloaded on Dec. 2, 2013 From http://solidsmack.com/software-hardware-reviews/spacepilot-pro-3d-mouse-cad-google-earth/ (1 Page).

"Spacepilot Pro" Amazon Advertisement, Downloaded on Dec. 2, 2013 From www.amazon.com (7 Pages).

"Spacepilot Pro" Advertisement, Downloaded on Dec. 2, 2013 From www.solidsmack.com (6 Pages).

"Keymouse—The Keyboard and Mouse Re-Invented," Downloaded on Feb. 13, 2015 From https://www.kickstarter.com/projects/1666150716/keymousetm-the-keyboard-and-mouse-re-invented (26 Pages).

"Sinister: Immerse Yourself in the PC Experience," Downloaded on Feb. 5, 2014 From https://www.kickstarter.com/projects/1306431579/sinister-immerse-yourself-in-the-pc-experience (31 Pages).

"Logitech G600 MMO Gaming Mouse Review: Twenty Buttons!", Sep. 10, 2012, Downloaded From www.hardware.info (2 Pages).

"Logitech G600 MMO," Downloaded on Dec. 2, 2013 From http://gaming.logitech.com/en-us/product/g600-mmo-gaming-mouse (5 Pages).

"Razer Tartarus—Membrane Gaming Keypad," Downloaded on Dec. 2, 2013 From http://www.razerzone.com/gaming-keyboards-keypads/razer-tartarus/ (3 Pages).

"Razer Announces the $79 Tartarus . . .", Downloaded on Dec. 2, 2013 From : http://www.engadget.com/2013/08/15/razer-announces-79-tartarus-a-more-affordable-gaming-keypad/ (3 Pages).

"Razer Unleashes the Tartarus," Downloaded on Dec. 2, 2013 From http://www.blanksuniverse.ca/2013/08/razer-unleashes-tartarus.html (3 Pages).

"Razer Naga Epic . . . ," Downloaded on Dec. 2, 2013 From http://www.razerzone.com/gaming-mice/razer-naga-epic/ (5 Pages).

"Sixense Stem to Bring Modular Motion Tracking to the Masses," Sep. 12, 2013, Downloaded From http://www.ign.com/articles/2013/09/12/sixense-stem-to-bring-modular-motion-tracking-to-the-masses (3 Pages).

"Stem System," Downloaded on Dec. 2, 2013 From http://sixense.com/hardware/wireless (6 Pages).

"Talons: Programmable Computer Keyboard With Integrated Mouse," Aug. 24, 2013, Downloaded From http://www.kickstarter.com/projects/1624347034/talons-programmable-computer-keyboard-with-integra?ref=search (13 Pages).

"Trewgrip: Universal Handheld Keyboard and Air Mouse," Sep. 5, 2013, Downloaded From http://www.kickstarter.com/projects/trewgrip/trewgrip-mobile-qwerty-the-next-evolution-in-typin?ref=search (18 Pages).

"WASDIO—The PC Game Controller for Action Games," Jan. 1, 2013, Downloaded From http://www.kickstarter.com/projects/matterdaddy/wasdiotm-the-pc-game-controller-for-action-games?ref=search (7 Pages).

"Anatomical Terms of Motion," Downloaded on Jul. 2, 2014 From www.wikipedia.com (11 Pages).

* cited by examiner

HAND-CONTROLLABLE SIGNAL-GENERATING DEVICES AND SYSTEMS

BACKGROUND OF THE INVENTION

1. Field of the Invention

The present invention relates to the field of hand-controllable signal-generating devices and systems, and processes related to such devices and systems.

2. Background of the Invention

Numerous hand-controllable signal-generating devices, and systems including such devices, have been developed. As examples, such hand-controllable signal-generating devices include various "mouse" devices that may be utilized for controlling a cursor on a graphical user interface. Despite the existence of these and other devices, further improvements are still needed in hand-controllable signal-generating devices and systems; and in processes related to these devices and systems.

SUMMARY

In an example of an implementation, an apparatus is provided that includes a hand-controllable signal-generating device. In this example of an apparatus, the hand-controllable signal-generating device includes: a body having a top side, and having a bottom side spaced apart by a distance from and facing away from the top side, the bottom side being configured for facilitating displacements of the body over a working surface in two-dimensional directions with the bottom side facing the working surface, the body having a biaxial-displacement detector that is configured for generating biaxial displacement signals that are representative of detected displacements of the body in the two-dimensional directions over the working surface. Also in this example of an apparatus, the hand-controllable signal-generating device further includes a signal transmitter configured for communicating the biaxial displacement signals to an external electronic processor. Further in this example of an apparatus, the body has a palm rest on the top side, the palm rest including a palm contact surface, the palm contact surface having a contour for receiving a portion of a palm of a person's hand into contact at a position on the palm contact surface. Additionally in this example of an apparatus, the contour of the palm contact surface is configured for facilitating control by the portion of the palm of the person's hand, being in contact at the position on the palm contact surface, of the displacements of the body in the two-dimensional directions over the working surface.

In some examples of implementations of the apparatus, the external electronic processor may include a microprocessor.

In further examples of implementations of the apparatus: the person's hand may have one digit or a plurality of digits; and the contour of the palm contact surface of the palm rest may be configured for facilitating control by the portion of the palm of the person's hand of the displacements of the body in the two-dimensional directions over the working surface from the position on the palm contact surface, without the one digit or any of the plurality of the digits of the person's hand being in contact with the hand-controllable signal-generating device.

In additional examples of implementations of the apparatus: the person's hand may have one digit or a plurality of digits; and the contour of the palm contact surface of the palm rest may be configured for guiding the one digit or the plurality of the digits of the person's hand away from the palm contact surface simultaneously while receiving the portion of the palm of the person's hand into contact at the position on the palm contact surface.

In other examples of implementations of the apparatus: the person's hand may have one digit or a plurality of digits; and the contour of the palm contact surface of the palm rest may be configured for positioning the one digit or the plurality of the digits of the person's hand as being substantially unencumbered by the palm contact surface when the portion of the palm of the person's hand is in contact at the position on the palm contact surface.

In some examples of implementations of the apparatus: the contour of the palm contact surface of the palm rest may be configured for receiving the portion of the palm of the person's hand into contact at a substantially-fixed position on the palm contact surface. In further examples of implementations of the apparatus: the contour of the palm contact surface of the palm rest may be configured for repeatedly receiving the portion of the palm of the person's hand into contact at the substantially-fixed position on the palm contact surface.

In additional examples of implementations of the apparatus, the biaxial-displacement detector may be located at the bottom side of the body.

In other examples of implementations of the apparatus, the biaxial-displacement detector may be configured for generating the biaxial displacement signals as being cursor control signals.

In some examples of implementations of the apparatus, the biaxial-displacement detector may be configured for generating the biaxial displacement signals as being keyboard control signals or joystick control signals.

In further examples of implementations of the apparatus: the palm contact surface of the palm rest may include a mound having a peak and downwardly-sloping sides; and the portion of the palm of the person's hand may include a first part of the palm that is nearest to a wrist of the person; and the first part of the palm may be received into contact on a first portion of the downwardly-sloping sides of the mound when the portion of the palm is at the position on the palm contact surface; and the first portion of the downwardly-sloping sides of the mound may have an attached upwardly-sloping lip. In additional examples of implementations of the apparatus: the person's hand may have one digit or a plurality of digits; and the one digit or the plurality of the digits of the person's hand may include a thumb digit, and may include one non-thumb digit or a plurality of non-thumb digits; and the portion of the palm of the person's hand may include a second part of the palm that is farthest from the person's thumb digit; and the second part of the palm may be received into contact on a second portion of the downwardly-sloping sides of the mound when the portion of the palm is at the position on the palm contact surface; and the second portion of the downwardly-sloping sides of the mound may have another attached upwardly-sloping lip. In other examples of implementations of the apparatus: the palm of the person's hand may include another portion being nearest to the person's thumb digit; and the palm contact surface may be shaped for guiding the another portion of the palm away from the palm contact surface simultaneously while receiving the portion of the palm of the person's hand into contact at the position on the palm contact surface. In some examples of implementations of the apparatus: the palm of the person's hand may include an additional portion being nearest to the one non-thumb digit or to the plurality of the non-thumb digits of the person's hand; and the palm contact surface may be shaped for guiding the additional portion of the palm away from the palm contact surface simultaneously while receiving the portion of the palm of the person's hand into contact at the position on the palm contact surface.

In some examples of implementations of the apparatus, the palm contact surface of the palm rest may have a perimeter, and the position may be defined by the perimeter of the palm contact surface.

In further examples of implementations of the apparatus, the palm rest may be adjustably mounted on the top side of the body.

In additional examples of implementations of the apparatus, the palm rest may be pivotally mounted over the top side of the body. In other examples of implementations, the apparatus may include a joystick on the top side of the body, and the palm rest may be mounted on the joystick. In some examples of implementations of the apparatus: the joystick may include an angular-displacement detector; and the angular-displacement detector may be configured for generating angular-displacement signals that are representative of detected angular displacements of the palm rest over the top side of the body; and the signal transmitter may be configured for communicating the angular-displacement signals to the external electronic processor. In further examples of implementations of the apparatus: the joystick may include a compressive force detector; and the compressive force detector may be configured for generating compressive force signals that are representative of detected compressive forces applied by the palm of the person's hand to the palm rest towards the top side of the body; and the signal transmitter may be configured for communicating the compressive force signals to the external electronic processor.

In additional examples of implementations, the apparatus may include a rotational-displacement detector being configured for generating rotational displacement signals that are representative of detected rotational displacements of the body in the two-dimensional directions over the working surface, and the signal transmitter may be configured for communicating the rotational displacement signals to the external electronic processor. In other examples of implementations of the apparatus, the rotational-displacement detector may include a gyroscope, accelerometer, or compass.

In some examples of implementations of the apparatus, the biaxial-displacement detector may be located at the bottom side of the body, and the apparatus may further include a rotational-displacement detector being configured for generating rotational displacement signals that are representative of detected rotational displacements of the body in the two-dimensional directions over the working surface, and the signal transmitter may be configured for communicating the rotational displacement signals to the external electronic processor. In further examples of implementations of the apparatus, the rotational-displacement detector may include an additional biaxial-displacement detector that may be spaced apart from the biaxial-displacement detector.

In an example of another implementation, a system is provided that includes: a digit-controllable signal-generating device for generating digit signals; and a hand-controllable signal-generating device. The hand-controllable signal-generating device includes a body having a top side, and has a bottom side spaced apart by a distance from and facing away from the top side, the bottom side being configured for facilitating displacements of the body over a working surface in two-dimensional directions with the bottom side facing the working surface, the body having a biaxial-displacement detector that is configured for generating biaxial displacement signals that are representative of detected displacements of the body in the two-dimensional directions over the working surface. The system further includes a signal transmitter configured for communicating the biaxial displacement signals and the digit signals to an external electronic processor. In the hand-controllable signal-generating device, the body has a palm rest on the top side, the palm rest including a palm contact surface, the palm contact surface having a contour for receiving a portion of a palm of a person's hand into contact at a position on the palm contact surface. Additionally, the contour of the palm contact surface is configured for facilitating control of the digit-controllable signal-generating device for generating digit signals by the person's hand simultaneously with control of displacements of the body in the two-dimensional directions by the portion of the palm being at the position on the palm contact surface.

In some examples of implementations of the system, the external electronic processor may include a microprocessor.

In further examples of implementations of the system, the digit-controllable signal-generating device may include a keyboard having a plurality of digit-controllable keys. In additional examples of implementations of the system, the plurality of the digit-controllable keys may be arranged in a plurality of rows. In other examples of implementations of the system, the plurality of the rows of the digit-controllable keys may be arranged in a concave arc configured for placing each one of the plurality of the digit-controllable keys in a position suitable for being controlled by the one digit or by a one of the plurality of the digits of the person's hand simultaneously with the portion of the palm of the person's hand being in contact at the position on the palm contact surface.

In some examples of implementations of the system, the digit-controllable signal-generating device may include a thumb-controllable joystick. In further examples of implementations of the system, the digit-controllable signal-generating device may include a digit-controllable key located adjacent to the thumb-controllable joystick.

In additional examples of implementations, the system may include an integral housing for the digit-controllable signal-generating device and the hand-controllable signal-generating device.

In other examples of implementations of the system, the palm rest may be adjustably mounted on the top side of the body of the hand-controllable signal-generating device.

In some examples of implementations of the system: the person's hand may have one digit or a plurality of digits; and the contour of the palm contact surface of the palm rest may be configured for facilitating control by the portion of the palm of the person's hand of the displacements of the body in the two-dimensional directions over the working surface from the position on the palm contact surface without the one digit or any of the plurality of the digits of the person's hand being in contact with the hand-controllable signal-generating device.

In further examples of implementations of the system: the person's hand may have one digit or a plurality of digits; and the contour of the palm contact surface of the palm rest may be configured for guiding the one digit or the plurality of the digits of the person's hand away from the palm contact surface simultaneously while receiving the portion of the palm of the person's hand into contact at the position on the palm contact surface.

In additional examples of implementations of the system: the person's hand may have one digit or a plurality of digits;

and the contour of the palm contact surface of the palm rest may be configured for positioning the one digit or the plurality of the digits of the person's hand as being substantially unencumbered by the palm contact surface when the portion of the palm of the person's hand is in contact at the position on the palm contact surface.

In other examples of implementations of the system, the contour of the palm contact surface of the palm rest may be configured for receiving the portion of the palm of the person's hand into contact at a substantially-fixed position on the palm contact surface. In some examples of implementations of the system, the contour of the palm contact surface of the palm rest may be configured for repeatedly receiving the portion of the palm of the person's hand into contact at the substantially-fixed position on the palm contact surface.

In further examples of implementations of the system, the biaxial-displacement detector may be located at the bottom side of the body.

In additional examples of implementations of the system, the biaxial-displacement detector may be configured for generating the biaxial displacement signals as being cursor control signals.

In other examples of implementations of the system, the biaxial-displacement detector may be configured for generating the biaxial displacement signals as being keyboard control signals or joystick control signals.

In some examples of implementations of the system: the palm contact surface of the palm rest may include a mound having a peak and downwardly-sloping sides; and the portion of the palm of the person's hand may include a first part of the palm that is nearest to a wrist of the person; and the first part of the palm may be received into contact on a first portion of the downwardly-sloping sides of the mound when the portion of the palm is at the position on the palm contact surface; and the first portion of the downwardly-sloping sides of the mound may have an attached upwardly-sloping lip. In further examples of implementations of the system: the person's hand may have one digit or a plurality of digits; and the one digit or the plurality of the digits of the person's hand may include a thumb digit, and may include one non-thumb digit or a plurality of non-thumb digits; and the portion of the palm of the person's hand may include a second part of the palm that is farthest from the person's thumb digit; and the second part of the palm may be received into contact on a second portion of the downwardly-sloping sides of the mound when the portion of the palm is at the position on the palm contact surface; and the second portion of the downwardly-sloping sides of the mound may have another attached upwardly-sloping lip. In additional examples of implementations of the system: the palm of the person's hand may include another portion being nearest to the person's thumb digit, and the palm contact surface may be shaped for guiding the another portion of the palm away from the palm contact surface simultaneously while receiving the portion of the palm of the person's hand into contact at the position on the palm contact surface. In other examples of implementations of the system: the palm of the person's hand may include an additional portion being nearest to the one non-thumb digit or to the plurality of the non-thumb digits of the person's hand, and the palm contact surface may be shaped for guiding the additional portion of the palm away from the palm contact surface simultaneously while receiving the portion of the palm of the person's hand into contact at the position on the palm contact surface.

In some examples of implementations of the system, the palm contact surface of the palm rest may have a perimeter, and the position may be defined by the perimeter of the palm contact surface.

In some examples of implementations of the system, the palm rest may be adjustably mounted on the top side of the body of the hand-controllable signal-generating device.

In further examples of implementations of the system, the palm rest may be pivotally mounted over the top side of the body. In additional examples of implementations of the system: the hand-controllable signal-generating device may include a joystick on the top side of the body; and the palm rest may be mounted on the joystick. In other examples of implementations of the system: the joystick may include an angular-displacement detector; the angular-displacement detector may be configured for generating angular-displacement signals that are representative of detected angular displacements of the palm rest over the top side of the body; and the signal transmitter may be configured for communicating the angular-displacement signals to the external electronic processor. In some examples of implementations of the system: the joystick may include a compressive force detector; and the compressive force detector may be configured for generating compressive force signals that are representative of detected compressive forces applied by the palm of the person's hand to the palm rest towards the top side of the body; and the signal transmitter may be configured for communicating the compressive force signals to the external electronic processor.

In further examples of implementations, the system may include a rotational-displacement detector being configured for generating rotational-displacement signals that are representative of detected rotational displacements of the body in the two-dimensional directions over the working surface, and the signal transmitter may be configured for communicating the rotational-displacement signals to the external electronic processor. In additional examples of implementations of the system, the rotational-displacement detector may include a gyroscope, accelerometer, or compass.

In other examples of implementations of the system: the biaxial-displacement detector may be located at the bottom side of the body; and the system may include a rotational-displacement detector being configured for generating rotational-displacement signals that are representative of detected rotational displacements of the body in the two-dimensional directions over the working surface; and the signal transmitter may be configured for communicating the rotational-displacement signals to the external electronic processor. In some examples of implementations of the system: the rotational-displacement detector may include an additional biaxial-displacement detector that may be spaced apart from the biaxial-displacement detector.

In further examples of implementations, the system may include another digit-controllable signal-generating device for generating additional digit signals; and another hand-controllable signal-generating device. The another hand-controllable signal-generating device may include: another body having another top side, and having another bottom side spaced apart by another distance from and facing away from the another top side, the another bottom side being configured for facilitating displacements of the another body over the working surface in two-dimensional directions with the another bottom side facing the working surface, the another body having another biaxial-displacement detector that may be configured for generating additional biaxial displacement signals that are representative of detected displacements of the another body in the two-dimensional directions over the working surface. The system may further include another signal transmitter configured for communicating the additional biaxial displacement signals and the additional digit signals to the external electronic processor. Further, the another body may have another palm rest on the another top side, and the another palm rest may include another palm contact surface, the another palm contact surface having another contour for receiving a further portion of another palm of a person's another hand into contact at another position on the another palm contact surface. In addition, the contour of the another palm contact surface may be configured for facilitating control of the another digit-controllable signal-generating device for generating digit signals by the person's another hand simultaneously with control of displacements of the another body in the two-dimensional directions by the further portion of the another palm being at the another position on the another palm contact surface.

In additional examples of implementations of the system, the another digit-controllable signal-generating device may include another keyboard having another plurality of digit-controllable keys.

In other examples of implementations of the system, the another digit-controllable signal-generating device may include another thumb-controllable joystick.

In some examples of implementations, the system may include a sensitivity modulator for the biaxial-displacement detector.

In an example of an additional implementation, a process is provided that includes providing a hand-controllable signal-generating device including a body having a top side, a palm rest being on the top side, the palm rest including a palm contact surface, the palm contact surface having a contour for receiving a portion of a palm of a person's hand into contact at a position on the palm contact surface, the body having a bottom side spaced apart by a distance from and facing away from the top side, the bottom side being configured for facilitating displacements of the body over a working surface in two-dimensional directions, the body having a biaxial-displacement detector that is configured for generating biaxial displacement signals that are representative of detected displacements of the body in the two-dimensional directions over the working surface; and providing a signal transmitter configured for communicating the biaxial displacement signals to an external electronic processor. This example of a process further includes facilitating the generation, by a portion of a palm of a person's hand being in contact at the position on the palm contact surface, of biaxial displacement signals for communication to the external electronic processor, by facilitating control by the portion of the palm of the displacements of the body in the two-dimensional directions over the working surface.

In some examples of implementations, this process may further include: placing the portion of the palm of the person's hand in contact at the position on the palm contact surface; causing the portion of the palm to generate biaxial displacement signals by controlling displacements of the body in the two-dimensional directions; and causing the signal transmitter to communicate the biaxial displacement signals to the external electronic processor.

In further examples of implementations of this process, the facilitating the generation of the biaxial displacement signals may include facilitating control by the portion of the palm of the displacements of the body in the two-dimensional directions from the position on the palm contact surface without a one digit or any of a plurality of digits of the person's hand being in contact with the hand-controllable signal-generating device.

In additional examples of implementations of this process, the facilitating the generation by the portion of the palm of the biaxial displacement signals may include configuring the palm contact surface for guiding a one digit or a plurality of digits of the person's hand away from the palm contact surface simultaneously while receiving the portion of the palm into contact at the position on the palm contact surface.

In further examples of implementations of this process, the facilitating the generation by the portion of the palm of the biaxial displacement signals may include configuring the palm contact surface for positioning a one digit or a plurality of digits of the person's hand as being substantially unencumbered by the palm contact surface when the portion of the palm is in contact at the position on the palm contact surface.

In other examples of implementations of this process, the facilitating the generation by the portion of the palm of the biaxial displacement signals may include configuring the palm contact surface for receiving the portion of the palm into contact at a substantially-fixed position on the palm contact surface.

In some examples of implementations of this process, the facilitating the generation by the portion of the palm of the biaxial displacement signals may include facilitating generation of the biaxial-displacement signals as being cursor control signals.

In further examples of implementations of this process, the facilitating the generation by the portion of the palm of the biaxial displacement signals may include facilitating generation of the biaxial-displacement signals as being keyboard control signals or joystick control signals.

In additional examples of implementations: the providing the hand-controllable signal-generating device may include providing the palm rest as being mounted on a joystick that may include an angular-displacement detector; and the process may include facilitating the generation, by the portion of the palm being in contact at the position on the palm contact surface for communication to the external electronic processor, of angular displacement signals that are representative of detected angular displacements of the palm rest over the top side of the body.

In other examples of implementations of this process: the providing the hand-controllable signal-generating device may include providing the joystick as including a compressive force detector; and the process may include facilitating the generation, by the portion of the palm being in contact at the position on the palm contact surface for communication to the external electronic processor, of compressive force signals that are representative of detected compressive forces applied by the palm to the palm rest towards the top side of the body.

In some examples of implementations of this process: the providing the hand-controllable signal-generating device may include providing a rotational-displacement detector; and the process may include facilitating the generation, by the portion of the palm being in contact at the position on the palm contact surface for communication to the external electronic processor, of rotational displacement signals that are representative of detected rotational displacements of the body in the two-dimensional directions over the working surface.

In an example of a further implementation, a process is provided that includes: providing a digit-controllable signal-generating device for generating digit signals; and providing a hand-controllable signal-generating device. In this example of a process, providing the hand-controllable signal-generating device includes providing: a body having a top side, a palm rest being on the top side, the palm rest including a palm contact surface, the palm contact surface having a contour for receiving a portion of a palm of a person's hand into contact at a position on the palm contact surface, the body having a bottom side spaced apart by a distance from and facing away from the top side, the bottom side being configured for facilitating displacements of the body over a working surface in two-dimensional directions, the body having a biaxial-displacement detector that is configured for generating biaxial displacement signals that are representative of detected displacements of the body in the two-dimensional directions over the working surface. This example of a process additionally includes providing a signal transmitter configured for communicating the biaxial displacement signals and the digit signals to an external electronic processor. This example of a process further includes facilitating the generation, by a portion of a palm of a person's hand being in contact at the position on the palm contact surface, of biaxial displacement signals for communication to the external electronic processor, by facilitating control by the palm of the portion of the displacements of the body in the two-dimensional directions over the working surface; and facilitating the generation of digit signals by control of the digit-controllable signal-generating device by the person's hand.

In some examples of implementations, this process may further include: placing the portion of the palm of the person's hand in contact at the position on the palm contact surface; causing the portion of the palm to generate biaxial displacement signals by controlling displacements of the body in the two-dimensional directions, and causing the person's hand to generate digit signals by control of the digit-controllable signal-generating device; and causing the signal transmitter to communicate the biaxial displacement signals and the digit signals to the external electronic processor.

In further examples of implementations of this process: the providing the digit-controllable signal-generating device may include providing a keyboard having a plurality of digit-controllable keys; and the facilitating the generation of the biaxial displacement signals and of the digit signals may include facilitating the simultaneous generation of the biaxial displacement signals by the portion of the palm, and of the digit signals by the person's hand.

In additional examples of implementations of this process: the providing the digit-controllable signal-generating device may include providing a thumb-controllable joystick; and the facilitating the generation of the biaxial displacement signals and of the digit signals may include facilitating the simultaneous generation of the biaxial displacement signals by the portion of the palm, and of the digit signals by the person's hand.

In other examples of implementations of this process, the facilitating the generation by the portion of the palm of the biaxial displacement signals may include facilitating control by the portion of the palm of the displacements of the body in the two-dimensional directions from the position on the palm contact surface, without a one digit or any of a plurality of digits of the person's hand being in contact with the hand-controllable signal-generating device.

In some examples of implementations of this process, the facilitating the generation by the portion of the palm of the biaxial displacement signals may include configuring the palm contact surface for guiding a one digit or a plurality of digits of the person's hand away from the palm contact surface simultaneously while receiving the portion of the palm into contact at the position on the palm contact surface.

In additional examples of implementations of this process, the facilitating the generation by the portion of the palm of the biaxial displacement signals may include configuring the palm contact surface for positioning a one digit or a plurality of digits of the person's hand as being substantially unencumbered by the palm contact surface when the portion of the palm is in contact at the position on the palm contact surface.

In other examples of implementations of this process, the facilitating the generation by the portion of the palm of the biaxial displacement signals may include configuring the palm contact surface for receiving the portion of the palm into contact at a substantially-fixed position on the palm contact surface.

In some examples of implementations of this process, the facilitating the generation by the portion of the palm of the biaxial displacement signals may include facilitating the generation of the biaxial-displacement signals as being cursor control signals.

In further examples of implementations of this process, the facilitating the generation by the portion of the palm of the biaxial displacement signals may include facilitating the generation of the biaxial-displacement signals as being keyboard control signals or joystick control signals.

In additional examples of implementations of this process: the providing the hand-controllable signal-generating device may include providing the palm rest as being mounted on a joystick that may include an angular-displacement detector; and the process may include facilitating the generation, by the portion of the palm being in contact at the position on the palm contact surface for communication to the external electronic processor, of angular displacement signals that are representative of detected angular displacements of the palm rest over the top side of the body. In other examples of implementations of this process: the providing the hand-controllable signal-generating device may include providing the joystick as including a compressive force detector; and the process may include facilitating the generation, by the portion of the palm being in contact at the position on the palm contact surface for communication to the external electronic processor, of compressive force signals that are representative of detected compressive forces applied by the palm to the palm rest towards the top side of the body.

In other examples of implementations of this process: the providing the hand-controllable signal-generating device may include providing a rotational-displacement detector; and the process may include facilitating the generation, by the portion of the palm being in contact at the position on the palm contact surface for communication to the external electronic processor, of rotational displacement signals that are representative of detected rotational displacements of the body in the two-dimensional directions.

In some examples of implementations, this process may include: providing another digit-controllable signal-generating device for generating additional digit signals; and providing another hand-controllable signal-generating device. In these example of the process, providing the another hand-controllable signal-generating device may include providing another body having another top side, another palm rest being on the another top side, the another palm rest including another palm contact surface, the another palm contact surface having another contour for receiving a further portion of another palm of a person's another hand into contact at another position on the another palm contact surface, the another body having another bottom side spaced apart by another distance from and facing away from the another top side, the another bottom side being configured for facilitating additional displacements of the another body over the working surface in the two-dimensional directions, the another body having another biaxial-displacement detector that is configured for generating additional biaxial displacement signals that are representative of detected additional displacements of the another body in the two-dimensional directions over the working surface. In these examples, the process may further include providing another signal transmitter configured for communicating the additional biaxial displacement signals and the additional digit signals to the external electronic processor. These examples of the process may additionally include: facilitating the generation, by the further portion of another palm of a person's another hand being in contact at the another position on the another palm contact surface, of additional biaxial displacement signals for communication to the external electronic processor, by facilitating control by the further portion of the another palm of the additional displacements of the another body in the two-dimensional directions over the working surface; and facilitating the generation of additional digit signals by control of the another digit-controllable signal-generating device by the person's another hand.

Other devices, systems, processes, features and advantages of the invention will be or will become apparent to one with skill in the art upon examination of the following figures and detailed description. It is intended that all such additional devices, systems, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
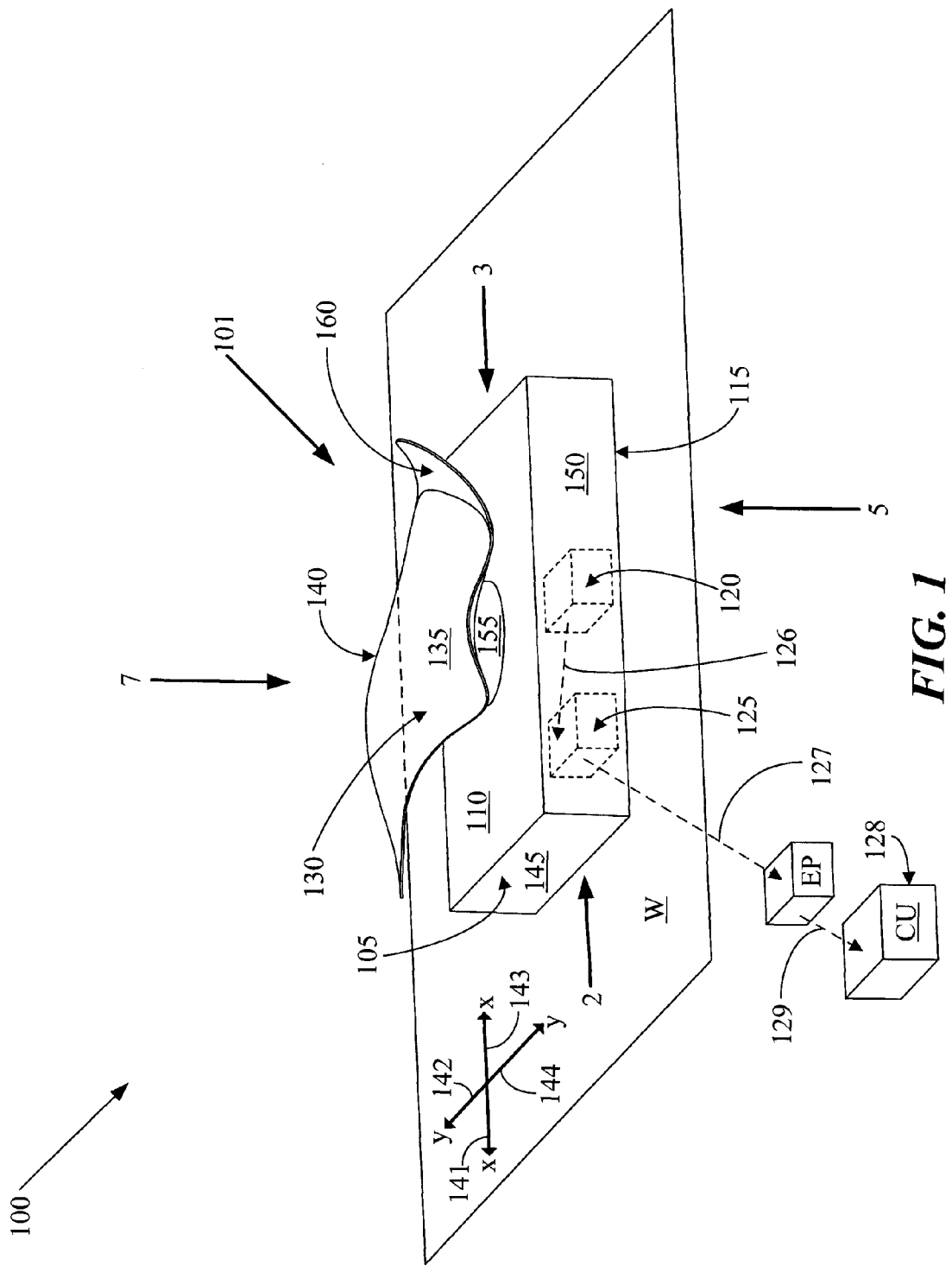
FIG. 1 is a perspective back side view showing an example of an implementation of an apparatus.

Various hand-controllable signal-generating devices have been designed. Many such devices exist that are capable of being controlled by a person's hand to generate a signal for use, e.g., in controlling the movement of an external object or image. However, there are numerous end-use applications in which facilitating control by the same hand of device(s) for generating multiple signals would be useful. As an example, a person may need to enter textual data or other commands simultaneously while controlling such movement of an external object or image. As another example, a person may need to generate signals for simultaneously controlling the movements of multiple objects or images. Further, for example, a person may need to simultaneously generate signals for controlling multiple degrees of movement of an external object or image, e.g., six degrees of three-dimensional motion. As another example, a person may need to generate signals for controlling the movements of such an object or image, while simultaneously controlling other aspects of the object or images, or while simultaneously controlling other aspects of devices or systems in communication with the object or with a device displaying the image. As an example, a person playing an electronic game may need to simultaneously generate such multiple types of signals. As the complexity of the multiple signals to be generated by a person's hand increases, generally so does the difficulty of facilitating retention of the person's hand in a suitable position for operating the device. Many of the existing hand-controllable signal-generating devices demonstrably fail to facilitate their accurate control by a person's hand throughout the generation of such multiple signals. For example, many existing hand-controllable signal-generating devices need to be held by a person's fingers for movement through two-dimensional directions over a working surface such as a table top or desk. In that case, the person's fingers are not free for simultaneously generating other signals, e.g. textual input signals.

Apparatus accordingly is provided herein, including a hand-controllable signal-generating device that includes: a body having a top side, and a bottom side spaced apart by a distance from and facing away from the top side, the bottom side being configured for facilitating displacements of the body over a working surface in two-dimensional directions with the bottom side facing the working surface, the body having a biaxial-displacement detector that is configured for generating biaxial displacement signals that are representative of detected displacements of the body in the two-dimensional directions over the working surface. The hand-controllable signal-generating device further includes a signal transmitter configured for communicating the biaxial displacement signals to an external electronic processor. The body has a palm rest on the top side, the palm rest including a palm contact surface having a contour for receiving a portion of a palm of a person's hand into contact at a position on the palm contact surface. The contour of the palm contact surface is configured for facilitating control by the portion of the palm of the person's hand, being in contact at the position on the palm contact surface, of the displacements of the body in the two-dimensional directions over the working surface. Systems are also provided, including a hand-controllable signal-generating device, and a digit-controllable signal-generating device for generating digit signals. In these systems, the contour of the palm contact surface is configured for facilitating control of the digit-controllable signal-generating device for generating digit signals by the person's hand simultaneously with control of displacements of the body in the two-dimensional directions by the portion of the palm being at the position on the palm contact surface.

Throughout this specification, it is understood that the term "hand" [H] means a human hand. Throughout this specification, it is understood that the term "digit" [D] means a thumb digit [TD] or another finger of a person's hand [H]. As examples, a "digit" [D] includes a thumb digit [TD], or a non-thumb digit [NTD]: an index finger, a middle finger, a ring finger, or a pinkie finger. For example, a person's hand [H] may have the foregoing five digits [D]. Further, for example, a person's hand [H] may have no digits, only one digit [D], or a plurality of digits [D]; and the one digit [D] or the plurality of the digits [D] of the person's hand [H] may include a thumb digit [TD], and may include one non-thumb digit [NTD] or a plurality of non-thumb digits [NTD]. It is also understood throughout this specification that a person's hand [H] may have more than five digits [D] or less than five digits [D], and may have or not have a thumb digit [TD]. Throughout this specification, it is understood that the term "palm" [P] means that portion of a person's hand [H] excluding the one digit [D] or all of the plurality of the digits [D].

Throughout this specification, it is understood that the term "signal" means an electronic signal or an electromagnetic radiation signal. Examples of electromagnetic radiation include visible light, ultraviolet light, and infrared light. Devices, systems and processes that utilize visible light are also respectively referred to as optical devices, systems and processes. Examples of electromagnetic radiation signals include: visible light signals; ultraviolet light signals; and infrared light signals. Throughout this specification, it is understood that the term "signal-generating device" means a device that is configured for the generation of electronic signals or electromagnetic radiation signals.

Throughout this specification, it is understood that the term "electronic circuit" means a circuit capable of conducting an electronic signal. Throughout this specification, it is understood that the term "electronic processor" means an electronic circuit capable of processing an electronic signal. As examples, an "electronic processor" may include an integrated circuit, or a microprocessor. Throughout this specification, it is understood that the term "microprocessor" means a multipurpose, programmable device that accepts digital data as input, and processes the digital data according to instructions stored in the programmable device's memory, and provides results as output.

Throughout this specification, it is understood that the term "signal transmitter" means a transmitter configured for communicating an electronic signal or an electromagnetic radiation signal. For example, a transmitter configured for communicating an electronic signal may include an electronic circuit. As examples, a transmitter configured for communicating an electromagnetic radiation signal may include a visible-, ultraviolet-, or infrared-light emitter.

Throughout this specification, it is understood that the term "hand-controllable signal-generating device" means a signal-generating device that can be operated by designated portions of a person's hand [H].

Throughout this specification, it is understood that the term "digit-controllable signal-generating device" means a signal-generating device that can be operated by a designated digit [D] or designated digits [D] of a person's hand [H], for generating digit signals [DS].

Throughout this specification, it is understood that the term "working surface" [W] means a surface on which a digit- or hand-controllable signal-generating device may be supported, and over which such a device may be moved by a person's hand [H]. As examples, a working surface [W] may include: a table top, a desk top, a ledge, or a tray.

Throughout this specification, it is understood that the term "biaxial-displacement" means a movement of a digit- or hand-controllable signal-generating device in two-dimensional directions [x, y] over a working surface [W]. Throughout this specification, it is understood that the term "biaxial-displacement detector" means a sensor capable of generating electronic- or electromagnetic radiation-signals that are representative of biaxial displacements of a digit- or hand-controllable signal-generating device over a working surface [W]. As an example, a biaxial-displacement detector may include a visible-, ultraviolet- or infrared-light emitter and a corresponding light detector, wherein the light emitter may include, as examples, a laser light emitter or a light-emitting diode ("LED"). In further examples, a biaxial-displacement detector may include an optical or mechanical-track-ball, -scroll-wheel, or -scroll-ball.

Throughout this specification, it is understood that the term "angular-displacement detector" means a sensor capable of generating electronic- or electromagnetic radiation-signals that are representative of angular displacements of a hand-operated joystick. As an example, an angular-displacement detector may have two axes of movement, such that moving the joystick to the left or right signals movement along the x axis, and moving the joystick forward or backwards signals movement along the y axis. As another example, an angular-displacement detector may have three axes of movement, wherein twisting the joystick to the left (counter-clockwise) or right (clockwise) signals movement along the z axis. In the another example, the three axes—x, y and z—may respectively be analogous to an aircraft's roll, pitch, and yaw. An angular-displacement detector may include an analog or digital joystick. An analog joystick, for example, may generate a signal indicating an angle measure of the joystick movement in any direction on the [x, y] axes, e.g, using potentiometers. A digital joystick may, for example, generate only an on-off signal for each of four different directions on the [x, y] axes.

Throughout this specification, it is understood that the term "compressive-force detector" means a sensor capable of generating electronic- or electromagnetic radiation-signals that are representative of compressive forces applied to a joystick. As examples, displacement joysticks with compression-sensitive sensors that may be utilized in the devices, systems and processes discussed herein are disclosed in the Armstrong U.S. Pat. No. 6,285,356 B1 issued on Sep. 4, 2001 and entitled "Displacement Joystick with Compression-Sensitive Sensors," the entirety of which hereby is incorporated herein by reference.

Throughout this specification, it is understood that the term "rotational-displacement detector" means a sensor capable of generating electronic- or electromagnetic radiation-signals that are representative of rotational displacements of a hand-controllable signal-generating device over a working surface [W]. As examples, rotational-displacement detectors for detecting rotational movements of an object over a working surface that may be utilized in the devices, systems and processes discussed herein are disclosed in the Gillick U.S. Pat. No. 5,446,481 issued on Aug. 29, 1995 and entitled "Multidimensional Hybrid Mouse for Computers," the entirety of which hereby is incorporated herein by reference.

Figure 2:
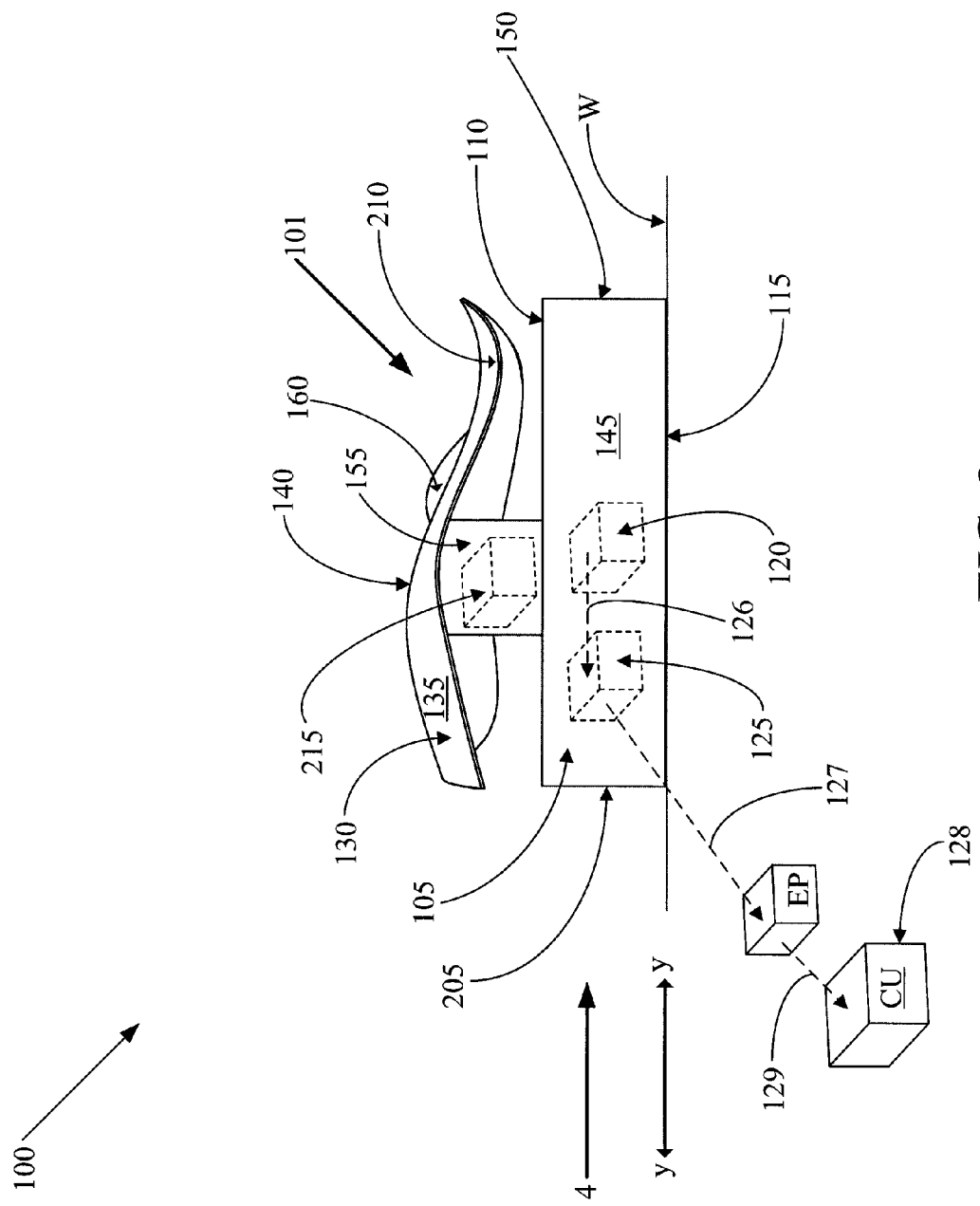
FIG. 2 is a left side view, taken in the direction of line 2, of the example of the apparatus as shown in FIG. 1.
Figure 3:
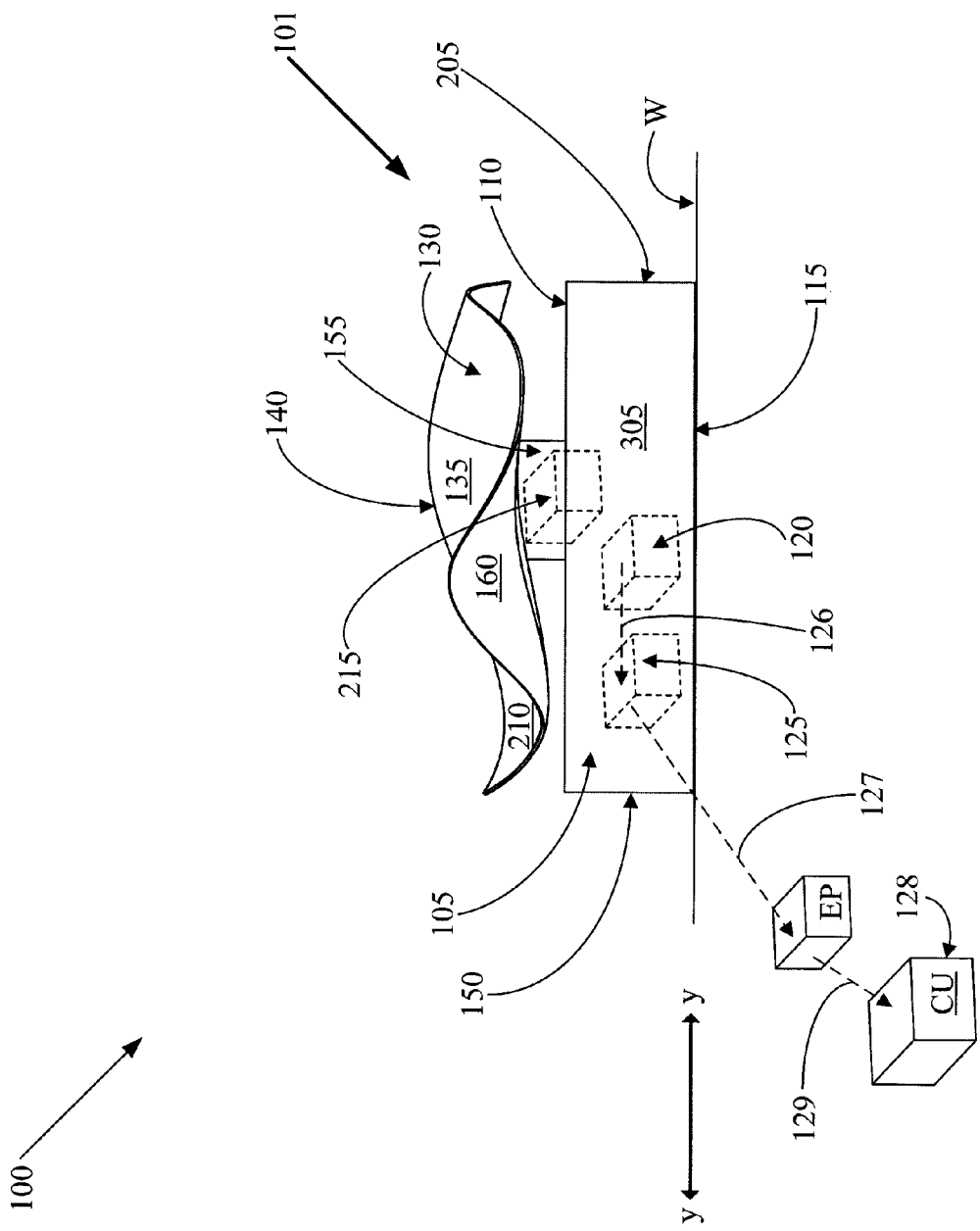
FIG. 3 is a right side view, taken in the direction of line 3, of the example of the apparatus as shown in FIG. 1.
Figure 4:
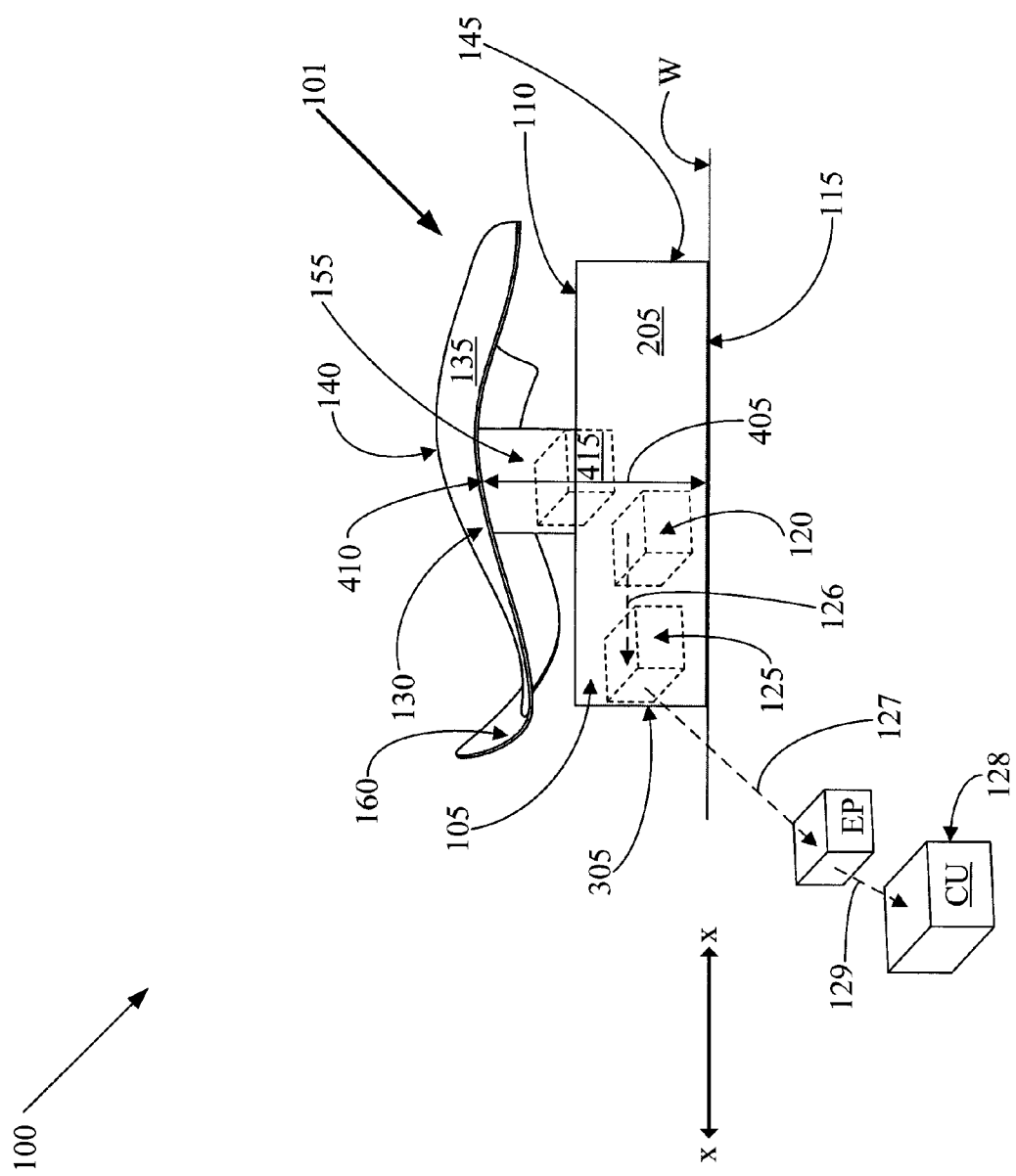
FIG. 4 is a front side view, taken in the direction of line 4 as shown in FIG. 2, of the example of the apparatus as shown in FIG. 1.
Figure 5:
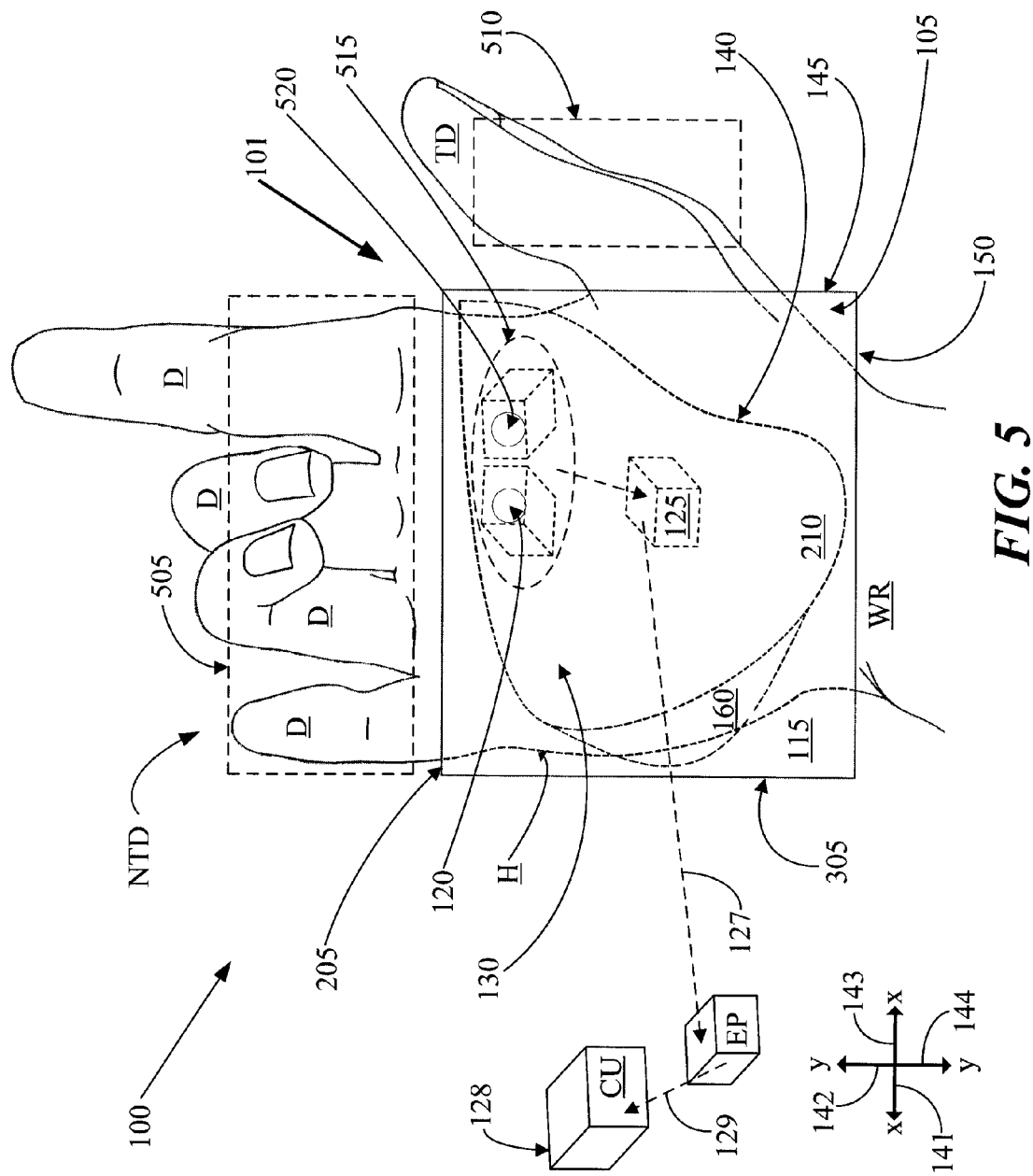
FIG. 5 is a bottom side view of the example of the apparatus as shown in FIG. 1 taken in the direction of line 5, further showing a person's hand together with the example of the apparatus.
Figure 6:
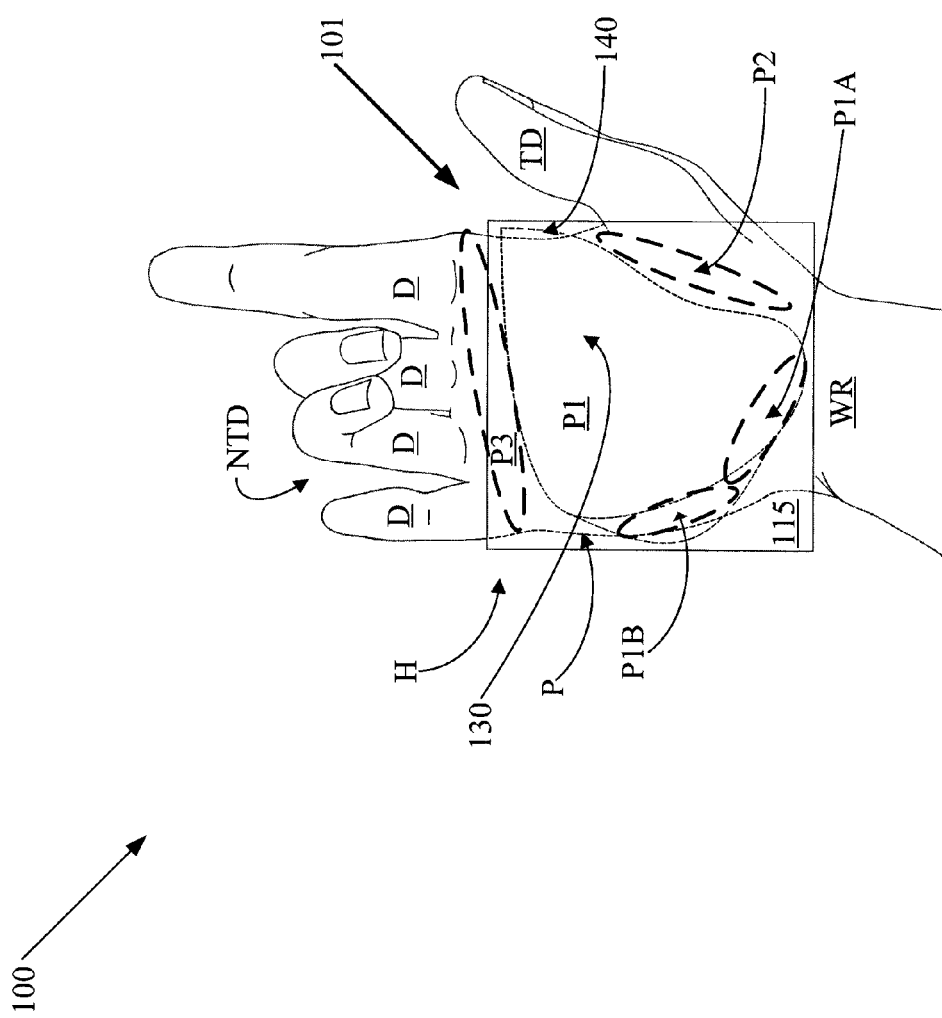
FIG. 6 is view of the person's hand as shown in FIG. 5, together with a bottom side and a hand rest of the example of the apparatus.
Figure 7:
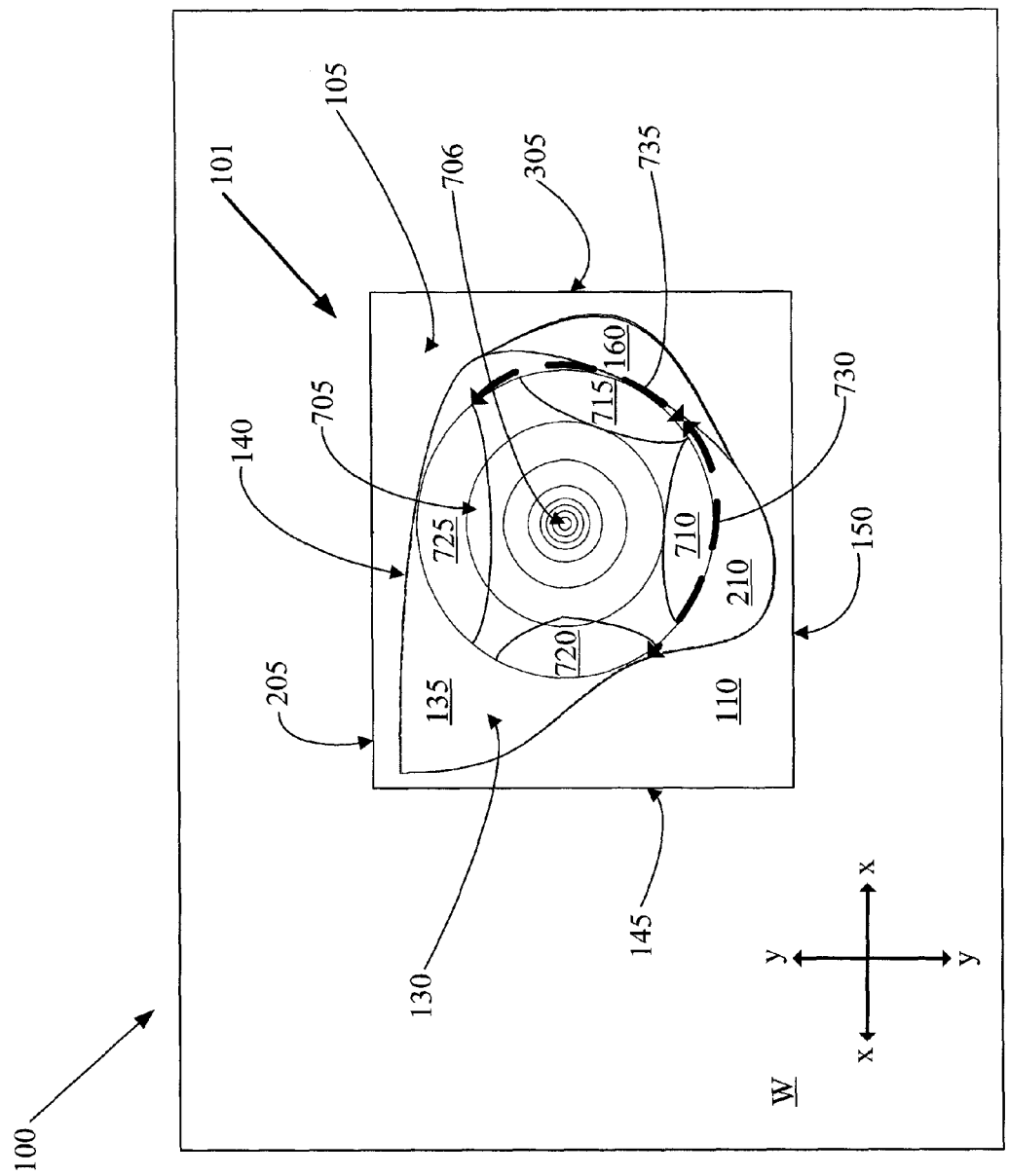
FIG. 7 is a top side view, taken in the direction of line 7, of the example of the apparatus as shown in FIG. 1.
Figure 8:
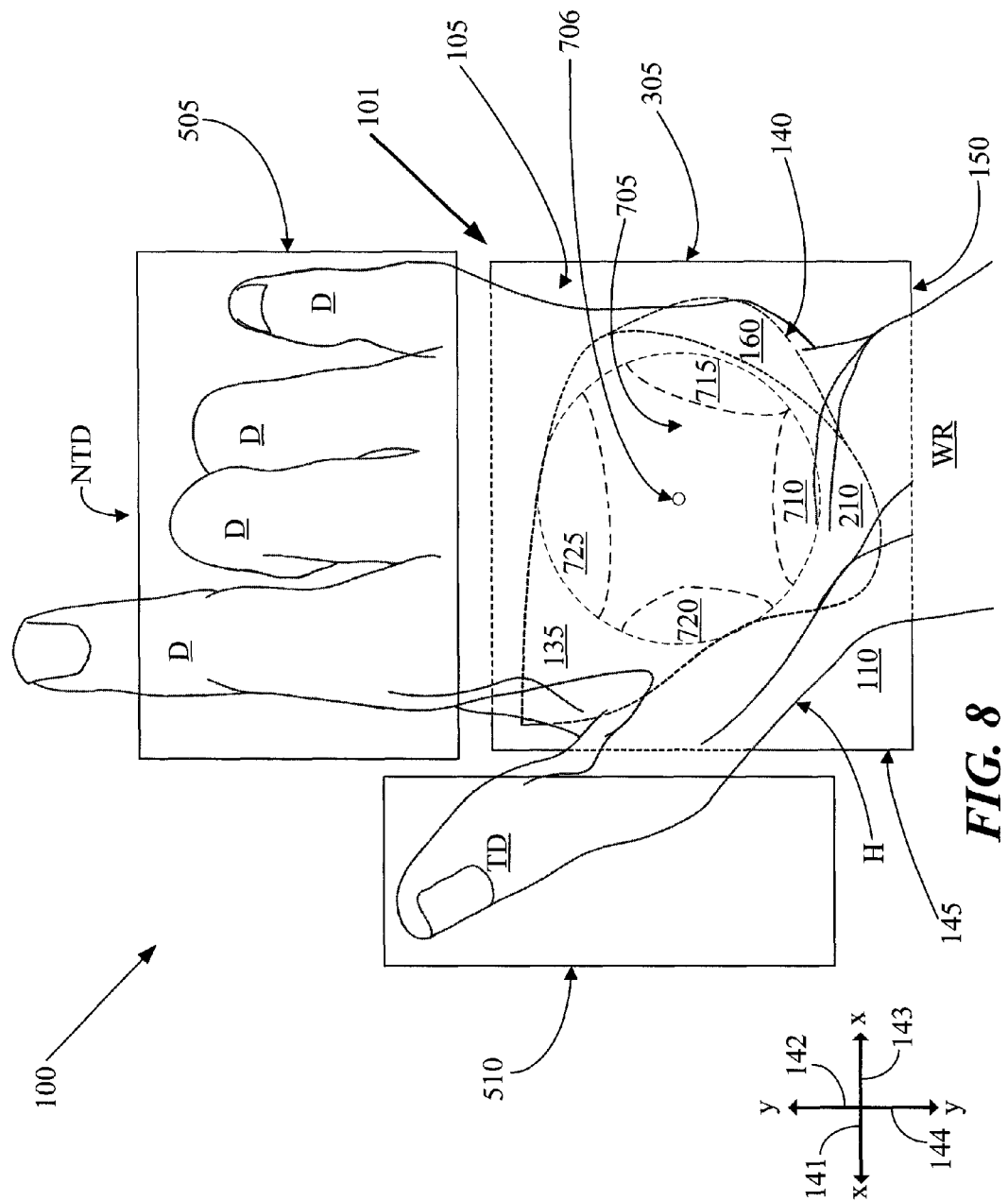
FIG. 8 is another top side view of the example of the apparatus as shown in FIG. 1 taken in the direction of line 7, further showing a person's hand together with the example of the apparatus.

FIG. 1 is a perspective back side view showing an example of an implementation of an apparatus [100]. FIG. 2 is a left side view, taken in the direction of line 2, of the example of the apparatus [100] as shown in FIG. 1. FIG. 3 is a right side view, taken in the direction of line 3, of the example of the apparatus [100] as shown in FIG. 1. FIG. 4 is a front side view, taken in the direction of line 4 as shown in FIG. 2, of the example of the apparatus [100] as shown in FIG. 1. FIG. 5 is a bottom side view of the example of the apparatus [100] as shown in FIG. 1 taken in the direction of line 5, further showing a person's hand together with the example of the apparatus [100]. FIG. 6 is view of the person's hand as shown in FIG. 5, together with a bottom side and a hand rest of the example of the apparatus [100]. FIG. 7 is a top side view, taken in the direction of line 7, of the example of the apparatus [100] as shown in FIG. 1. FIG. 8 is another top side view of the example of the apparatus [100] as shown in FIG. 1 taken in the direction of line 7, further showing a person's hand together with the example of the apparatus [100]. Examples of implementations of systems [900] will be subsequently discussed in connection with FIGS. 9-20. Examples of implementations of processes [2100], [2200] will also be subsequently discussed in connection with FIGS. 21-22. It is understood throughout this specification that the examples of implementations of the apparatus [100] may be modified as including any of the features or combinations of features that are disclosed in connection with the systems [900] or any of the features or combinations of features that are disclosed in connection with either of the processes [2100], [2200]. Accordingly, FIGS. 9-22 and the entireties of the subsequent discussions of the systems [900] and of the processes [2100], [2200] are hereby incorporated into the following discussion of the examples of the apparatus [100].

Referring to FIGS. 1-8, an example of an apparatus [100] including a hand-controllable signal-generating device [101] is shown, including a body [105] having a top side [110], and having a bottom side [115] spaced apart by a distance from and facing away from the top side [110]. The bottom side [115] is configured for facilitating displacements of the body [105] over a working surface [W] in two-dimensional directions [x, y] with the bottom side [115] facing the working surface [W]. The body [105] has a biaxial-displacement detector [120] that is configured for generating biaxial displacement signals [BDS] that are representative of detected displacements of the body [105] in the two-dimensional directions [x, y] over the working surface [W]. The example of an apparatus [100] further includes a signal transmitter [125] configured for communicating the biaxial displacement signals [BDS], as represented by an arrow [127], to an external electronic processor [EP]. The body [105] of the hand-controllable signal-generating device [101] has a palm rest [130] on the top side [110]. The palm rest [130] includes a palm contact surface [135] having a contour for receiving a portion [P1] of a palm [P] of a person's hand [H] into contact at a position [140] on the palm contact surface [135]. As further examples, the "contact" by the portion [P1] of the palm [P] at the position [140] may be "substantial contact," wherein "substantial contact" means that the palm contact surface [135] may be contoured for receiving the portion [P1] of the palm [P] of the person's hand [H] into contact with at least about 75% of the surface area of the palm contact surface [135]. As another example, the position [140] may be defined by the perimeter of the palm contact surface [135]. The contour of the palm contact surface [135] of the palm rest [130] is configured for facilitating control by the portion [P1] of the palm [P] of the person's hand [H], being in contact at the position [140] on the palm contact surface [135], of the displacements of the body [105] in the two-dimensional directions [x, y]. Throughout this specification, it is understood that displacement in "two-dimensional directions [x, y]" means displacements over a working surface [W] at least in four mutually-orthogonal directions, as shown by the examples of four mutually-orthogonal directions indicated by the arrows [141], [142], [143] and [144] shown in FIG. 1.

FIGS. 5, 6 and 8 further show a person's hand [H] in contact at the position [140] on the palm contact surface [135] of the hand-controllable signal-generating device [101]. As an example, the position [140] may be defined by the perimeter of the palm contact surface [135]. In an example, the person's hand [H] may have five digits [D], including a thumb digit [TD] and four non-thumb digits [NTD]. The palm contact surface [135] of the palm rest [130] is shaped for receiving the portion [P1] of the palm [P] of the person's hand [H] into contact at the position [140] on the palm contact surface [135]. In examples, the contour of the palm contact surface [135] of the palm rest [130] may be configured for facilitating control by the portion [P1] of the palm [P] of the person's hand [H] of the displacements of the body [105] in the two-dimensional directions [x, y] over the working surface [W] from the position [140] without any of the five digits [D] of the person's hand [H] being in contact with the hand-controllable signal-generating device [101]. As additional examples, the contour of the palm contact surface [135] of the palm rest [130] may be configured for guiding the one digit [D] or all of the plurality of the digits [D] of the person's hand [H] away from the palm contact surface [135] simultaneously while receiving the portion

[P1] of the palm [P] of the person's hand [H] into contact at the position [140] on the palm contact surface [135]. In further examples, the contour of the palm contact surface [135] of the palm rest [130] may be configured for positioning the one digit [D] or all of the plurality of the digits [D] of the person's hand [H] as being substantially unencumbered by the palm contact surface [135] when the portion [P1] of the palm [P] of the person's hand [H] is in contact at the position [140] on the palm contact surface [135]. It is understood that the term "substantially unencumbered" means that the one digit [D] or all of the plurality of the digits [D] of the person's hand [H] can collectively operate the digit-controllable signal-generating devices schematically represented as shown in FIG. 5 by the boxes [505], [510], to generate digit signals [DS], simultaneously while the portion [P1] of the palm [P] of the person's hand [H] is in contact at the position [140] on the palm contact surface [135].

In an example of operation, a person may place the apparatus [100] including the hand-controllable signal-generating device [101] on a working surface [W] with the bottom side [115] of the body [105] facing the working surface [W]. For example, the working surface [W] may be a desk top. The person may then place a portion [P1] of a palm [P] of the person's hand [H] into contact with the palm contact surface [135] at the position [140]. Using only the portion [P1] of the palm [P] of the person's hand [H], the person may then displace the body [105] of the hand-controllable signal-generating device [101] over the working surface [W] in the two-dimensional directions [x, y], including the example directions represented by the arrows [141], [142], [143] and [144]. For example, the person may displace the body [105] of the hand-controllable signal-generating device [101] over the working surface [W] in the two-dimensional directions [x, y] without any of the digits [D] of the person's hand [H] making any contact with or applying any force to the hand-controllable signal-generating device [101]. The contour of the palm contact surface [135] of the palm rest [130] is configured for facilitating accurate control by the portion [P1] of the palm [P] of the person's hand [H], being in contact at the position [140] on the palm contact surface [135], of the displacements of the body [105] in the two-dimensional directions [x, y] over the working surface [W]. The biaxial-displacement detector [120] detects the displacements of the body [105] in the two-dimensional directions [x, y] over the working surface [W], and generates biaxial displacement signals [BDS] that are representative of the detected biaxial displacements. As examples, the signal transmitter [125] may be integral with or otherwise in signal communication with the biaxial-displacement detector [120], as represented by the arrow [126]. The signal transmitter [125] of the apparatus [100] communicates the biaxial displacement signals [BDS], as represented by the arrow [127], to the external electronic processor [EP]. As an example, the signal transmitter [125] may be integral with the hand-controllable signal-generating device [101]. As another example, the electronic processor [EP] may include a microprocessor. Further, for example, the signal transmitter [125] may be in wired, wireless, optical, or another form of electromagnetic radiation-based communication with the external electronic processor [EP]. As another example, the external electronic processor [EP] may be in communication with a graphical user interface [128], as represented by an arrow [129]. Further, for example, the graphical user interface [128] may display a cursor [CU]. In that example, the biaxial-displacement detector [120] may be configured for generating the biaxial displacement signals [BDS] as being cursor control signals.

In examples, the palm contact surface [135] of the palm rest [130] may be shaped for receiving the portion [P1] of the palm [P] of the person's hand [H] into contact at a position [140] on the palm contact surface [135], wherein the position [140] may be a substantially-fixed position relative to the person's hand [H]. It is understood that the term "substantially-fixed position" means a position [140] on the palm contact surface [135] relative to a person's hand [H] that varies, through a series of ten or more iterations of placing a portion [P1] of the palm [P] of the hand [H] on the palm rest [130], by an average of about one centimeter or less in any two-dimensional direction [x, y]. As a further example, the palm contact surface [135] of the palm rest [130] may be shaped for repeatedly receiving the portion [P1] of the palm [P] of the person's hand [H] into contact at such a substantially-fixed position [140] on the palm contact surface [135].

In an example, the body [105] may have an overall box-like shape. The body [105] may, for example, have side walls [145], [150], [205] and [305], being sized for spacing apart the top side [110] at a suitable distance away from the bottom side [115]. In an alternative example, the body [105] may instead have a frame (not shown) being sized for spacing apart the top side [110] at a suitable distance away from the bottom side [115]. As examples, the top side [110] may be spaced apart from the bottom side [115] by a distance being within a range of between about two centimeters and about ten centimeters. In additional examples, the top side [110] may be generally flat, as facilitating the mounting of the palm rest [130] on the top side [110] of the hand-controllable signal-generating device [101]. As a further example (not shown), the top side [110] may integrally form the palm rest [130]. In further examples (not shown), the side walls [145], [150], [205] and [305] may be integrally constructed as a unitary rectangular, square, round, or elliptical side wall. Additionally, as examples, the top side [110] and the bottom side [115] of the hand-controllable signal-generating device [101] may each independently have a perimeter being rectangular, square, round, elliptical, or having another shape. Further, for example, the bottom side [115] may be generally flat, as facilitating displacements of the body [105] of the hand-controllable signal-generating device [101] over the working surface [W] in two-dimensional directions [x, y].

In examples of the apparatus [100] including the hand-controllable signal-generating device [101], the biaxial-displacement detector [120] may be located at the bottom side [115] of the body [105]. As an example, the biaxial-displacement detector [120] may include a visible-, ultra-violet-, or infrared-light emitter/detector. Alternatively, as examples (not shown), the biaxial-displacement detector [120] may include a light-detecting or mechanical—trackball, scroll-wheel, or scroll-ball. Further, for example, the biaxial-displacement detector [120] may be configured for generating the biaxial displacement signals [BDS] as being cursor control signals. In that example, the apparatus [100] including the hand-controllable signal-generating device [101] may function as a computer mouse for controlling displacements of a cursor [CU] in two-dimensional directions [x, y] on the graphical user interface [128]. As examples, a graphical user interface [128] may include a display screen of a desktop-, laptop-, or tablet computer, or a smart-phone, or the like. In further examples, the biaxial-displacement detector [120] may be configured for generating the biaxial displacement signals [BDS] as being keyboard control signals or joystick control signals. In additional examples, the biaxial-displacement detector [120] may be configured for generating the biaxial displacement signals [BDS] as being control signals for additionally or instead causing the movement of non-cursor images on the graphical user interface [128].

In an example, the palm rest [130] may be adjustably mounted on the top side [110] of the body [105]. As another example of the apparatus [100] including the hand-controllable signal-generating device [101], the palm rest [130] may be mounted on a post [155] over the top side [110] of the body [105]. Further, for example, the palm rest [130] may be adjustably mounted on the post [155] over the top side [110] of the body [105]. For example, a length of the post [155] may be adjustable, so that an elevation as represented by the arrow [405], of the palm rest [130] above the bottom side [115] at a point of attachment [410], may accordingly be changed. As further examples, a location of the palm rest [130] over the top side [110] may be adjustable relative to the two-dimensional directions [x, y]. In additional examples, the palm rest [130] may be mounted on the top side [110] of the body [105] with the palm rest [130] being adjustable: side-to-side; or as to tilt angles relative to the top side [110] including as examples, pitch, yaw and roll.

In examples, and referring to FIGS. 6, 7 and 8, the palm contact surface [135] of the palm rest [130] of the apparatus [100] including the hand-controllable signal-generating device [101] may include a mound [705] having a peak [706] surrounded by downwardly-sloping sides represented by a series of concentric circles shown in FIG. 7, the downwardly-sloping sides of the mound [705] including: a first portion [710]; a second portion [715]; a third portion [720]; and a fourth portion [725]. The mound [705] may, for example, have a convex shape culminating at the peak [706] as shown in FIG. 7; and may have overall dimensions being suitable for being received into a concave palm [P] of a person's hand [H]. Further, for example, the mound [705] may have a convex contour as shown in FIG. 7.

In these examples, the portion [P1] of the palm [P] of the person's hand [H] may include a first part [P1A] that is nearest to a wrist [WR] of the person; and the first part [P1A] of the portion [P1] of the palm [P] may be received into contact on the first portion [710] of the downwardly-sloping sides of the mound [705] when the portion [P1] of the palm [P] is at the position [140] on the palm contact surface [135]; and the first portion [710] of the downwardly-sloping sides of the mound [705] may have a first attached upwardly-sloping lip [210].

In additional examples, and referring to FIGS. 6, 7 and 8, the palm contact surface [135] of the palm rest [130] may likewise include the mound [705] having the peak [706] surrounded by the downwardly-sloping sides represented by the series of concentric circles shown in FIG. 7, including the first portion [710], the second portion [715], the third portion [720], and the fourth portion [725], and in addition: the portion [P1] of the palm [P] of the person's hand [H] may include a second part [P1B] that is farthest from the person's thumb digit [TD]; and the second part [P1B] of the portion [P1] of the palm [P] may be received into contact on the second portion [715] of the downwardly-sloping sides of the mound [705] when the portion [P1] of the palm [P] is at the position [140] on the palm contact surface [135]; and the second portion [715] of the downwardly-sloping sides of the mound [705] may have a second attached upwardly-sloping lip [160].

In further examples, and referring to FIGS. 6, 7 and 8, the palm contact surface [135] of the palm rest [130] may likewise include the mound [705] having the peak [706] surrounded by the downwardly-sloping sides represented by the series of concentric circles shown in FIG. 7, including the first portion [710], the second portion [715], the third portion [720], and the fourth portion [725], and in addition: the palm [P] of the person's hand [H] may include another portion [P2] being nearest to the thumb digit [TD] of the person's hand [H], and the palm contact surface [135], including for example the third portion [720] of the mound [705], may be shaped for guiding the another portion [P2] of the palm [P] away from the palm contact surface [135] simultaneously while receiving the portion [P1] of the palm [P] of the person's hand [H] into contact at the position [140] on the palm contact surface [135].

In other examples, and referring to FIGS. 6, 7 and 8, the palm contact surface [135] of the palm rest [130] may likewise include the mound [705] having the peak [706] surrounded by the downwardly-sloping sides represented by the series of concentric circles shown in FIG. 7, including the first portion [710], the second portion [715], the third portion [720], and the fourth portion [725], and in addition: the palm [P] of the person's hand [H] may include an additional portion [P3] being nearest to the one non-thumb digit [NTD] or to the plurality of the non-thumb digits [NTD] of the person's hand [H], and the palm contact surface [135], including for example the fourth portion [725] of the mound [705], may be shaped for guiding the additional portion [P3] of the palm [P] away from the palm contact surface [135] simultaneously while receiving the portion [P1] of the palm [P] of the person's hand [H] into contact at the position [140] on the palm contact surface [135].

As a further example, the palm contact surface [135] of the palm rest [130] may likewise include the mound [705] having the peak [706] surrounded by the downwardly-sloping sides represented by the series of concentric circles shown in FIG. 7, including the first portion [710], the second portion [715], the third portion [720], and the fourth portion [725], and in addition: the first portion [710] of the mound [705] may have the first attached upwardly-sloping lip [210]; and the second portion [715] of the mound [705] may have the second attached upwardly-sloping lip [160]; and the palm contact surface [135], including for example the third and fourth portions [720], [725] of the mound [705], may be shaped for guiding the another portion [P2] and the additional portion [P3] of the palm [P] away from the palm contact surface [135] simultaneously while receiving the portion [P1] of the palm [P] of the person's hand [H] into contact at the position [140] on the palm contact surface [135]. Further in this example, the first upwardly-sloping lip [210] and the first portion [710] of the downwardly-sloping sides of the mound [705] may collectively define a first concave trough schematically indicated by a dashed line [730]. Additionally in this example, the second upwardly-sloping lip [160] and the second portion [715] of the downwardly-sloping sides of the mound [705] may together define a second concave trough schematically indicated by a dashed line [735]. In an example, the concave contour of the first trough [730] may be shaped for receiving the first part [P1A] of the portion [P1] of the palm [P] of the person's hand [H] when the portion [P1] of the palm [P] is at the position [140] on the palm contact surface [135]. Further, for example, the concave contour of the second trough [735] may be shaped for receiving the second part [P1B] of the portion [P1] of the palm [P] of the person's hand [H] when the portion [P1] of the palm [P] is at the position [140] on the palm contact surface [135]. As a further example, the contour of the palm contact surface [135] may, by receiving the first part [P1A] of the palm [P] in the first trough [730] and by receiving the second part [P1B] of the palm [P] in the second trough [735], facilitate control of rotations of the body [105] over the working surface [W] in the two-dimensional directions [x, y] by the portion [P1] of the palm [P] of the person's hand [H].

In further examples, the position [140] may be defined by the perimeter of the palm contact surface [135]; and the palm contact surface [135] may be contoured for receiving the portion [P1] of the palm [P] of the person's hand [H] into contact at the perimeter [140] of the palm contact surface [135]. The contour of the palm contact surface [135] of the palm rest [130] may be configured for facilitating control by the portion [P1] of the palm [P] of the person's hand [H], being in contact at the perimeter [140] of the palm contact surface [135], of the displacements of the body [105] in the two-dimensional directions [x, y]. In additional examples, the position [140], as being defined by the perimeter [140] of the palm contact surface [135], may be a substantially-fixed position relative to the portion [P1] of a palm [P] of a hand [H]. As further examples, the "contact" by the portion [P1] of the palm [P] at the perimeter [140] may be "substantial contact," wherein "substantial contact" means that the palm contact surface [135] may be contoured for receiving the portion [P1] of the palm [P] of the person's hand [H] into contact with at least about 75% of the length of the perimeter [140].

As another example, the palm rest [130] of the apparatus [100] including the hand-controllable signal-generating device [101] may be pivotally mounted over the top side [110] of the body [105]. For example, the post [155] may be a joystick being mounted on the top side [110] of the body [105], on which the palm rest [130] may be mounted. Further, for example, the joystick [155] may include an angular-displacement detector [215]. As examples, the angular-displacement detector [215] may be configured for generating angular-displacement signals [AS] that are representative of detected angular displacements of the palm rest [130] over the top side [110] of the body [105]; and the signal transmitter [125] may be configured for communicating, as represented by the arrow [127], the angular-displacement signals [AS] to the external electronic processor [EP]. As examples, the angular-displacement signals [AS] may differentiate between angular displacements of the joystick [155] as being pitch-, yaw-, or roll-movements relative to the body [105], or as being twisting movements of the joystick [155] around the top side [110]. In additional examples, the joystick [155] may include a compressive force detector [415]. As examples, the compressive force detector [415] may be configured for generating compressive force signals [FS] that are representative of detected compressive forces applied by the portion [P1] of the palm [P] of the person's hand [H] to the palm rest [130] in the direction of the downward portion of the arrow [405] towards the top side [110] of the body [105]; and the signal transmitter [125] may be configured for communicating, as represented by the arrow [127], the compressive force signals [FS] to the external electronic processor [EP].

In a further example, the apparatus [100] including the hand-controllable signal-generating device [101] may have a rotational-displacement detector [515] being configured for generating rotational displacement signals [RS] that are representative of detected rotational displacements of the body [105] in the two-dimensional directions [x, y] over the working surface [W]; and the signal transmitter [125] may be configured for communicating, as represented by the arrow [127], the rotational displacement signals [RS] to the external electronic processor [EP]. In examples, the rotational-displacement detector [515] may include a gyroscope, accelerometer, or compass. As an additional example, the biaxial-displacement detector [120] may be located at the bottom side [115] of the body [105]; and the hand-controllable signal-generating device [101] may include an additional biaxial-displacement detector [520] that is located at the bottom side [115] of the body [105]. In that additional example, the additional biaxial-displacement detector [520] may be spaced apart from the biaxial-displacement detector [120] by a distance being suitable for facilitating the functioning of the biaxial-displacement detectors [120], [520] together as a rotational-displacement detector. It is understood throughout this specification that the signal transmitter [125] may be further configured for communicating, in any combination or sequence to the external electronic processor [EP] as represented by the arrow [127]: the biaxial displacement signals [BDS]; and the angular-displacement signals [AS]; and the compressive force signals [FS]; and the rotational displacement signals [RS]. It is further understood throughout this specification that each of the signals [BDS], [AS], [FS] and [RS] that may be generated by hand-controlled operation of the system [100] may be utilized for controlling an external display such as a cursor [CU] or for controlling an object, which may be, as an example, a motorized moveable object such as a vehicle.

Figure 9:
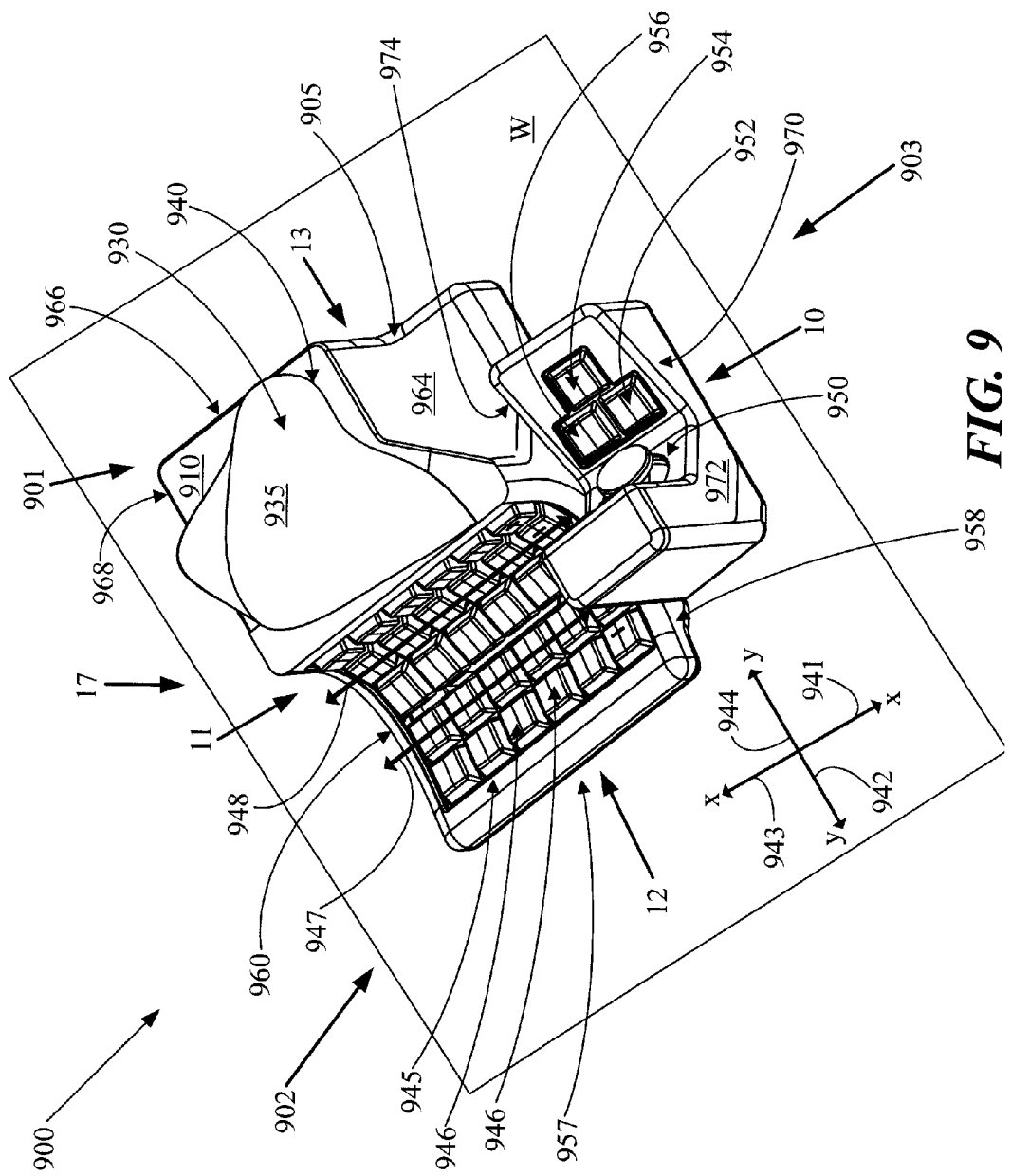
FIG. 9 is a perspective side view showing an example of an implementation of a system including a hand-controllable signal-generating device.
Figure 10:
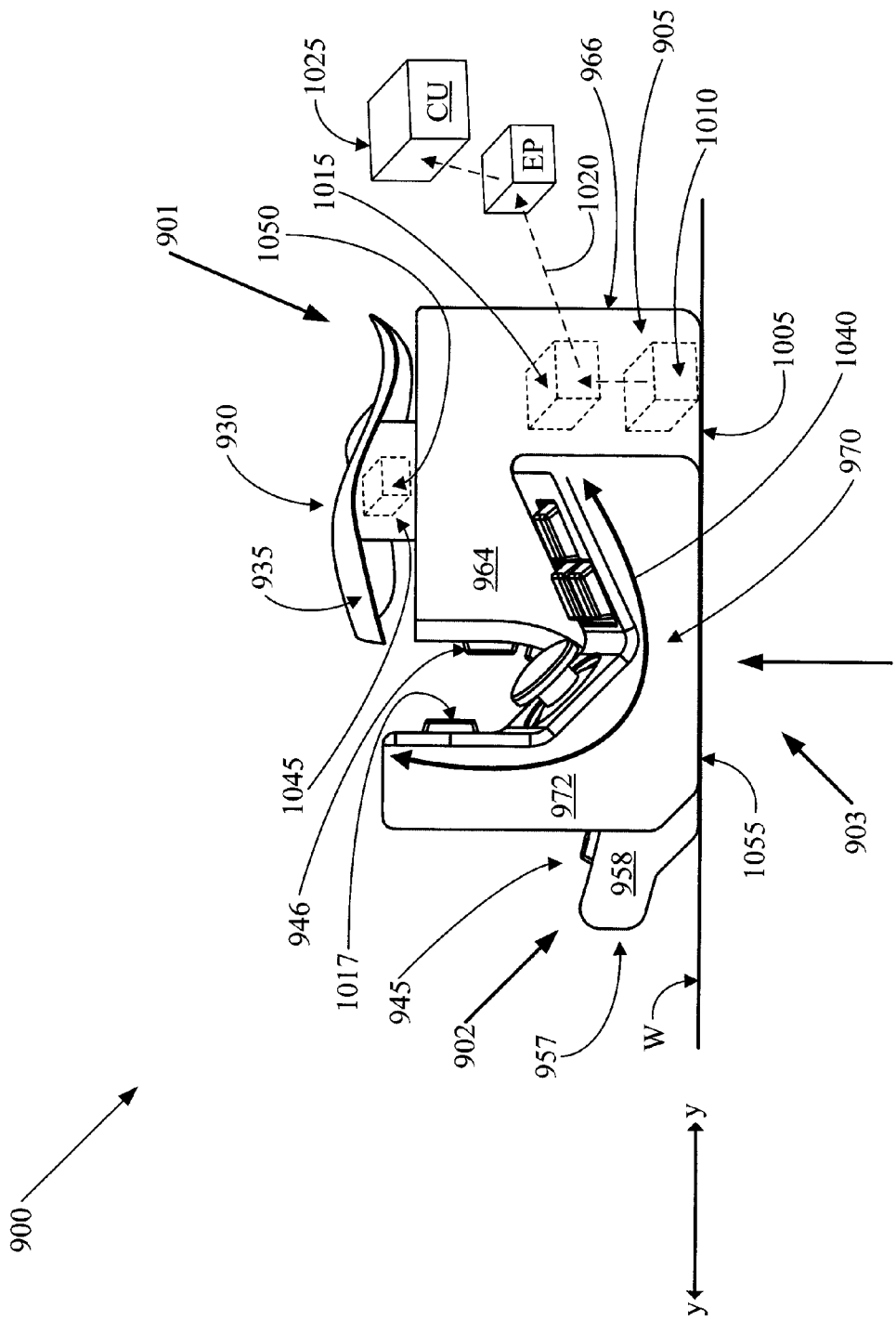
FIG. 10 is a left side view, taken in the direction of line 10, of the example of the system as shown in FIG. 9.
Figure 11:
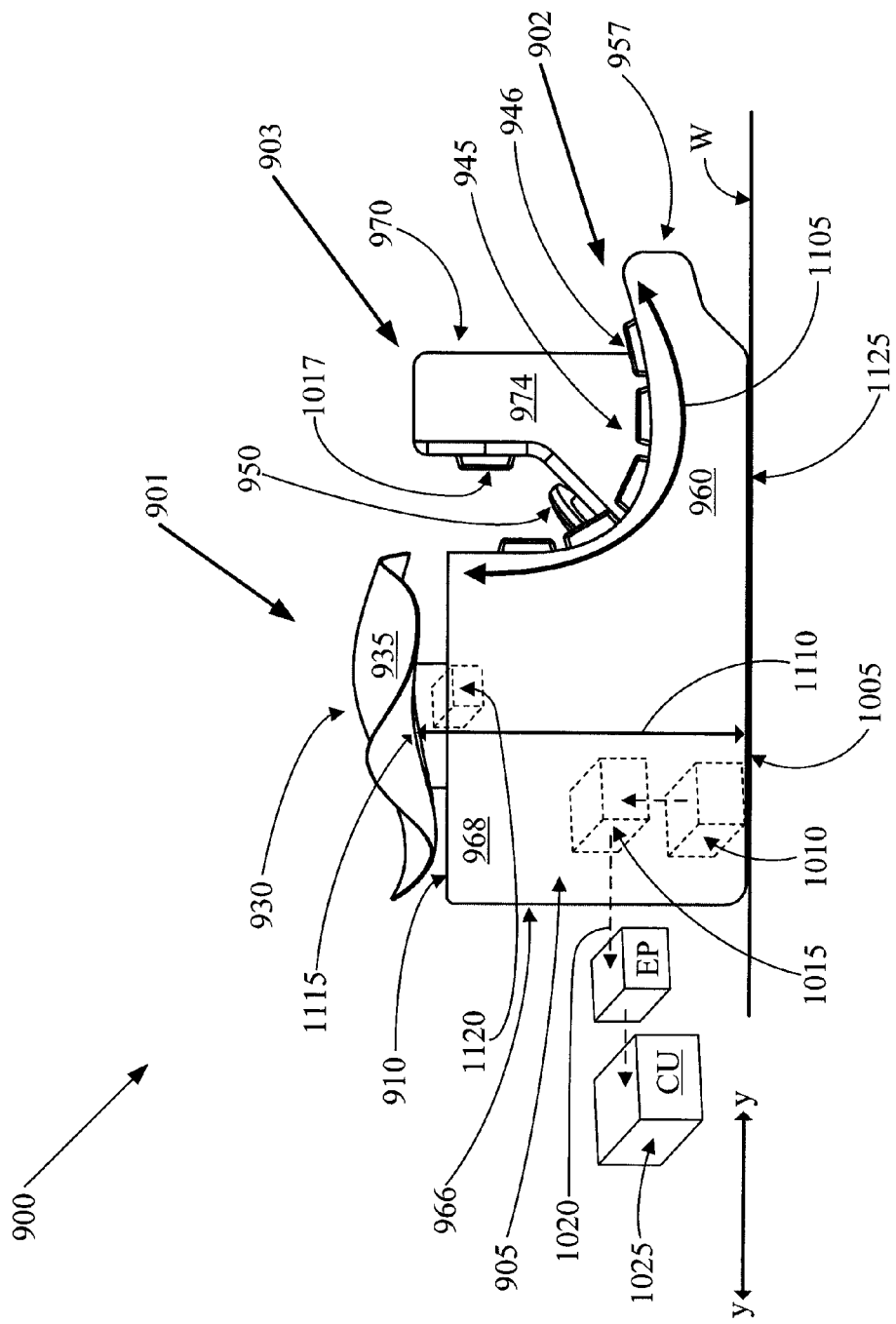
FIG. 11 is a right side view, taken in the direction of line 11, of the example of the system as shown in FIG. 9.
Figure 12:
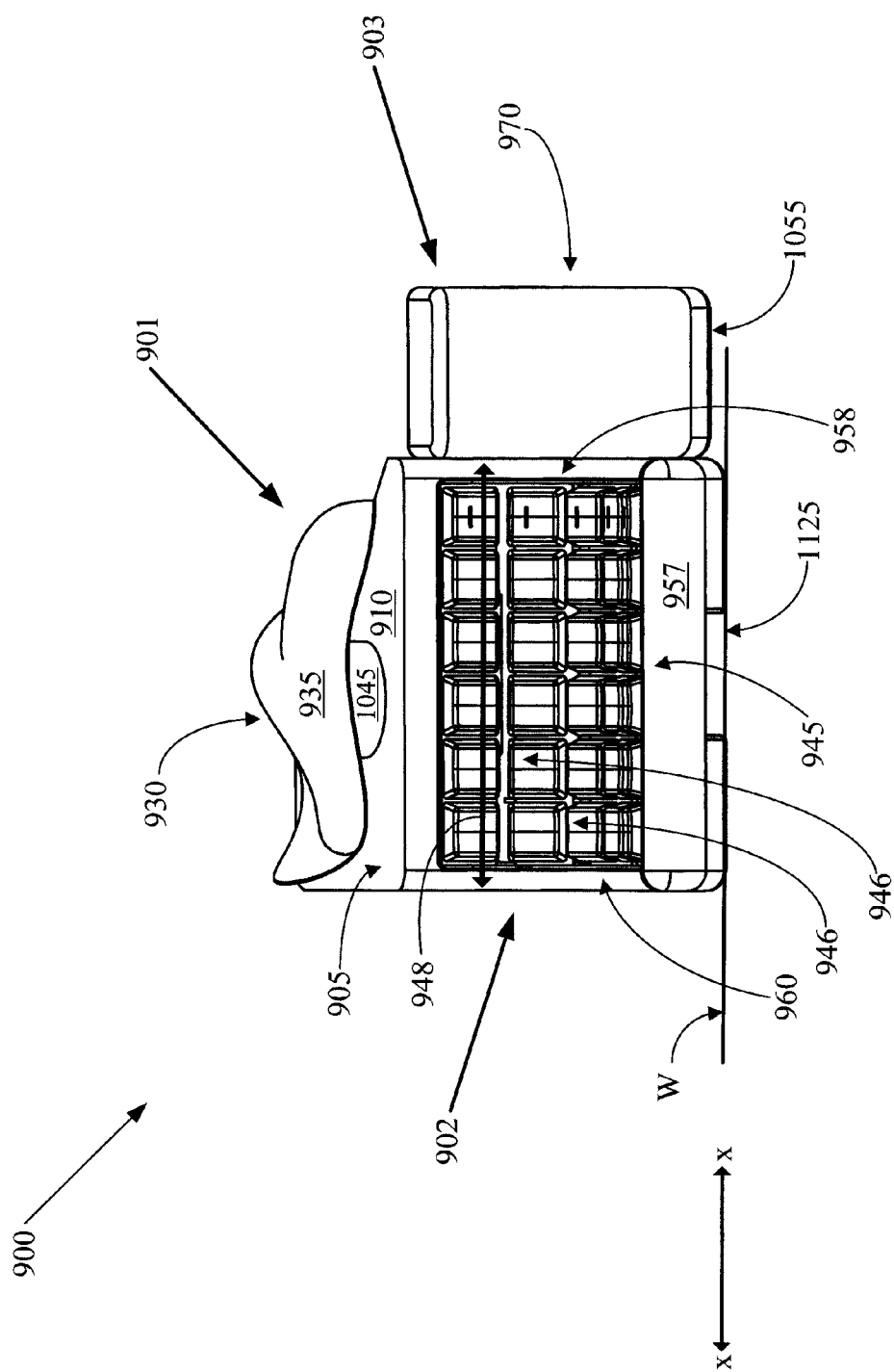
FIG. 12 is a front side view, taken in the direction of line 12, of the example of the system as shown in FIG. 9.
Figure 13:
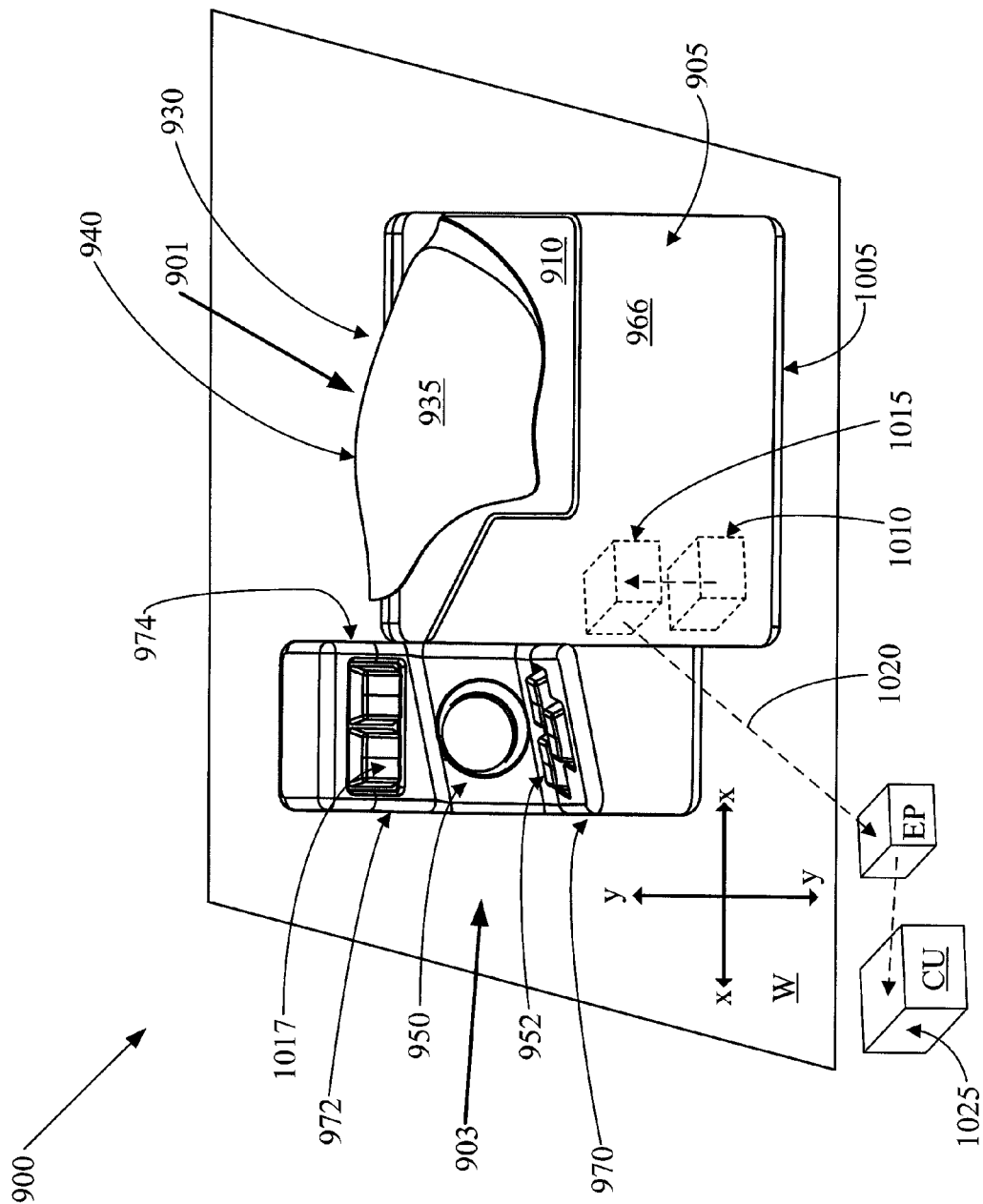
FIG. 13 is a back side view, taken in the direction of line 13, of the example of the system as shown in FIG. 9.
Figure 14:
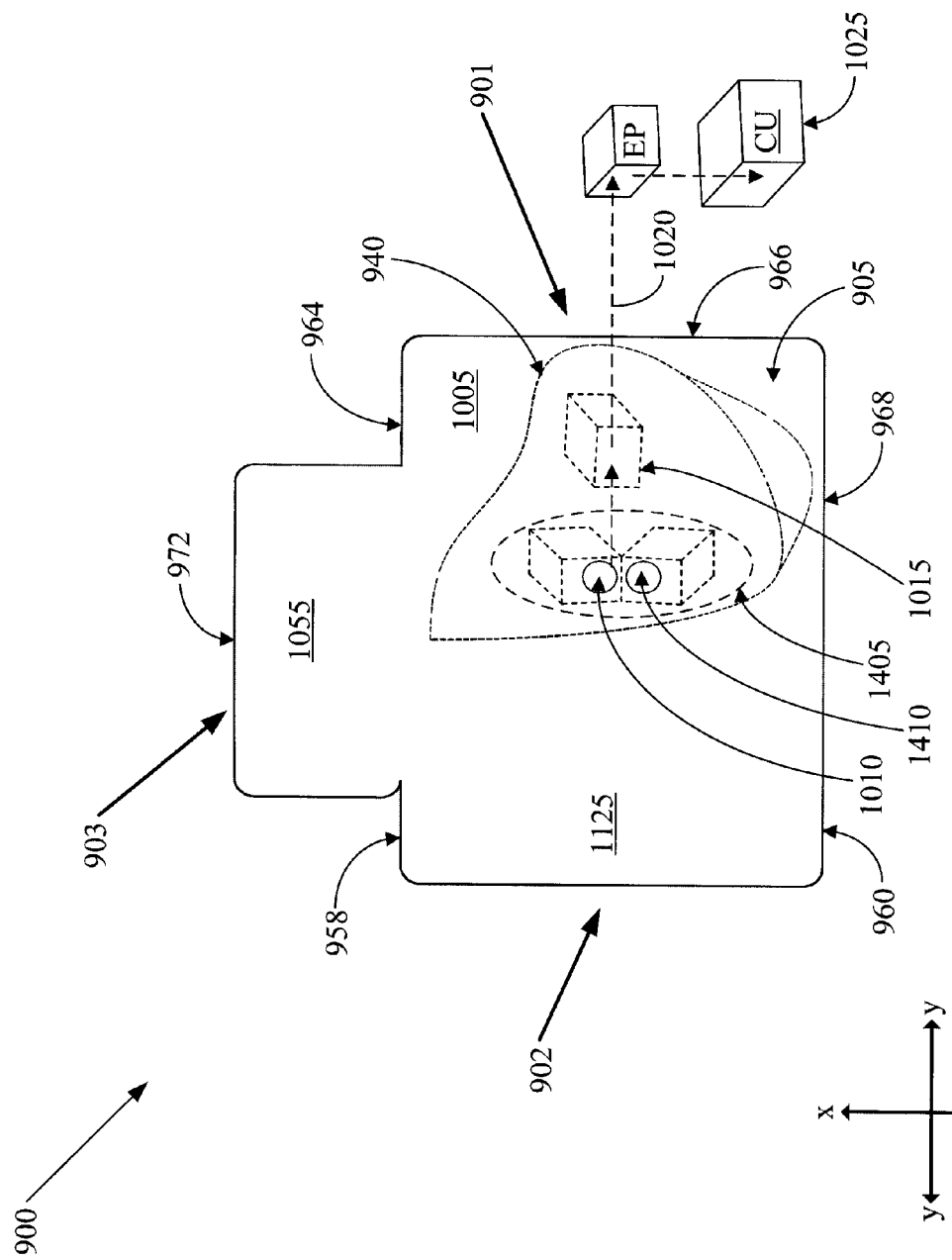
FIG. 14 is a bottom side view, taken in the direction of line 14 shown in FIG. 10, of the example of the system as shown in FIG. 9.
Figure 15:
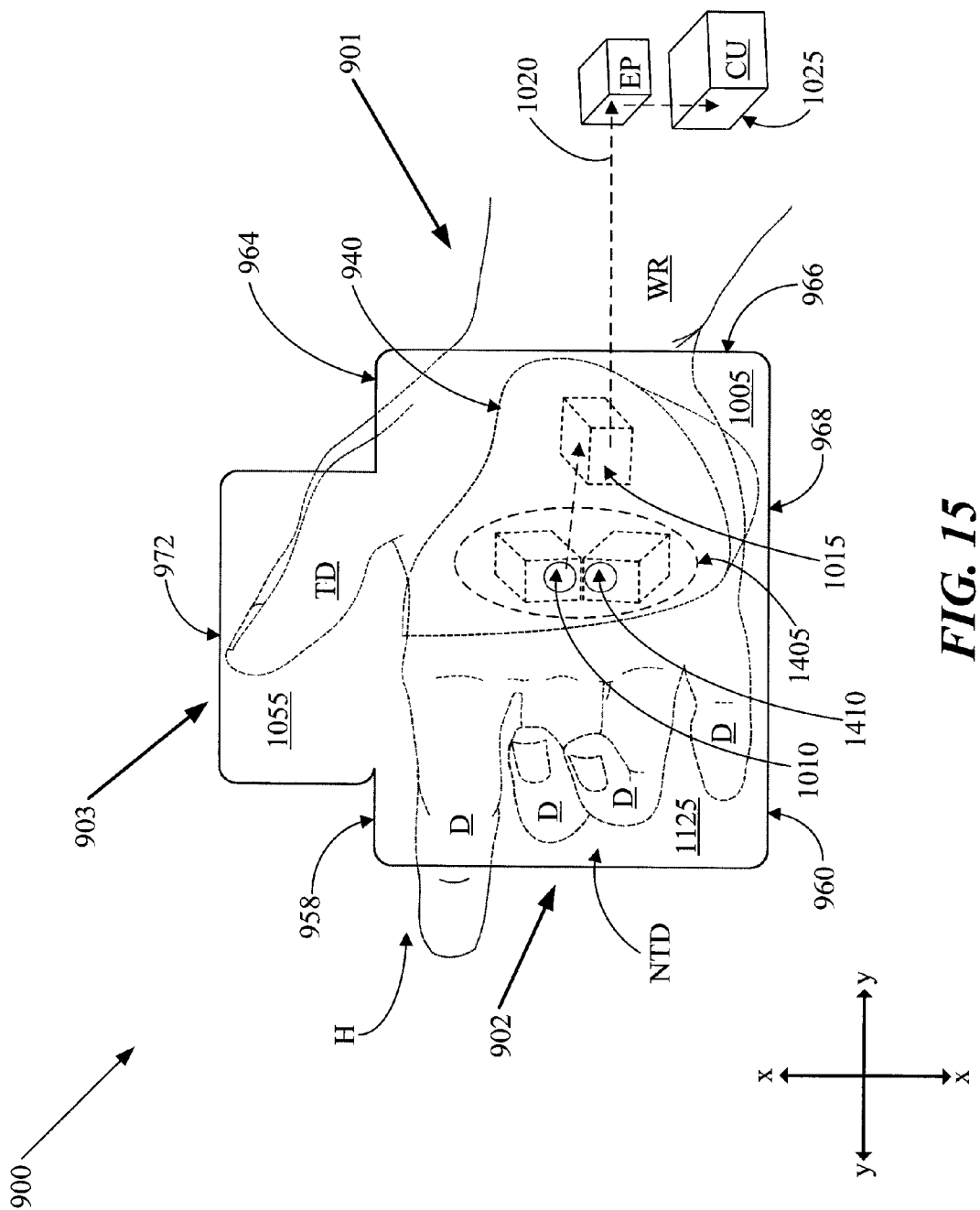
FIG. 15 is another bottom side view, taken in the direction of line 14, showing a person's hand together with the example of the system as shown in FIG. 9.
Figure 16:
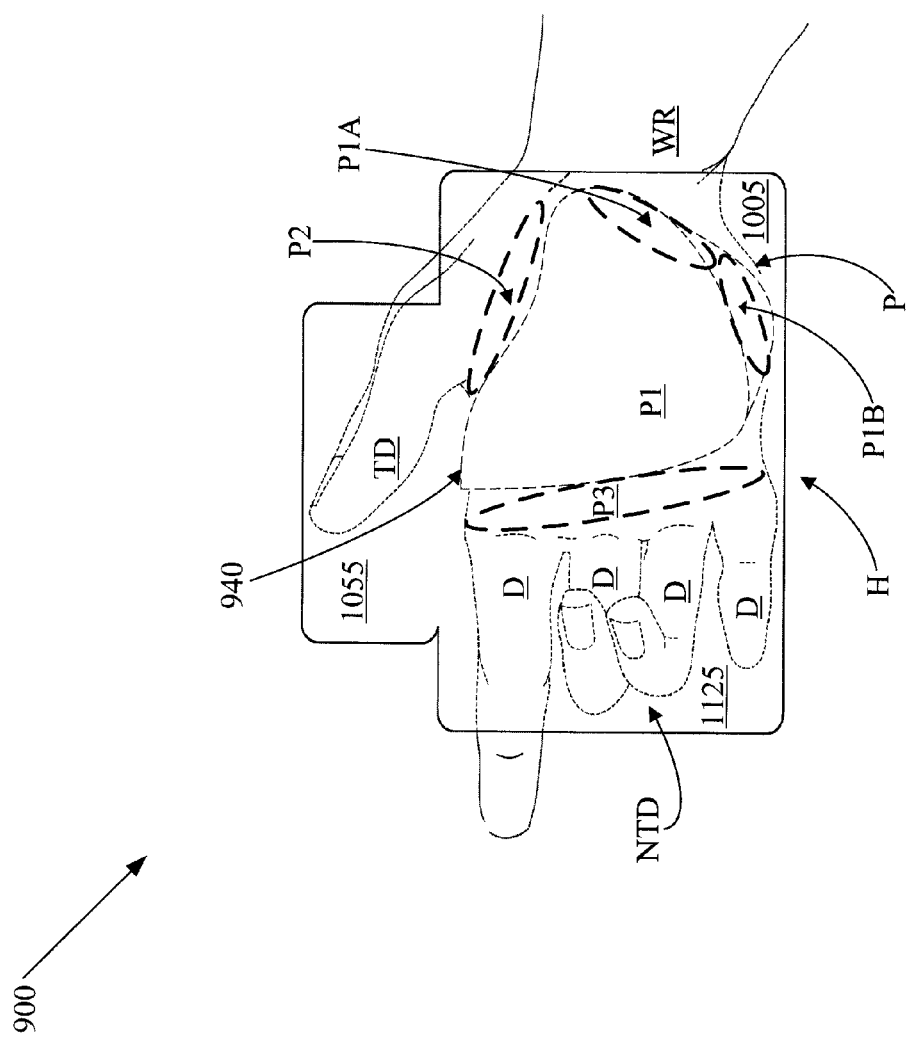
FIG. 16 is a view of the person's hand as shown in FIG. 15, together with a bottom side and a hand rest of the example of the system.
Figure 17:
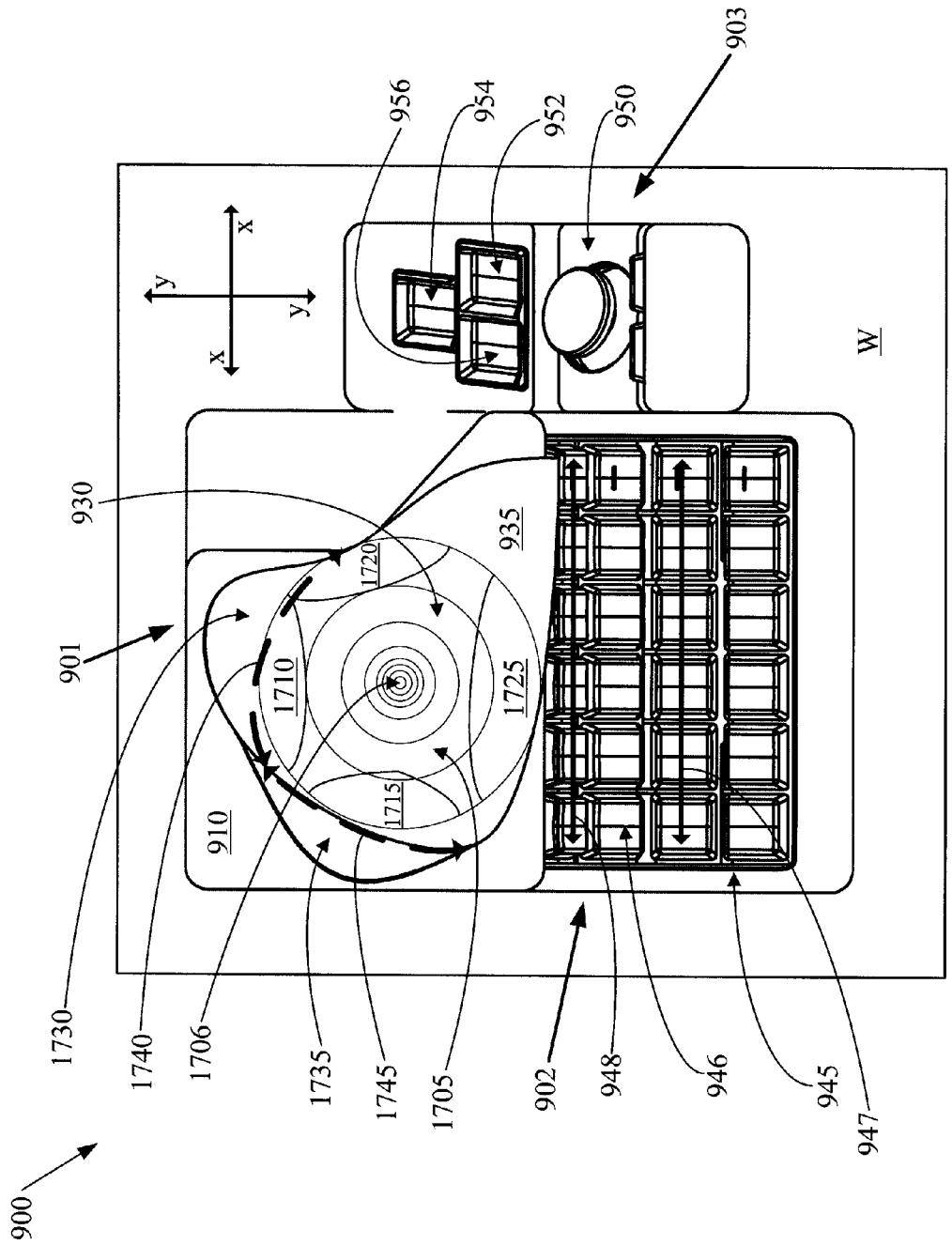
FIG. 17 is a top side view, taken in the direction of line 17 as shown in FIG. 9, of the example of the system as shown in FIG. 9.
Figure 18:
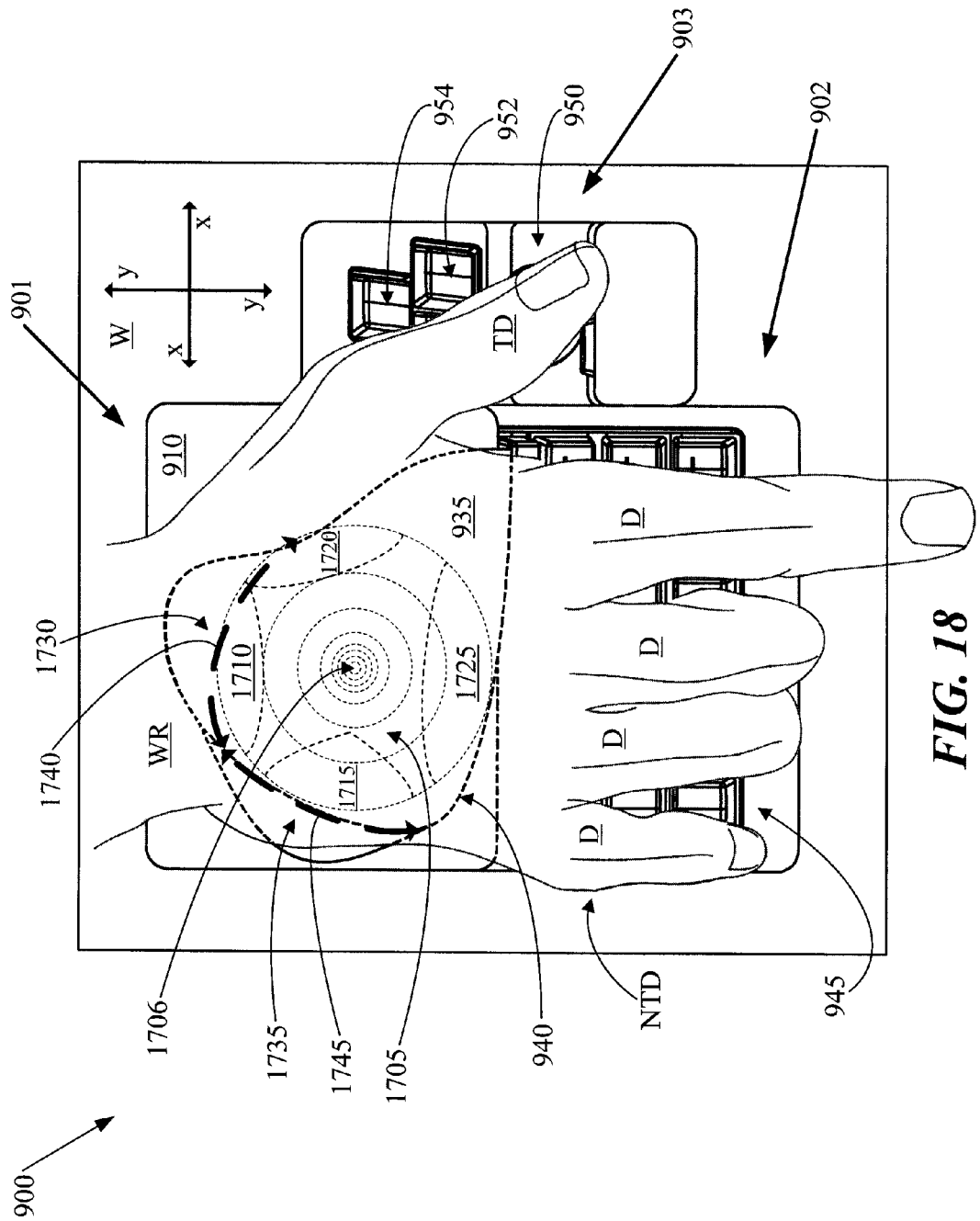
FIG. 18 is another top side view of the example of the system as shown in FIG. 9 taken in the direction of line 17, further showing a person's hand together with the example of the system.
Figure 19:
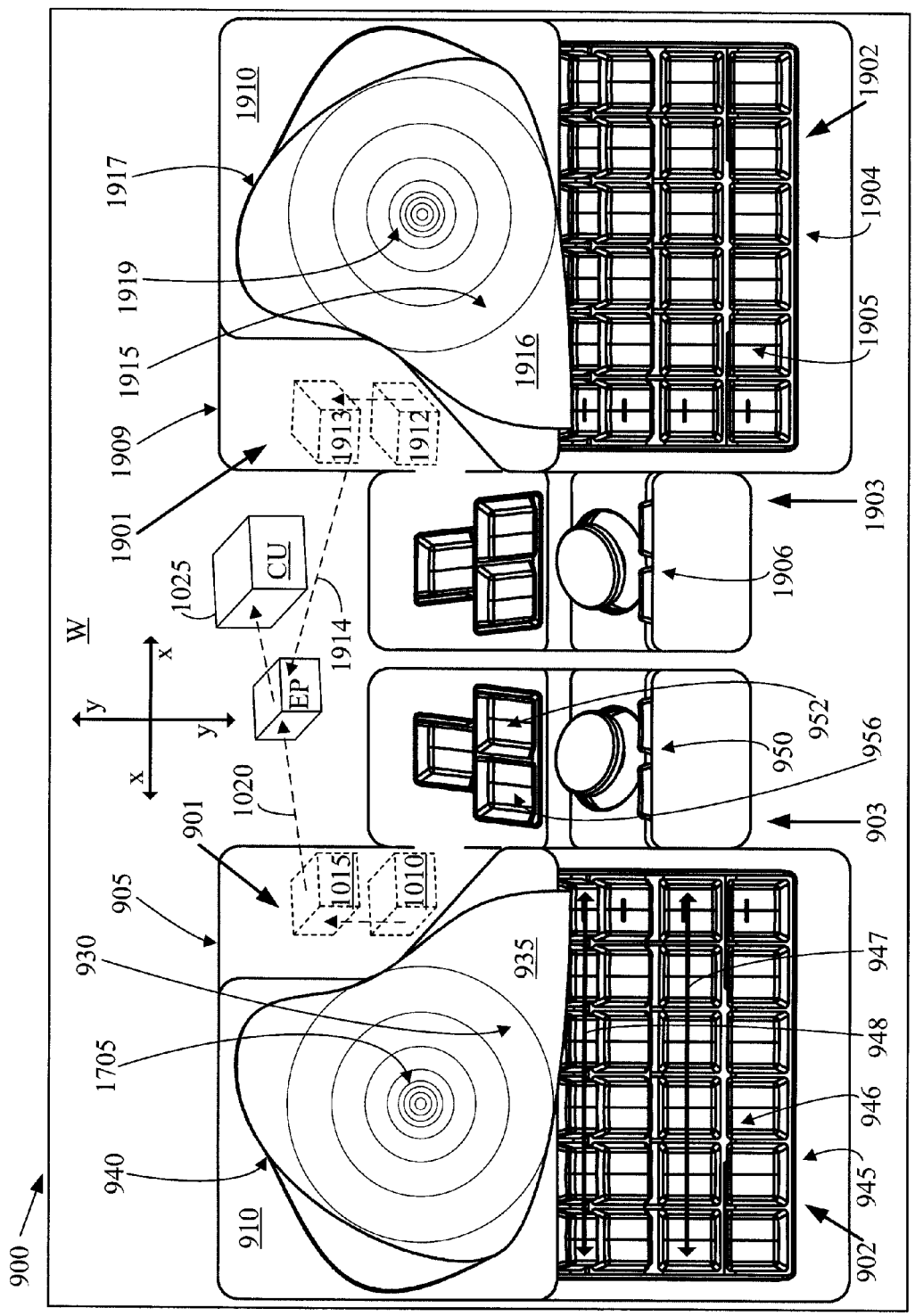
FIG. 19 is a top side view of another example of the system shown in FIG. 17, together with another hand-controllable signal-generating device.
Figure 20:
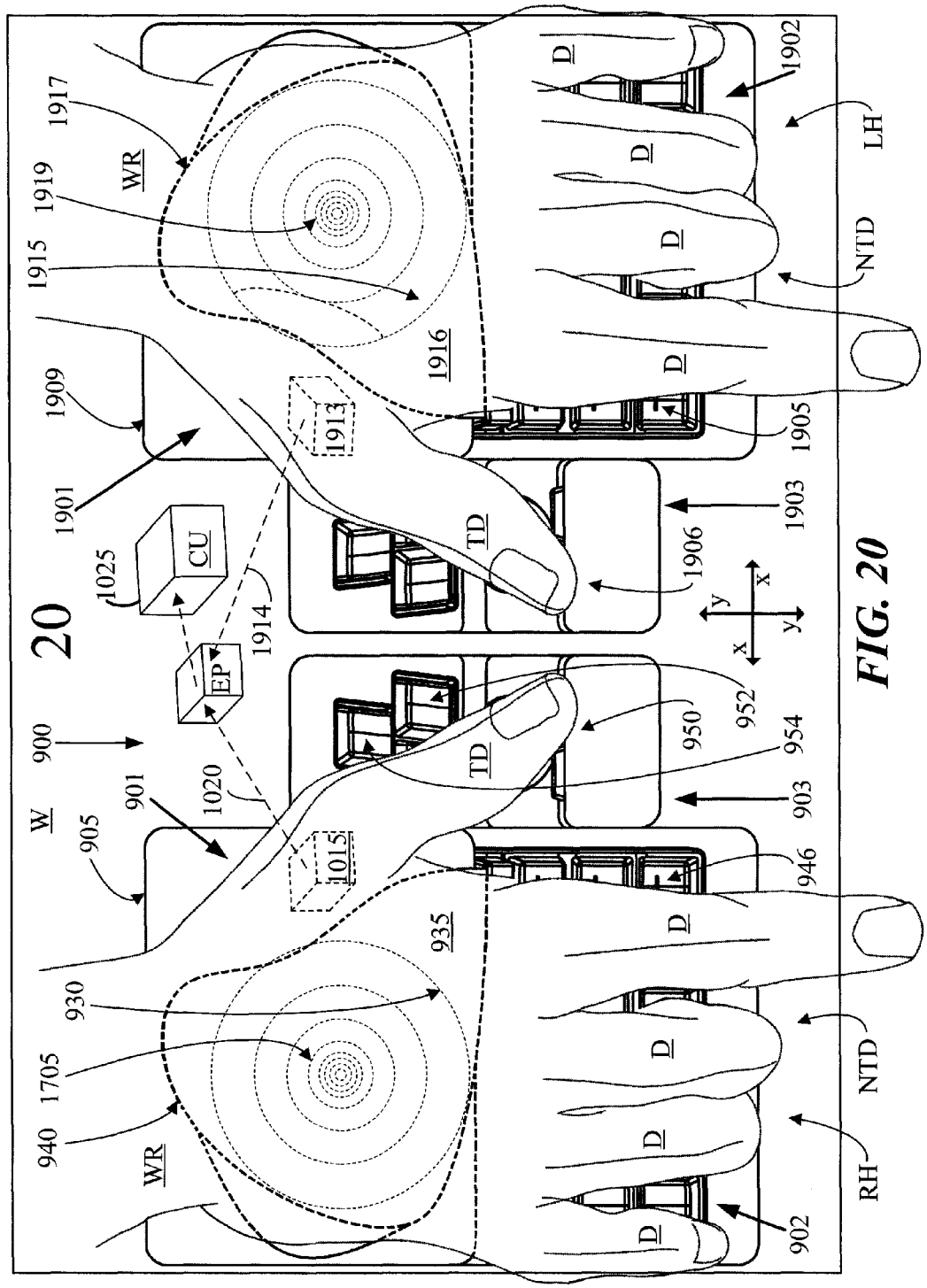
FIG. 20 is another top side view of the another example of the system as shown in FIG. 19, further showing two hands in contact with the another example of the system.

FIG. 9 is a perspective side view showing an example of an implementation of a system [900] including a hand-controllable signal-generating device. FIG. 10 is a left side view, taken in the direction of line 10, of the example of the system [900] as shown in FIG. 9. FIG. 11 is a right side view, taken in the direction of line 11, of the example of the system [900] as shown in FIG. 9. FIG. 12 is a front side view, taken in the direction of line 12, of the example of the system [900] as shown in FIG. 9. FIG. 13 is a back side view, taken in the direction of line 13, of the example of the system [900] as shown in FIG. 9. FIG. 14 is a bottom side view, taken in the direction of line 14 shown in FIG. 10, of the example of the system [900] as shown in FIG. 9. FIG. 15 is another bottom side view, taken in the direction of line 14, showing a person's hand together with the example of the system [900] as shown in FIG. 9. FIG. 16 is a view of the person's hand as shown in FIG. 15, together with a bottom side and a hand rest of the example of the system [900]. FIG. 17 is a top side view, taken in the direction of line 17 as shown in FIG. 9, of the example of the system [900] as shown in FIG. 9. FIG. 18 is another top side view of the example of the system [900] as shown in FIG. 9 taken in the direction of line 17, further showing a person's hand together with the example of the system [900]. FIG. 19 is a top side view of another example of the system [900] shown in FIG. 17, together with another hand-controllable signal-generating device. FIG. 20 is another top side view of the another example of the system [900] as shown in FIG. 19, further showing two hands [H] in contact with the another example of the system [900]. Examples of implementations of apparatus [100] were previously discussed in connection with FIGS. 1-8. Examples of implementations of processes [2100], [2200] are subsequently discussed in connection with FIGS. 21-22. It is understood throughout this specification that the examples of implementations of the systems [900] may be modified as including any of the features or combinations of features that are disclosed in connection with the apparatus [100], or any of the features or combinations of features that are disclosed in connection with either of the processes [2100], [2200]. Accordingly, FIGS. 1-8 and 21-22, and the entirety of the earlier discussion of the apparatus [100], and the entireties of the subsequent discussions of the processes [2100], [2200], are hereby incorporated into the following discussion of the examples of the system [900].

Referring to FIGS. 9-18, an example of a system [900] is shown. The system [900] includes a hand-controllable signal-generating device [901]. The example of a system [900] further has a digit-controllable signal-generating device for generating digit signals [DS], which may include, as examples: a digit-controllable signal-generating device [902]; or a digit-controllable signal-generating device [903]; or both of the digit-controllable signal-generating devices [902] and [903]. In the example of a system [900], the hand-controllable signal-generating device [901] includes a body [905] having a top side [910], and having a bottom side [1005] spaced apart by a distance from and facing away from the top side [910]. The bottom side [1005] is configured for facilitating displacements of the body [905] of the hand-controllable signal-generating device [901] over a working surface [W] in two-dimensional directions [x, y] with the bottom side [1005] facing the working surface [W]. The body [905] has a biaxial-displacement detector [1010] that is configured for generating biaxial displacement signals [BDS] that are representative of detected displacements of the body [905] of the hand-controllable signal-generating device [901] in the two-dimensional directions [x, y] over the working surface [W]. The example of a system [900] further includes a signal transmitter [1015] configured for communicating the biaxial displacement signals [BDS] and the digit signals [DS], as represented by an arrow [1020], to an external electronic processor [EP]. As an example, the signal transmitter [1015] may be integral with the hand-controllable signal-generating device [901]. The body [905] of the hand-controllable signal-generating device [901] has a palm rest [930] on the top side [910]. The palm rest [930] includes a palm contact surface [935] having a contour for receiving a portion [P1] of a palm [P] of a person's hand [H] into contact at a position [940] on the palm contact surface [935]. As further examples, the "contact" by the portion [P1] of the palm [P] at the position [940] may be "substantial contact," wherein "substantial contact" means that the palm contact surface [935] may be contoured for receiving the portion [P1] of the palm [P] of the person's hand [H] into contact with at least about 75% of the surface area of the palm contact surface [935]. As another example, the position [940] may be defined by the perimeter of the palm contact surface [935]. The contour of the palm contact surface [935] of the palm rest [930] is configured for facilitating control of the examples of the digit-controllable signal-generating device(s) [902], [903] for generating the digit signals [DS] by the person's hand [H] simultaneously with control of displacements of the body [905] in the two-dimensional directions [x, y] by the portion [P1] of the palm [P] of the person's hand [H] being in contact at the position [940] on the palm contact surface [935]. As examples, the contour of the palm contact surface [935] of the palm rest [930] may be configured for facilitating simultaneous control: (a) by the person's hand [H] of the examples of the digit-controllable signal-generating device(s) [902], [903] and (b) by the portion [P1] of the palm [P] of the person's hand [H] of displacements of the body [905] over the working surface [W], in the examples of four mutually orthogonal directions indicated by the arrows [941], [942], [943] and [944].

In an example, the system [900] may include a digit-controllable signal-generating device [902] that includes a keyboard [945] having a plurality of digit-controllable keys [946] for generating keyboard control signals. Further, as example, the plurality of the digit-controllable keys [946] may be arranged in a plurality of rows, such as the rows that are schematically indicated by arrows [947], [948]. As examples, the digit-controllable keys [946] may have functions that are pre-programmed or are user-programmable; and may collectively form part or all of a standard keyboard array, such as a QWERTY or DVORAK keyboard. As an additional example, the plurality of the rows [947], [948] of the digit-controllable keys [946] may be arranged in a concave arc as represented by an arrow [1105]. The arrangement of the rows [947], [948] of the digit-controllable keys [946] in the concave arc [1105] may be configured, for example, as placing each one of the plurality of the digit-controllable keys [946] in a position suitable for being controlled by the one digit [D] or by a one of the plurality of the digits [D] of the person's hand [H] simultaneously with the portion [P1] of the palm [P] of the person's hand [H] being in contact at the position [940] on the palm contact surface [935]. In another example, the system [900] may have another digit-controllable signal-generating device [903] that includes a thumb-controllable joystick [950] for generating joystick control signals. Further, for example, the system [900] may include, as digit-controllable signal-generating device(s), one or a plurality of digit-controllable key(s) [952], [954], [956] for generating key control signals, which may be located adjacent to the thumb-controllable joystick [950]. In an additional example, the system [900] may include, in combination: a digit-controllable signal-generating device [902] that includes a keyboard [945] having a plurality of digit-controllable keys [946]; and also a digit-controllable signal-generating device [903] that includes a thumb-controllable joystick [950]; and also one or a plurality of digit-controllable key(s) [952], [954], [956], which may for example be located adjacent to the thumb-controllable joystick [950]. It is understood throughout this specification that the system [900] may include one or a plurality of digit-controllable signal-generating devices, of which each of the digit-controllable signal-generating devices [902], [903], [952], [954], and [956] shown in FIGS. 9-20 is an example. Further, the one or plurality of the digit-controllable signal-generating devices as included in the system [900] may each independently be selected as having, for example: a keyboard [945] including a plurality of digit-controllable keys [946]; a thumb-controllable joystick [950]; a digit-controllable key [952], [954], [956]; or (not shown), another type of digit-controllable signal-generating device, examples of which include a touch-screen, a track ball, a scroll-wheel, or a scroll-ball. In other examples (not shown), the system [900] may include one or a plurality of digit-controllable signal-generating device(s) [902], [903], [952], [954], and [956], each of which independently may be located at a position in the system [900] relative to the palm rest [930] being different than its relative position in the example of a system [900] as shown in FIGS. 9-20. In such other examples of the system [900], each of these different positions may be configured as being suitable for facilitating simultaneous control: (a) by the person's hand [H] of the digit-controllable signal-generating device(s) [902], [903], [952], [954], and [956]; and (b) by the portion [P1] of the palm [P] of the person's hand [H], in contact at the position [940] on the palm contact surface [935], of displacements of the body [905] in the two-dimensional directions [x, y] over the working surface [W].

FIGS. 15, 16, 18 and 20 further show a person's hand [H] in contact at the position [940] on the palm contact surface [935] of the hand-controllable signal-generating device [901] of the example of a system [900]. As an example, the position [940] may be defined by the perimeter of the palm contact surface [935]. In an example, the person's hand [H] may have five digits [D], including a thumb digit [TD] and four non-thumb digits [NTD]. In examples, the contour of the palm contact surface [935] of the palm rest [930] may be configured for facilitating control by the portion [P1] of the palm [P] of the person's hand [H] of the displacements of the system [900] in the two-dimensional directions [x, y] over the working surface [W] from the position [940], without the one digit [D] or any of the plurality of the digits [D] of the person's hand [H] being in contact with the hand-controllable signal-generating device [901]. As additional examples, the contour of the palm contact surface [935] of the palm rest [930] may be configured for guiding the one digit [D] or all of the plurality of the digits [D] of the person's hand [H] away from the palm contact surface [935] simultaneously while receiving the portion [P1] of the palm [P] of the person's hand [H] into contact at the position [940] on the palm contact surface [935]. In a further example as earlier discussed, the system [900] may include, as shown in FIGS. 9-20: the digit-controllable signal-generating device [902] that includes the keyboard [945] having the plurality of digit-controllable keys [946]; and the digit-controllable signal-generating device [903] that includes the thumb-controllable joystick [950] and that further may include the plurality of digit-controllable key(s) [952], [954] [956] being located adjacent to the thumb-controllable joystick [950]. In that further example, the contour of the palm contact surface [935] of the palm rest [930] may be configured for positioning the one digit [D] or all of the plurality of the digits [D] of the person's hand [H] as being substantially unencumbered by the palm contact surface [935] when the portion [P1] of the palm [P] of the person's hand [H] is in contact at the position [940] on the palm contact surface [935]. As earlier discussed, the term "substantially unencumbered" means that the one digit [D] or all of the plurality of the digits [D] of the person's hand [H], for example five digits [D], can collectively operate the digit-controllable signal-generating devices [902], [903], [952], [954] [956] simultaneously while the portion [P1] of the palm [P] of the person's hand [H] is in contact at the position [940] on the palm contact surface [935].

In an example of operation, a person may place the system [900] on a working surface [W] with the bottom side [1005] of the body [905] of the hand-controllable signal-generating device [901] facing the working surface [W]. For example, the working surface [W] may be a desk top. The person may then place a portion [P1] of a palm [P] of the person's hand [H] into contact with the palm contact surface [935] at the position [940]. Using only the portion [P1] of the palm [P] of the person's hand [H], the person may then displace the system [900] over the working surface [W] in the two-dimensional directions [x, y], including the examples of such directions represented by the arrows [941], [942], [943], and [944]. In addition, for example, the digit-controllable signal-generating device(s) [902], [903] may be positioned relative to the palm rest [930] so that the digit-controllable signal-generating device(s) [902], [903] may be controlled by the one digit [D] or by a one of the plurality of the digits [D] of the person's hand [H] for generating digit signals [DS] simultaneously with generating biaxial displacement signals [BDS] by the portion [P1] of the palm [P] of the person's hand [H] being in contact at the position [940] on the palm contact surface [935]. The contour of the palm contact surface [935] of the palm rest [930] is configured for facilitating accurate control by the portion [P1] of the palm [P] of the person's hand [H], being in contact at the position [940] on the palm contact surface [935], of the displacements of the system [900] in the two-dimensional directions [x, y] over the working surface [W]. In an example, the shape of the palm contact surface [935] of the palm rest [930] may facilitate displacement of the system [900] over the working surface [W] in the two-dimensional directions [x, y] without the one digit [D] or any of the plurality of the digits [D] of the person's hand [H] making any contact with or applying any force to the hand-controllable signal-generating device [901]. Further, for example, the shape of the palm contact surface [935] of the palm rest [930] may facilitate displacement of the system [900] by the portion [P1] of the palm [P] of the person's hand [H] over the working surface [W] in the two-dimensional directions [x, y] without the one digit [D] or any of the plurality of the digits [D] of the person's hand [H] making any contact with or applying any force to the system [900]. The biaxial-displacement detector [1010] detects the displacements of the system [900] in the two-dimensional directions [x, y] over the working surface [W], and generates biaxial displacement signals [BDS] that are representative of the detected biaxial displacements. The signal transmitter [1015] of the hand-controllable signal-generating device [901] is in communication with the biaxial-displacement detector [1010] in the same manner as earlier discussed regarding the biaxial-displacement detector [120] and the signal transmitter [125] in the example of a device [100]. The signal transmitter [1015] communicates, as represented by the arrow [1020], the biaxial displacement signals [BDS] and the digit signals [DS] to an external electronic processor [EP]. As an example, the electronic processor [EP] may include a microprocessor. For example, the signal transmitter [1015] may be integral with or otherwise in signal communication with the biaxial-displacement detector [1010]. Further, for example, the signal transmitter [1015] may be in wired, wireless, optical, or another form of electromagnetic radiation-based communication with the external electronic processor [EP]. As another example, the external electronic processor [EP] may include or be in communication with a graphical user interface [1025]. Further, for example, the graphical user interface [1025] may display a cursor [CU]. In that example, the biaxial-displacement detector [1010] may be configured for generating the biaxial displacement signals [BDS] as being cursor control signals.

In examples, the palm contact surface [935] of the palm rest [930] may be shaped for receiving the portion [P1] of the palm [P] of the person's hand [H] into contact at a position [940] on the palm contact surface [935], wherein the position [940] may be a substantially-fixed position relative to the person's hand [H]. Likewise as earlier discussed, it is understood that the term "substantially-fixed position" means a position [940] on the palm contact surface [935] relative to a person's hand [H] that varies, through a series of ten or more iterations of placing a portion [P1] of the palm [P] of the hand [H] on the palm rest [930], by an average of about one centimeter or less in any two-dimensional direction [x, y]. As a further example, the palm contact surface [935] of the palm rest [930] may be shaped for repeatedly receiving the portion [P1] of the palm [P] of the person's hand [H] into contact at such a substantially-fixed position [940] on the palm contact surface [935].

In an example, the system [900] may include the digit-controllable signal-generating device [902] as having a body [957] that includes the keyboard [945] having the plurality of digit-controllable keys [946]. The body [957] may, for example, have side walls [958], [960] being sized for defining the concave arc [1105] in which the rows [947], [948] of the digit-controllable keys [946] may be arranged. Further, for example, the body [905] of the hand-controllable signal-generating device [901] may have side walls [964], [966], [968] being sized for positioning the palm rest [930] relative to the keyboard [945]. For example, the side walls [964], [966], [968] may be suitably sized for positioning the palm rest [930] relative to the keyboard [945] so that each one of the plurality of the digit-controllable keys [946] can be controlled by the one digit [D] or by a one of the plurality of the digits [D] of the person's hand [H] simultaneously with the portion [P1] of the palm [P] of the person's hand [H] being in contact at the position [940] on the palm contact surface [935]. In an alternative example, the body [957] may instead have a frame (not shown) being sized for defining the concave arc [1105] in which the rows [947], [948] of the digit-controllable keys [946] may be arranged. As a further alternative example, the body [905] of the hand-controllable signal-generating device [901] may instead have a frame (not shown) being sized for positioning the palm rest [930] relative to the keyboard [945]. For example, the frame of the body [905] may be suitably sized for positioning the palm rest [930] relative to the keyboard [945] so that each one of the plurality of the digit-controllable keys [946] can be controlled by the one digit [D] or by a one of the plurality of the digits [D] of the person's hand [H] simultaneously with the portion [P1] of the palm [P] of the person's hand [H] being in contact at the position [940] on the palm contact surface [935]. In these examples of the system [900], the top side [910] may be spaced apart from the bottom side [1005] by a distance, for example, within a range of between about four centimeters and about ten centimeters. In additional examples, the top side [910] may be generally flat, as facilitating the mounting of the palm rest [930] on the top side [910] of the hand-controllable signal-generating device [901]. As a further example (not shown), the top side [910] and the palm rest [930] may be integrally constructed. Additionally, for example, the body [957] may have a bottom side [1125] being configured for facilitating displacements of the body [957] over the working surface [W] in two-dimensional directions [x, y] with the bottom side [1005] facing the working surface [W]. For example, the bottom side [1125] may be generally flat. Further, for example, the body [957] may be constructed integrally with the body [905]. Additionally, for example, the bottom side [1005] may be constructed integrally with the bottom side [1125].

In an example, the system [900] may include the digit-controllable signal-generating device [903] as having a body [970] that includes the thumb-controllable joystick [950] and the plurality of digit-controllable key(s) [952], [954], [956], [1017]. The body [970] may, for example, have side walls [972], [974] being sized for defining a concave arc [1040] in which the thumb-controllable joystick [950] and the plurality of digit-controllable key(s) [952], [954], [956], [1017] may be arranged. Further, for example, the body [905] of the hand-controllable signal-generating device [901] may have the side walls [964], [966], [968] being sized for positioning the palm rest [930] in the example of a system [900] relative to the thumb-controllable joystick [950]. For example, the side walls [964], [966], [968] may be suitably sized for positioning the palm rest [930] so that the thumb-controllable joystick [950] and each one of the plurality of digit-controllable key(s) [952], [954], [956] can be controlled by the thumb digit [TD] of the person's hand [H] simultaneously with the portion [P1] of the palm [P] of the person's hand [H] being in contact at the position [940] on the palm contact surface [935]. In an alternative example, the body [970] may instead have a frame (not shown) being sized for defining the concave arc [1040] in which the thumb-controllable joystick [950] and the plurality of digit-controllable key(s) [952], [954], [956], [1017] may be arranged. As a further alternative example, the body [905] of the hand-controllable signal-generating device [901] may instead have a frame (not shown) being sized for positioning the palm rest [930] relative to the thumb-controllable joystick [950]. For example, the frame of the body [905] may be suitably sized for positioning the palm rest [930] so that the thumb-controllable joystick [950] and each one of the plurality of digit-controllable key(s) [952], [954], [956] can be controlled by the thumb digit [TD] of the person's hand [H] simultaneously with the portion [P1] of the palm [P] of the person's hand [H] being in contact at the position [940] on the palm contact surface [935]. In these examples of the system [900], the top side [910] may be spaced apart from the bottom side [1005] by a distance, for example, being within a range of between about four centimeters and about ten centimeters. Additionally, for example, the body [970] may have a bottom side [1055] being configured for facilitating displacements of the body [970] over the working surface [W] in two-dimensional directions [x, y] with the bottom side [1005] facing the working surface [W]. For example, the bottom side [1055] may be generally flat. Further, for example, the body [970] may be constructed integrally with the body [905]. Further, for example, the bottom side [1005] may be constructed integrally with the bottom side [1055].

In a further example where the system [900] may include the digit-controllable signal-generating devices [902] and [903], the body [957] of the digit-controllable signal-generating device [902] and the body [970] of the digit-controllable signal-generating device [903] may both be constructed as having an integral housing together with the body [905] of the hand-controllable signal-generating device [901]. Further, for example, the bottom side [1125] and the bottom side [1055] may be constructed integrally together with the bottom side [1005].

In examples of the system [900], the biaxial-displacement detector [1010] may be located at the bottom side [1005] of the body [905] of the hand-controllable signal-generating device [901]. As an example, the biaxial-displacement detector [1010] may include a visible-, ultraviolet-, or infrared-light emitter/detector. Alternatively, as examples (not shown), the biaxial-displacement detector [1010] may include a light-detecting or mechanical—track-ball, scroll-wheel, or scroll-ball. Further, for example, the biaxial-displacement detector [1010] may be configured for generating the biaxial displacement signals [BDS] as being cursor control signals. In that example, the hand-controllable signal-generating device [901] may function as a computer mouse for controlling displacements of a cursor [CU] in two-dimensional directions [x, y] on a graphical user interface [1025]. As examples, the graphical user interface [1025] may include a display screen of a computer, tablet, smart-phone, or the like. In further examples, the biaxial-displacement detector [1010] may be configured for generating the biaxial displacement signals [BDS] as being keyboard control signals or joystick control signals. In additional examples, the biaxial-displacement detector [1010] may be configured for generating the biaxial displacement signals [BDS] as being control signals for additionally or instead causing the movement of non-cursor images on the graphical user interface [1025].

In an example, the palm rest [930] may be adjustably mounted on the top side [910] of the body [905] of the hand-controllable signal-generating device [901]. As another example of the system [900], the palm rest [930] may be mounted on a post [1045] over the top side [910] of the body [905]. Further, for example, the palm rest [930] may be adjustably mounted on the post [1045] over the top side [910] of the body [905] of the hand-controllable signal-generating device [901]. For example, a length of the post [1045] may be adjustable, so that an elevation, as represented by the arrow [1110], of the palm rest [930] above the bottom side [1005] at a point of attachment [1115], may accordingly be changed. As further examples, a location of the palm rest [930] over the top side [910] of the body [905] may be adjustable relative to the two-dimensional directions [x, y]. In these further examples, the location in the two-dimensional directions [x, y] of the palm rest [930] relative to the keyboard [945] or relative to the thumb-controllable joystick [950] may be adjusted for the hand [H] of a particular person. In additional examples, the palm rest [930] may be mounted on the top side [910] of the body [905] with the palm rest [930] being adjustable: side-to-side; or as to tilt angles relative to the top side [910] including, as examples, pitch, yaw and roll.

In examples of the system [900], and referring to FIGS. 16, 17 and 18, the palm contact surface [935] of the palm rest [930] of the hand-controllable signal-generating device [901] may include a mound [1705] having a peak [1706] surrounded by downwardly-sloping sides represented by a series of concentric circles shown in FIG. 17, the downwardly-sloping sides of the mound [1705] including: a first portion [1710]; a second portion [1715]; a third portion [1720]; and a fourth portion [1725]. The mound [1705] may, for example, have a convex shape culminating at the peak [1706] as shown in FIG. 17; and may have overall dimensions being suitable for being received into a concave palm [P] of a person's hand [H]. Further, for example, the mound [1705] may have a convex contour as shown in FIG. 17.

In these examples, the portion [P1] of the palm [P] of the person's hand [H] may include a first part [P1A] that is nearest to a wrist [WR] of the person; and the first part [P1A] of the portion [P1] of the palm [P] may be received into contact on the first portion [1710] of the downwardly-sloping sides of the mound [1705] when the portion [P1] of the palm [P] is at the position [940] on the palm contact surface [935]; and the first portion [1710] of the downwardly-sloping sides of the mound [1705] may have a first attached upwardly-sloping lip [1730].

In additional examples, and referring to FIGS. 16, 17 and 18, the palm contact surface [935] of the palm rest [930] may likewise include the mound [1705] having the peak [1706] surrounded by the downwardly-sloping sides represented by a series of concentric circles shown in FIG. 17, including the first portion [1710], the second portion [1715], the third portion [1720], and the fourth portion [1725], and in addition: the portion [P1] of the palm [P] of the person's hand [H] may include a second part [P1B] that is farthest from the person's thumb digit [TD]; and the second part [P1B] of the portion [P1] of the palm [P] may be received into contact on the second portion [1715] of the downwardly-sloping sides of the mound [1705] when the portion [P1] of the palm [P] is at the position [940] on the palm contact surface [935]; and the second portion [1715] of the downwardly-sloping sides of the mound [1705] may have a second attached upwardly-sloping lip [1735].

In further examples, and referring to FIGS. 16, 17 and 18, the palm contact surface [935] of the palm rest [930] may likewise include the mound [1705] having the peak [1706] surrounded by the downwardly-sloping sides represented by a series of concentric circles shown in FIG. 17 including the first portion [1710], the second portion [1715], the third portion [1720], and the fourth portion [1725], and in addition: the palm [P] of the person's hand [H] may include another portion [P2] being nearest to the thumb digit [TD] of the person's hand [H], and the palm contact surface [935], including for example the third portion [1720] of the mound [1705], may be shaped for guiding the another portion [P2] of the palm [P] away from the palm contact surface [935] simultaneously while receiving the portion [P1] of the palm [P] of the person's hand [H] into contact at the position [940] on the palm contact surface [935].

In other examples, and referring to FIGS. 16, 17 and 18, the palm contact surface [935] of the palm rest [930] may likewise include the mound [1705] having the peak [1706] surrounded by the downwardly-sloping sides represented by a series of concentric circles shown in FIG. 17, including the first portion [1710], the second portion [1715], the third portion [1720], and the fourth portion [1725], and in addition: the palm [P] of the person's hand [H] may include an additional portion [P3] being nearest to the one non-thumb digit [NTD] or to the plurality of the non-thumb digits [NTD] of the person's hand [H], and the palm contact surface [935], including for example the fourth portion [1725] of the mound [1705], may be shaped for guiding the additional portion [P3] of the palm [P] away from the palm contact surface [935] simultaneously while receiving the portion [P1] of the palm [P] of the person's hand [H] into contact at the position [940] on the palm contact surface [935].

As a further example, the palm contact surface [935] of the palm rest [930] may likewise include the mound [1705] having the peak [1706] surrounded by the downwardly-sloping sides represented by a series of concentric circles shown in FIG. 17, including the first portion [1710], the second portion [1715], the third portion [1720], and the fourth portion [1725], and in addition: the first portion [1710] of the mound [1705] may have the first attached upwardly-sloping lip [1730]; and the second portion [1715] of the mound [1705] may have the second attached upwardly-sloping lip [1735]; and the palm contact surface [935], including for example the third and fourth portions [1720], [1725] of the mound [1705], may be shaped for guiding the another portion [P2] and the additional portion [P3] of the palm [P] away from the palm contact surface [935] simultaneously while receiving the portion [P1] of the palm [P] of the person's hand [H] into contact at the position [940] on the palm contact surface [935]. Further in this example, the first upwardly-sloping lip [1730] and the first portion [1710] of the downwardly-sloping sides of the mound [1705] may together define a first concave trough schematically indicated by a dashed line [1740]. Additionally in this example, the second upwardly-sloping lip [1735] and the second portion [1715] of the downwardly-sloping sides of the mound [1705] may together define a second concave trough schematically indicated by a dashed line [1745]. In an example, the concave contour of the first trough [1740] may be shaped for receiving the first part [P1A] of the portion [P1] of the palm [P] of the person's hand [H] when the portion [P1] of the palm [P] is at the position [940] on the palm contact surface [935]. Further, for example, the concave contour of the second trough [1745] may be shaped for receiving the second part [P1B] of the portion [P1] of the palm [P] of the person's hand [H] when the portion [P1] of the palm [P] is at the position [940] on the palm contact surface [935]. As a further example, the contour of the palm contact surface [935] may, by receiving the first part [P1A] of the palm [P] in the first trough [1740] and by receiving the second part [P1B] of the palm [P] in the second trough [1745], facilitate control of rotations of the body [905] over the working surface [W] in the two-dimensional directions [x, y] by the portion [P1] of the palm [P] of the person's hand [H]. As an additional example, the contour of the palm contact surface [935] may, by receiving the first part [P1A] of the palm [P] in the first trough [1740] and by receiving the second part [P1B] of the palm [P] in the second trough [1745], facilitate control by the portion [P1] of the person's hand [H] of forces generated by operation of the digit-controllable signal generating devices [902], [903] that may otherwise tend to cause rotation of the body [905] over the working surface [W] in the two-dimensional directions [x, y].

In further examples, the position [940] may be defined by the perimeter of the palm contact surface [935]; and the palm contact surface [935] may be contoured for receiving the portion [P1] of the palm [P] of the person's hand [H] into contact at the perimeter [940] of the palm contact surface [935]. The contour of the palm contact surface [935] of the palm rest [930] may be configured for facilitating control by the portion [P1] of the palm [P] of the person's hand [H], being in contact at the perimeter [940] on the palm contact surface [935], of the displacements of the body [905] in the two-dimensional directions [x, y]. In additional examples, the position [940], as being defined by the perimeter [940] of the palm contact surface [935], may be a substantially-fixed position relative to the portion [P1] of a palm [P] of a hand [H]. As further examples, the "contact" by the portion [P1] of the palm [P] at the perimeter [940] may be "substantial contact," wherein "substantial contact" means that the palm contact surface [935] may be contoured for receiving the portion [P1] of the palm [P] of the person's hand [H] into contact with at least about 75% of the length of the perimeter [940].

As another example of the system [900], the palm rest [930] of the hand-controllable signal-generating device [901] may be pivotally mounted over the top side [910] of the body [905]. For example, the post [1045] may be a joystick that is mounted on the top side [910] of the body [905], on which the palm rest [930] may be mounted. Further, for example, the joystick [1045] may include an angular-displacement detector [1050]. As examples, the angular-displacement detector [1050] may be configured for generating angular-displacement signals [AS] that are representative of detected angular displacements of the palm rest [930] over the top side [910] of the body [905] of the hand-controllable signal-generating device [901]; and the signal transmitter [1015] may be configured for communicating, as represented by the arrow [1020], the angular-displacement signals [AS] to the external electronic processor [EP]. As examples, the angular-displacement signals [AS] may differentiate between angular displacements of the joystick [1045] as being pitch-, yaw-, or roll-movements relative to the body [905], or as being twisting movements of the joystick [1045] around the top side [910]. In additional examples, the joystick [1045] may include a compressive force detector [1120]. As examples, the compressive force detector [1120] may be configured for generating compressive force signals [FS] that are representative of detected compressive forces applied by the portion [P1] of the palm [P] of the person's hand [H] to the palm rest [930] in the direction of the downward portion of the arrow [1110] towards the top side [910] of the body [905]; and the signal transmitter [1015] may be configured for communicating, as represented by the arrow [1020], the compressive force signals [FS] to the external electronic processor [EP].

In a further example of the system [900], the hand-controllable signal-generating device [901] may include a rotational-displacement detector [1405] being configured for generating rotational displacement signals [RS] that are representative of detected rotational displacements of the body [905] in the two-dimensional directions [x, y] over the working surface [W]; and the signal transmitter [1015] may be configured for communicating, as represented by the arrow [1020], the rotational displacement signals [RS] to the external electronic processor [EP]. In examples, the rotational-displacement detector [1405] may include a gyroscope, accelerometer, or compass. As an additional example, the biaxial-displacement detector [1010] may be located at the bottom side [1005] of the body [905] of the hand-controllable signal-generating device [901]; and the hand-controllable signal-generating device [901] may include an additional biaxial-displacement detector [1410] that is located at the bottom side [1005] of the body [905] of the hand-controllable signal-generating device [901]. In that additional example, the additional biaxial-displacement detector [1410] may be spaced apart from the biaxial-displacement detector [1010] by a distance being suitable for facilitating the functioning of the biaxial-displacement detectors [1010], [1410] together as a rotational-displacement detector. In further examples (not shown), the biaxial-displacement detector [1010] and the additional biaxial-displacement detector [1410] may each independently be located in the body [905], [957], or [970]; and may each independently be located at the bottom side [1005], [1125], or [1055]. It is understood throughout this specification that the signal transmitter [1010] may be further configured for communicating, in any combination or sequence to the external electronic processor [EP] as represented by the arrow [1020]: the digit signals [DS]; and the biaxial displacement signals [BDS]; and the angular-displacement signals [AS]; and the compressive force signals [FS]; and the rotational displacement signals [RS]. It is further understood throughout this specification that each of the signals [DS], [BDS], [AS], [FS] and [RS] that may be generated by hand-controlled operation of the system [900] may be utilized for controlling an external display such as a cursor [CU] or for controlling an object, which may be, as an example, a motorized moveable object such as a vehicle.

FIG. 19 is a top side view of another example of the system [900] shown in FIG. 17, including another hand-controllable signal-generating device [1901]. FIG. 20 is another top side view of the another example of the system [900] as shown in FIG. 19, further showing two hands in contact with the another example of the system [900]. Referring to FIG. 19, the another example of the system [900] may include another hand-controllable signal-generating device [1091] being integral with: a further digit-controllable signal-generating device [1902] for generating digit signals [DS]; and an additional digit-controllable signal-generating device [1093] for generating digit signals [DS]. In examples, the further digit-controllable signal-generating device [1902] may include another keyboard [1904] having another plurality of digit-controllable keys [1905]; and the additional digit-controllable signal-generating device [1903] may include another thumb-operable joystick [1906].

The another hand-controllable signal-generating device [1901] may include a body [1909] being analogous to the body [905], the body [1909] having a top side [1910], and having a bottom side (not shown) being analogous to the bottom side [1005] and being spaced apart by a distance from and facing away from the top side [1910]. The bottom side of the another hand-controllable signal-generating device [1901] is configured for facilitating displacements of the body [1909] over the working surface [W] in two-dimensional directions [x, y] with the bottom side facing the working surface [W]. The body [1909] has a biaxial-displacement detector [1912] that is configured for generating biaxial displacement signals [BDS] that are representative of detected displacements of the body [1909] of the hand-controllable signal-generating device [1901] in the two-dimensional directions [x, y] over the working surface [W]. The hand-controllable signal-generating device [1901] is further integral with a signal transmitter [1913] configured for communicating, as indicated by an arrow [1914], the biaxial displacement signals [BDS] and the digit signals [DS] to the external electronic processor [EP]. In another example, the signal transmitter [1015] may be configured for communicating biaxial displacement signals [BDS] and digit signals [DS] to the external electronic processor [EP]; and the signal transmitter [1913] may be configured for communicating biaxial displacement signals [BDS] and digit signals [DS] to another external electronic processor (not shown). The body [1909] of the another hand-controllable signal-generating device [1901] has a palm rest [1915] on the top side [1910]. The palm rest [1915] includes a palm contact surface [1916] having a contour for receiving a portion [P1] of a palm [P] of a person's hand [H] into contact at a position [1917] on the palm contact surface [1916], in a manner analogous to that discussed regarding the palm rest [930] in connection with FIGS. 15-18. The contour of the palm contact surface [1916] of the palm rest [1915] is configured for facilitating control of the digit-controllable signal-generating devices [1902] and [1903] for generating digit signals [DS] by the person's hand [H], simultaneously with control of displacements of the body [1909] in the two-dimensional directions [x, y] over the working surface [W] by the portion [P1] of the palm [P] of the person's hand [H] in contact at the position [1917] on the palm contact surface [1916]. In examples of the system [900], the palm contact surface [1916] of the palm rest [1915] of the hand-controllable signal-generating device [1901] may include a mound [1919], being analogous to the mound [1705] as discussed in connection with FIGS. 16, 17 and 18, having a peak surrounded by downwardly-sloping sides represented by a series of concentric circles shown in FIG. 19.

It is understood throughout this specification that each of the hand-controllable signal-generating devices [901] and [1901] may include one or a plurality of digit-controllable signal-generating devices, of which each of the digit-controllable signal-generating devices [902], [903], [1902], and [1903] shown in FIGS. 9-20 is an example. Further, each of the examples [902], [903], [1902], and [1903] of digit-controllable signal-generating devices as are included in the examples of the system [900] may independently be selected as having, for example: a keyboard [945], [1904] including a plurality of digit-controllable keys [946], [1905]; a thumb-controllable joystick [950], [1906]; or (not shown), another type of digit-controllable signal-generating device, examples of which include a digit-controllable key, a touch-screen, a track ball, a scroll-wheel, or a scroll-ball. As examples, the digit-controllable keys [946], [1905] may have functions that are pre-programmed or are user-programmable; and may collectively form part or all of a standard keyboard array, such as a QWERTY or DVORAK keyboard. In other examples (not shown), each of the hand-controllable signal-generating devices [901] and [1901] may include any one or any combination of the further examples of variations of the features as were earlier discussed regarding the digit-controllable signal-generating device(s) [902], [903].

Referring to FIG. 20, the another example of the system [900] of FIG. 19 is shown, with a right hand [RH] and a left hand [LH] respectively being in contact with the hand-controllable signal-generating devices [901] and [1901]. FIG. 20 further shows a person's right hand [RH] in contact at the position [940] on the palm contact surface [935] of the palm rest [930] on the hand-controllable signal-generating device [901]. Further, FIG. 20 shows a person's left hand [LH] in contact at the another position [1917] on the palm contact surface [1916] of the another palm rest [1915] of the another hand-controllable signal-generating device [1901]. As examples, the digit-controllable keys [946], [1905] may collectively form part or all of a standard keyboard array, such as a QWERTY or DVORAK keyboard. In an example of operation, a person may place the another example of the system [900] on a working surface [W] with the bottom side [1005] of the body [905] of the hand-controllable signal-generating device [901], and the analogous bottom side (not shown) of the body [1909] of the another hand-controllable signal-generating device [1901], both facing the working surface [W]. For example, the working surface [W] may be a desk top. The person may then, as an example: place a portion [P1] of a palm [P] of the person's right hand [RH] into contact with the palm rest [930] at the position [940] on the palm contact surface [935] as was discussed in connection with FIGS. 15-18; and may analogously place another portion [P1] of another palm [P] of the person's left hand [LH] into contact with the palm contact surface [1916] at the position [1917] on the palm rest [1915]. Using only the portions [P1] of the palms [P] of the person's hands [LH], [RH], the person may then displace each of the hand-controllable signal-generating devices [901] and [1901] independently over the working surface [W] in the two-dimensional directions [x, y]. The contours of the palm contact surfaces [935], [1916] of the palm rests [930], [1915] are configured for facilitating accurate control by the portions [P1] of the palms [P] of the person's hands [LH], [RH], being in contact at the positions [940], [1917] on the palm contact surfaces [935], [1916], of the displacements of each of the hand-controllable signal-generating devices [901], [1901] of the another example of the system [900] in the two-dimensional directions [x, y] over the working surface [W]. In further examples (not shown) the another example of the system [900] may include sensitivity modulator(s) for either or both of the biaxial-displacement detectors [1010], [1912]. In those further examples, the sensitivity modulator(s) may be utilized to vary the relative sensitivities of the biaxial-displacement detectors [1010], [1912] to the displacements of the respective hand-controllable signal-generating devices [901], [1901] in the two-dimensional directions [x, y] over the working surface [W]. As examples, the sensitivity modulator(s) may be utilized by: causing the biaxial displacement signals [BDS] from one of the biaxial-displacement detectors [1010], [1912] to over-ride or be averaged together with the biaxial displacement signals [BDS] from another of the biaxial-displacement detectors [1010], [1912]; or to de-activate either or both of the biaxial-displacement detectors [1010], [1912].

In another example, two different persons may each place a portion [P1] of a palm [P] of one of their hands [H], one being a right hand [RH] and the other being a left hand [LH], in contact respectively on the palm rests [930], [1915] at the corresponding positions [940], [1917] on the palm contact surfaces [935], [1916]. The biaxial-displacement detectors [1010], [1912] respectively detect the displacements of the first and second hand-controllable signal-generating devices [901], [1901] in the two-dimensional directions [x, y] over the working surface [W]; and generate biaxial displacement signals [BDS] that are representative of the detected biaxial displacements. The signal transmitters [1015], [1913] may communicate the biaxial displacement signals [BDS] to the same external electronic processor [EP], or may each communicate such respective signals to separate external electronic processors (not shown). As an example, the electronic processor(s) [EP] may include a microprocessor. For example, the signal transmitters [1015], [1913] may be integral with or otherwise in signal communication with the respective biaxial-displacement detectors [1010], [1912]. Further, for example, the signal transmitters [1015], [1913] may be in wired, wireless, optical, or another form of electromagnetic radiation-based communication with the external electronic processor(s) [EP]. As another example, the external electronic processor(s) [EP] may include graphical user interface(s) [GUI] for displaying, as an example, cursor(s) [CU]. In that example, the biaxial-displacement detectors [1010], [1912] may be configured for generating the biaxial displacement signals [BDS] as being cursor control signals.

The apparatus [100] and the systems [900] may generally be utilized in end-use applications for hand-controllable signal-generating devices and systems. For example, the apparatus [100] and the systems [900] may be broadly utilized in end-use applications for generating biaxial displacement signals [BDS] by causing a person's hand [H] to displace the devices [100] and systems [900] in two-dimensional directions [x, y] over a working surface [W]. The biaxial displacement signals [BDS] may be utilized, for example, as controlling two-axis [x, y] movement of an object or an image. As an example, the biaxial displacement signals [BDS] may be utilized as controlling two-axis [x, y] movement of an image displayed on a graphical user interface [128], [1025], such as a cursor [CU]. The digit-controllable signal-generating devices [902], [903], [1902], [1903] that are included in the systems [900] may facilitate utilization of the systems [900] in end-use applications where the generation of additional signals together with such biaxial displacement signals [BDS] may be needed. For example, a system [900] having a digit-controllable signal-generating device [902], [1902] that includes a keyboard [945], [1904] may be utilized for concurrently generating keyboard control signals and such biaxial displacement signals [BDS]. As another example, a system [900] having a digit-controllable signal-generating device [903], [1903] that includes a thumb joystick [950], [1906] may be utilized for concurrently generating two different biaxial displacement signals: one biaxial displacement signal [BDS] being generated by causing a person's hand [H] to displace the system [900] in two-dimensional directions [x, y] over the working surface [W]; and another biaxial displacement signal being generated by causing the thumb [TD] of the person's hand [H] to control the thumb joystick [950], [1906].

Figure 21:
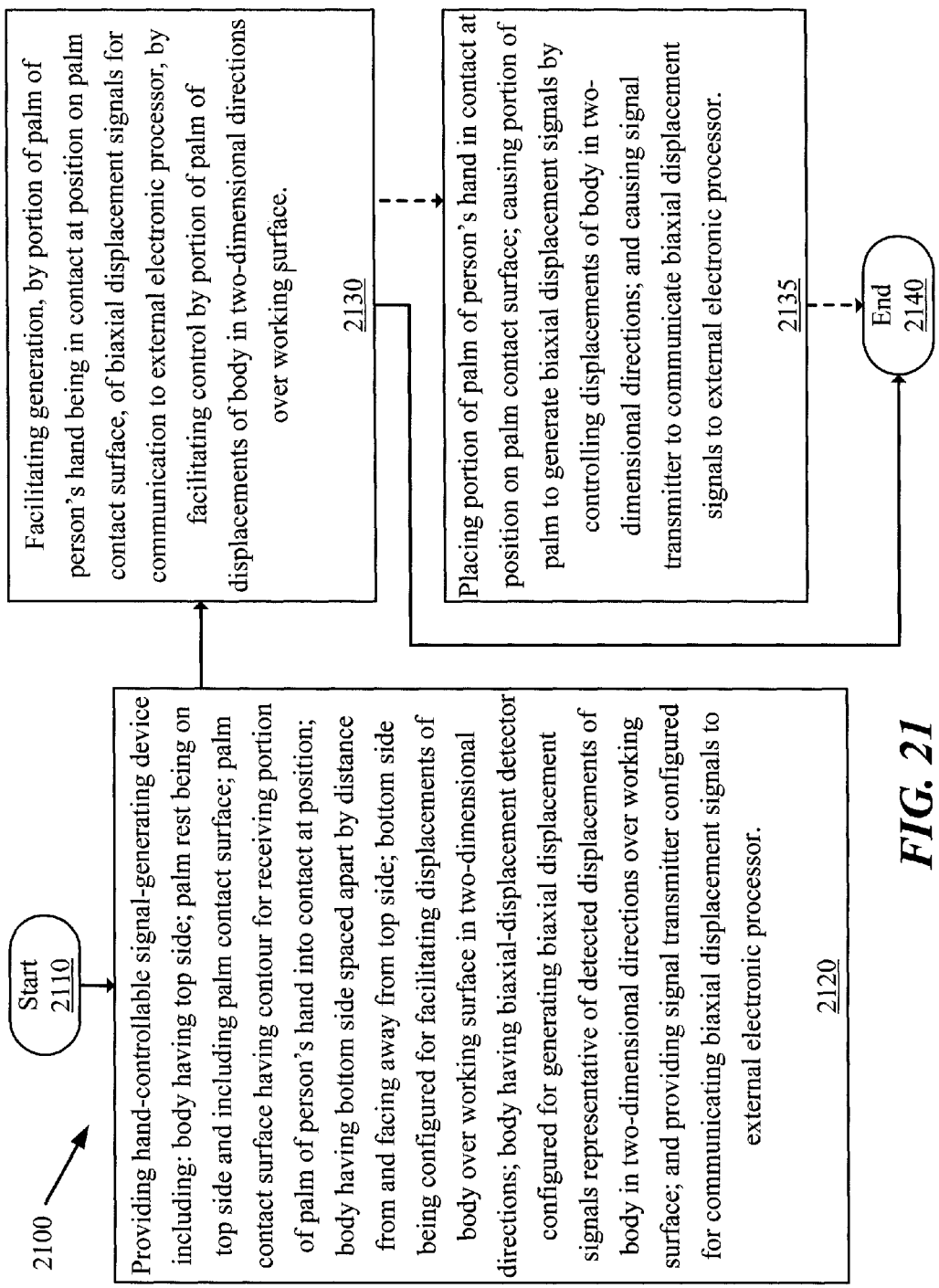
FIG. 21 is a flow chart showing an example of an implementation of a process.
Figure 22:
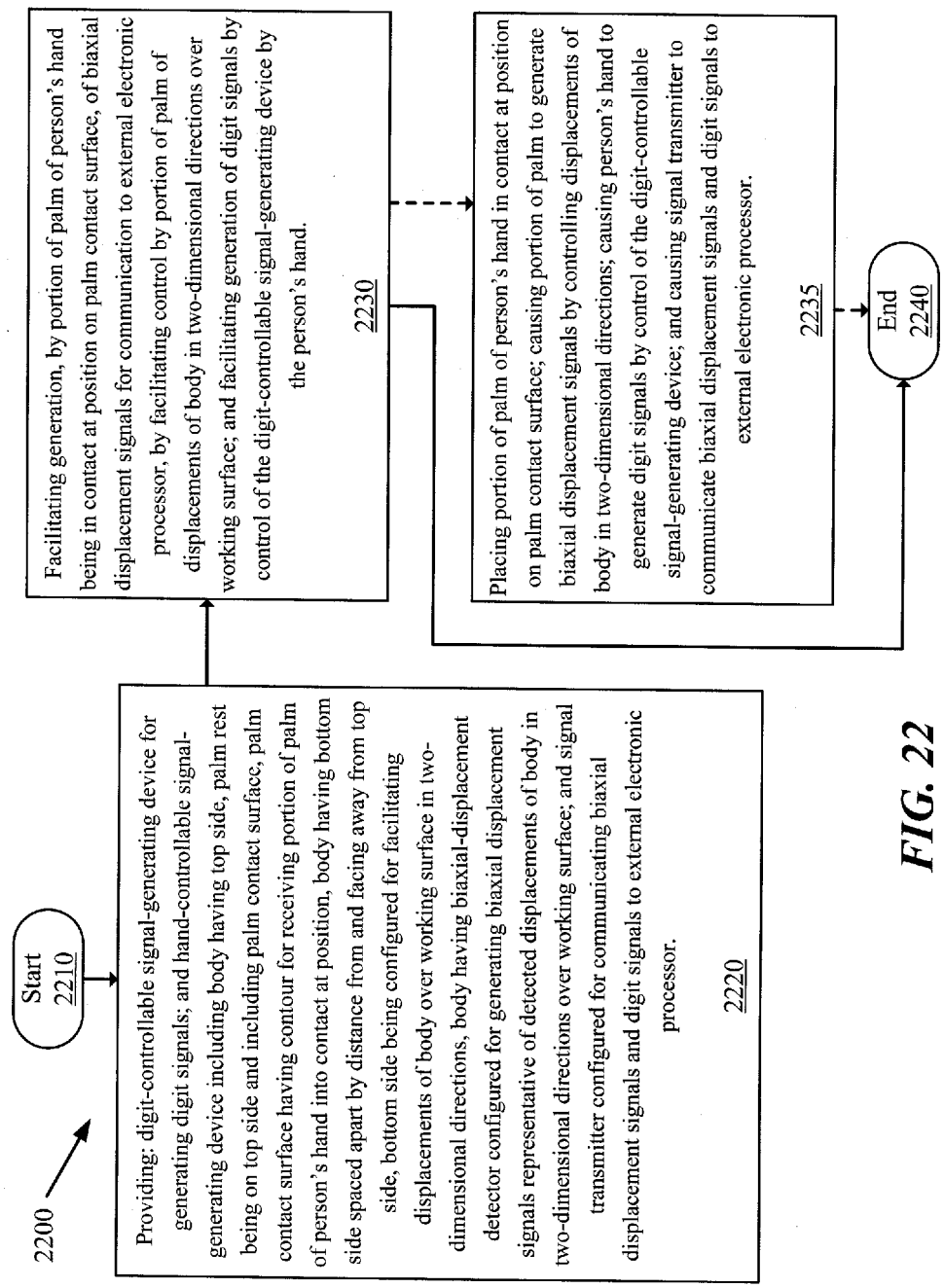
FIG. 22 is a flow chart showing an example of an implementation of another process.

FIGS. 21 and 22 are flow charts respectively showing examples of implementations of processes [2100], [2200]. It is understood throughout this specification that the examples of implementations of the apparatus [100] and of the systems [900], including any of the features or combinations of features that are disclosed in connection with the apparatus [100] or the systems [900], may be utilized in either of the processes [2100], [2200]. Accordingly, FIGS. 1-20 and the entireties of the earlier discussions of the apparatus [100] and the systems [900] are hereby incorporated into the following discussion of the examples of the processes [2100], [2200].

FIG. 21 is a flow chart showing an example of an implementation of a process [2100]. The process [2100] starts at step [2110]. Step [2120] of the process [2100] includes: providing a hand-controllable signal-generating device [101], [901], [1901] including a body [105], [905], [1909] having a top side [110], [910], [1910], a palm rest [130], [930], [1915] being on the top side [110], [910], [1910], the palm rest [130], [930], [1915] including a palm contact surface [135], [935], [1916], the palm contact surface [135], [935], [1916] having a contour for receiving a portion [P1] of a palm [P] of a person's hand [H] into contact at a position [140], [940], [1917] on the palm contact surface [135], [935], [1916], the body [105], [905], [1909] having a bottom side [115], [1005] spaced apart by a distance from and facing away from the top side [110], [910], [1910], the bottom side [115], [1005] being configured for facilitating displacements of the body [105], [905], [1909] over a working surface [W] in two-dimensional directions [x, y], the body [105], [905], [1909] having a biaxial-displacement detector [120], [1010], [1912] that is configured for generating biaxial displacement signals [BDS] that are representative of detected displacements of the body [105], [905], [1909] in the two-dimensional directions [x, y] over the working surface [W]; and providing a signal transmitter [125], [1015], [1913] configured for communicating the biaxial displacement signals [BDS] to an external electronic processor [EP]. The process [2100] further includes, at step [2130]: facilitating the generation, by a portion [P1] of a palm [P] of a person's hand [H] being in contact at the position [140], [940], [1917] on the palm contact surface [135], [935], [1916], of biaxial displacement signals [BDS] for communication to the external electronic processor [EP], by facilitating control by the portion [P1] of the palm [P] of the displacements of the body [105], [905], [1909] in the two-dimensional directions over the working surface [W]. The process [2100] may then end at step [2140]. In examples, the process [2100] may further include, at step [2135]: placing the portion [P1] of the palm [P] of the person's hand [H] in contact at the position [140], [940], [1917] on the palm contact surface [135], [935], [1916]; causing the portion [P1] of the palm [P] to generate biaxial displacement signals [BDS] by controlling displacements of the body [105], [905], [1909] in the two-dimensional directions [x, y]; and causing the signal transmitter [125], [1015], [1913] to communicate the biaxial displacement signals [BDS] to the external electronic processor [EP].

In further examples of the process [2100], the facilitating the generation of the biaxial displacement signals [BDS] at step [2130] may include: facilitating control by the portion [P1] of the palm [P] of the displacements of the body [105], [905], [1909] in the two-dimensional directions [x, y] from the position [140], [940], [1917] on the palm contact surface [135], [935], [1916] without a one digit [D] or any of a plurality of digits [D] of the person's hand [H] being in contact with the hand-controllable signal-generating device [101], [901], [1901]. In additional examples of the process [2100], the facilitating the generation by the portion [P1] of the palm [P] of the biaxial displacement signals [BDS] at step [2130] may include: configuring the palm contact surface [135], [935], [1916] for guiding a one digit [D] or a plurality of digits [D] of the person's hand [H] away from the palm contact surface [135], [935], [1916] simultaneously while receiving the portion [P1] of the palm [P] into contact at the position [140], [940], [1917] on the palm contact surface [135], [935], [1916]. In other examples of the process [2100], the facilitating the generation by the portion [P1] of the palm [P] of the biaxial displacement signals [BDS] at step [2130] may include: configuring the palm contact surface [135], [935], [1916] for positioning a one digit [D] or a plurality of digits [D] of the person's hand [H] as being substantially unencumbered by the palm contact surface [135], [935], [1916] when the portion [P1] of the palm [P] is in contact at the position [140], [940], [1917] on the palm contact surface [135], [935], [1916]. In some examples of the process [2100], the facilitating the generation by the portion [P1] of the palm [P] of the biaxial displacement signals [BDS] at step [2130] may include: configuring the palm contact surface [135], [935], [1916] for receiving the portion [P1] of the palm [P] into contact at a substantially-fixed position [140], [940], [1917] on the palm contact surface [135], [935], [1916]. In further examples of the process [2100], the facilitating the generation by the portion [P1] of the palm [P] of the biaxial displacement signals [BDS] at step [2130] may include: facilitating generation of the biaxial-displacement signals [BDS] as being cursor control signals. In additional examples of the process [2100], the facilitating the generation by the portion [P1] of the palm [P] of the biaxial displacement signals [BDS] at step [2130] may include: facilitating generation of the biaxial-displacement signals [BDS] as being keyboard control signals or joystick control signals. In other examples of the process [2100]: the providing the hand-controllable signal-generating device [101], [901], [1901] at step [2120] may include providing the palm rest [130], [930], [1915] as being mounted on a joystick [155], [1045] that includes an angular-displacement detector [215], [1050]; and the facilitating the generation by the portion [P1] of the palm [P] of the biaxial displacement signals [BDS] at step [2130] may include facilitating generation, by the portion [P1] of the palm [P] being in contact at the position [140], [940], [1917] on the palm contact surface [135], [935], [1916] for communication to the external electronic processor [EP], of angular displacement signals [AS] that are representative of detected angular displacements of the palm rest [130], [930], [1915] over the top side [110], [910], [1910] of the body [105], [905], [1909]. In some examples of the process [2100]: the providing the hand-controllable signal-generating device [101], [901], [1901] at step [2120] may include providing the joystick [155], [1045] as including a compressive force detector [415], [1120]; and the facilitating the generation by the portion [P1] of the palm [P] of the biaxial displacement signals [BDS] at step [2130] may include facilitating the generation, by the portion [P1] of the palm [P] being in contact at the position [140], [940], [1917] on the palm contact surface [135], [935], [1916] for communication to the external electronic processor [EP], of compressive force signals [FS] that are representative of detected compressive forces applied by the palm [P] to the palm rest [130], [930], [1915] towards the top side [110], [910], [1910] of the body [105], [905], [1909]. In additional examples of the process [2100]: the providing the hand-controllable signal-generating device [101], [901], [1901] at step [2120] may include providing a rotational-displacement detector [515], [1405]; and the facilitating the generation by the portion [P1] of the palm [P] of the biaxial displacement signals [BDS] at step [2130] may include facilitating generation, by the portion [P1] of the palm [P] being in contact at the position [140], [940], [1917] on the palm contact surface [135], [935], [1916] for communication to the external electronic processor [EP], of rotational displacement signals [RS] that are representative of detected rotational displacements of the body [105], [905], [1909] in the two-dimensional directions [x, y] over the working surface [W].

FIG. 22 is a flow chart showing an example of an implementation of another process [2200]. The process [2200] starts at step [2210]. Step [2220] of the process [2200] includes providing: a digit-controllable signal-generating device [902], [903] for generating digit signals [DS]; a hand-controllable signal-generating device [101], [901], [1901]; and a signal transmitter [125], [1015]. Step [2220] further includes providing the hand-controllable signal-generating device [101], [901], [1901] as including a body [105], [905], [1909] having a top side [110], [910], [1910], a palm rest [130], [930], [1915] being on the top side [110], [910], [1910], the palm rest [130], [930], [1915] including a palm contact surface [135], [935], [1916], the palm contact surface [135], [935], [1916] having a contour for receiving a portion [P1] of a palm [P] of a person's hand [H] into contact at a position [140], [940], [1917] on the palm contact surface [135], [935], [1916], the body [105], [905], [1909] having a bottom side [115], [1005] spaced apart by a distance from and facing away from the top side [110], [910], [1910], the bottom side [115], [1005] being configured for facilitating displacements of the body [105], [905], [1909] over a working surface [W] in two-dimensional directions [x, y], the body [105], [905], [1909] having a biaxial-displacement detector [120], [1010], [1912] that is configured for generating biaxial displacement signals [BDS] that are representative of detected displacements of the body [105], [905], [1909] in the two-dimensional directions [x, y] over the working surface [W]. Step [2220] additionally includes providing the signal transmitter [125], [1015] as being configured for communicating the biaxial displacement signals [BDS] and the digit signals [DS] to an external electronic processor [EP]. The process [2200] further includes, at step [2230]: facilitating the generation, by a portion [P1] of a palm [P] of a person's hand [H] being in contact at the position [140], [940], [1917] on the palm contact surface [135], [935], [1916], of biaxial displacement signals [BDS] for communication to the external electronic processor [EP], by facilitating control by the portion [P1] of the palm [P] of the displacements of the body [105], [905], [1909] in the two-dimensional directions [x, y] over the working surface [W]; and facilitating the generation of digit signals [DS] by control of the digit-controllable signal-generating device [902], [903] by the person's hand [H]. The process [2200] may then end at step [2240]. In examples, the process [2200] may further include, at step [2235]: placing the portion [P1] of the palm [P] of the person's hand [H] in contact at the position [140], [940], [1917] on the palm contact surface [135], [935], [1916]; causing the portion [P1] of the palm [P] to generate biaxial displacement signals [BDS] by controlling displacements of the body [105], [905], [1909] in the two-dimensional directions [x, y], and causing the person's hand [H] to generate digit signals [DS] by control of the digit-controllable signal-generating device [902], [903]; and causing the signal transmitter [125], [1015] to communicate the biaxial displacement signals [BDS] and the digit signals [DS] to the external electronic processor [EP].

In additional examples of the process [2200]: the providing the digit-controllable signal-generating device [902], [903] at step [2220] may include providing a keyboard [945], [1904] having a plurality of digit-controllable keys

[946], [1905]; and the facilitating the generation of the biaxial displacement signals [BDS] and of the digit signals [DS] at step [2230] may include facilitating the simultaneous generation of the biaxial displacement signals [BDS] by the portion [P1] of the palm [P] and of the digit signals [DS] by the person's hand [H]. In further examples of the process [2200]: the providing the digit-controllable signal-generating device [902], [903] at step [2220] may include providing a thumb-controllable joystick [950], [1903]; and the facilitating the generation of the biaxial displacement signals [BDS] and of the digit signals [DS] at step [2230] may include facilitating the simultaneous generation of the biaxial displacement signals [BDS] by the portion [P1] of the palm [P] and of the digit signals [DS] by the person's hand [H].

In additional examples of the process [2200]: the facilitating the generation by the portion [P1] of the palm [P] of the biaxial displacement signals [BDS] at step [2230] may include facilitating control by the portion [P1] of the palm [P] of the displacements of the body [105], [905], [1909] in the two-dimensional directions [x, y] from the position [140], [940], [1917] on the palm contact surface [135], [935], [1916], without a one digit [D] or any of a plurality of digits [D] of the person's hand [H] being in contact with the hand-controllable signal-generating device [101], [901], [1901]. In other examples of the process [2200]: the facilitating the generation by the portion [P1] of the palm [P] of the biaxial displacement signals [BDS] at step [2230] may include configuring the palm contact surface [135], [935], [1916] for guiding a one digit [D] or a plurality of digits [D] of the person's hand [H] away from the palm contact surface [135], [935], [1916] simultaneously while receiving the portion [P1] of the palm [P] into contact at the position [140], [940], [1917] on the palm contact surface [135], [935], [1916]. In some examples of the process [2200]: the facilitating the generation by the portion [P1] of the palm [P] of the biaxial displacement signals [BDS] at step [2230] may include configuring the palm contact surface [135], [935], [1916] for positioning a one digit [D] or a plurality of digits [D] of the person's hand [H] as being substantially unencumbered by the palm contact surface [135], [935], [1916] when the portion [P1] of the palm [P] is in contact at the position [140], [940], [1917] on the palm contact surface [135], [935], [1916]. In further examples of the process [2200]: the facilitating the generation by the portion [P1] of the palm [P] of the biaxial displacement signals [BDS] at step [2230] may include configuring the palm contact surface [135], [935], [1916] for receiving the portion [P1] of the palm [P] into contact at a substantially-fixed position [140], [940], [1917] on the palm contact surface [135], [935], [1916]. In additional examples of the process [2200]: the facilitating the generation by the portion [P1] of the palm [P] of the biaxial displacement signals [BDS] at step [2230] may include facilitating the generation of the biaxial-displacement signals [BDS] as being cursor control signals. In other examples of the process [2200]: the facilitating the generation by the portion [P1] of the palm [P] of the biaxial displacement signals [BDS] at step [2230] may include facilitating the generation of the biaxial-displacement signals [BDS] as being keyboard control signals or joystick control signals.

In further examples of the process [2200]: the providing the hand-controllable signal-generating device [101], [901], [1901] at step [2220] may include providing the palm rest [130], [930], [1915] as being mounted on a joystick [155], [1055] that includes an angular-displacement detector [215], [1050]; and the facilitating the generation by the portion [P1] of the palm [P] of the biaxial displacement signals [BDS] at step [2230] may include facilitating the generation, by the portion [P1] of the palm [P] being in contact at the position [140], [940], [1917] on the palm contact surface [135], [935], [1916] for communication to the external electronic processor [EP], of angular displacement signals [AS] that are representative of detected angular displacements of the palm rest [130], [930], [1915] over the top side [110], [910], [1910] of the body [105], [905], [1909]. In the further examples of the process [2200]: the providing the hand-controllable signal-generating device [902], [903] at step [2220] may include providing the joystick [155], [1055] as including a compressive force detector [415], [1120]; and the facilitating the generation by the portion [P1] of the palm [P] of the biaxial displacement signals [BDS] at step [2230] may include facilitating the generation, by the portion [P1] of the palm [P] being in contact at the position [140], [940], [1917] on the palm contact surface [135], [935], [1916] for communication to the external electronic processor [EP], of compressive force signals [FS] that are representative of detected compressive forces applied by the palm [P] to the palm rest [130], [930], [1915] towards the top side [110], [910], [1910] of the body [105], [905], [1909].

In other examples of the process [2200]: the providing the hand-controllable signal-generating device [101], [901], [1901] at step [2220] may include providing a rotational-displacement detector [515], [1405]; and the facilitating the generation by the portion [P1] of the palm [P] of the biaxial displacement signals [BDS] at step [2230] may include facilitating the generation, by the portion [P1] of the palm [P] being in contact at the position [140], [940], [1917] on the palm contact surface [135], [935], [1916] for communication to the external electronic processor [EP], of rotational displacement signals [RS] that are representative of detected rotational displacements of the body [105], [905], [1909] in the two-dimensional directions [x, y].

In some examples of the process [2200], step [2220] of the process [2200] may further include providing: another digit-controllable signal-generating device [902], [903] for generating additional digit signals [DS]; another hand-controllable signal-generating device [101], [901], [1901]; and another signal transmitter [125], [1015]. In these examples of the process [2200], step [2220] may include, as an example: providing a hand-controllable signal-generating device [901]; and providing another hand-controllable signal-generating device [1901]. In these examples of the process [2200], step [2220] further includes providing the additional hand-controllable signal-generating device [101], [901], [1901] as including another body [105], [905], [1909] having another top side [110], [910], [1910], another palm rest [130], [930], [1915] being on the another top side [110], [910], [1910], the another palm rest [130], [930], [1915] including another palm contact surface [135], [935], [1916], the another palm contact surface [135], [935], [1916] having another contour for receiving a further portion [P1] of another palm [P] of a person's another hand [H] into contact at another position [140], [940], [1919] on the another palm contact surface [135], [935], [1916], the another body [105], [905], [1909] having another bottom side [115], [1005] spaced apart by another distance from and facing away from the another top side [110], [910], [1910], the another bottom side [115], [1005] being configured for facilitating additional displacements of the another body [105], [905], [1909] over the working surface [W] in the two-dimensional directions [x, y], the another body [105], [905], [1909] having another biaxial-displacement detector [120], [1010], [1912] that is configured for generating additional biaxial displacement signals [BDS] that are representative of detected additional displacements of the another body [105], [905], [1909] in the two-dimensional directions [x, y] over the working surface [W]. In these examples of the process [2200], step [2220] further includes providing the another signal transmitter [125], [1015] as being configured for communicating the additional biaxial displacement signals [BDS] and the additional digit signals [DS] to the external electronic processor [EP]. These examples of the process [2200] further include, at step [2230]: facilitating the generation, by the further portion [P1] of another palm [P] of a person's another hand [H] being in contact at the another position [140], [940], [1917] on the another palm contact surface [135], [935], [1916], of additional biaxial displacement signals [BDS] for communication to the external electronic processor [EP], by facilitating control by the further portion [P1] of the another palm [P] of the additional displacements of the another body [105], [905], [1909] in the two-dimensional directions [x, y] over the working surface [W]; and facilitating the generation of additional digit signals [DS] by control of the another digit-controllable signal-generating device [902], [903] by the person's another hand [H].

While the present invention has been disclosed in a presently defined context, it will be recognized that the present teachings may be adapted to a variety of contexts consistent with this disclosure and the claims that follow. For example, the apparatus, devices and processes shown in the figures and discussed above can be adapted in the spirit of the many optional parameters described.

What is claimed is:

1. An apparatus, comprising:
   a hand-controllable signal-generating device, including:
      a body having a top side, and having a bottom side spaced apart by a distance from and facing away from the top side, the bottom side being configured for facilitating displacements of the body over a working surface in two-dimensional directions with the bottom side facing the working surface, the body having a biaxial-displacement detector that is configured for generating biaxial displacement signals that are representative of detected displacements of the body in the two-dimensional directions over the working surface; and
      a signal transmitter configured for communicating the biaxial displacement signals to an external electronic processor; and
      a joystick on the top side of the body, the joystick including an angular-displacement detector;
   wherein the body has a palm rest being pivotally mounted on the joystick over the top side of the body, the palm rest including a palm contact surface, the palm contact surface having a contour for receiving a portion of a palm of a person's hand into contact at a position on the palm contact surface, the hand having one digit or a plurality of digits;
   wherein the angular-displacement detector is configured for generating angular-displacement signals that are representative of detected angular displacements of the palm rest over the top side of the body, and the signal transmitter is configured for communicating the angular-displacement signals to the external electronic processor;
   and wherein the contour of the palm contact surface of the palm rest is configured for facilitating control by the portion of the palm of the person's hand, being in contact at the position on the palm contact surface, of the displacements of the body in the two-dimensional directions over the working surface without the one digit or any of the plurality of the digits being in contact with the hand-controllable signal-generating device.

2. The apparatus of claim 1, wherein the contour of the palm contact surface of the palm rest is configured for guiding the one digit or the plurality of the digits of the person's hand away from the palm contact surface simultaneously while receiving the portion of the palm of the person's hand into contact at the position on the palm contact surface.

3. The apparatus of claim 1, wherein the contour of the palm contact surface of the palm rest is configured for positioning the one digit or the plurality of the digits of the person's hand as being substantially unencumbered by the palm contact surface when the portion of the palm of the person's hand is in contact at the position on the palm contact surface.

4. The apparatus of claim 1, wherein the contour of the palm contact surface of the palm rest is configured for receiving the portion of the palm of the person's hand into contact at a substantially-fixed position on the palm contact surface.

5. The apparatus of claim 1, wherein: the palm contact surface of the palm rest includes a mound having a peak and downwardly-sloping sides; and wherein the portion of the palm of the person's hand includes a first part of the palm that is nearest to a wrist of the person; and wherein the first part of the palm is received into contact on a first portion of the downwardly-sloping sides of the mound when the portion of the palm is at the position on the palm contact surface; and wherein the first portion of the downwardly-sloping sides of the mound has an attached upwardly-sloping lip.

6. The apparatus of claim 5, wherein: the one digit or the plurality of the digits of the person's hand includes a thumb digit, and includes one non-thumb digit or a plurality of non-thumb digits; and wherein the portion of the palm of the person's hand includes a second part of the palm that is farthest from the person's thumb digit; and wherein the second part of the palm is received into contact on a second portion of the downwardly-sloping sides of the mound when the portion of the palm is at the position on the palm contact surface; and wherein the second portion of the downwardly-sloping sides of the mound has another attached upwardly-sloping lip.

7. The apparatus of claim 6, wherein the palm of the person's hand includes another portion being nearest to the person's thumb digit, and wherein the palm contact surface is shaped for guiding the another portion of the palm away from the palm contact surface simultaneously while receiving the portion of the palm of the person's hand into contact at the position on the palm contact surface.

8. The apparatus of claim 7, wherein the palm of the person's hand includes an additional portion being nearest to the one non-thumb digit or to the plurality of the non-thumb digits of the person's hand, and wherein the palm contact surface is shaped for guiding the additional portion of the palm away from the palm contact surface simultaneously while receiving the portion of the palm of the person's hand into contact at the position on the palm contact surface.

9. The apparatus of claim 1, wherein the joystick includes a compressive force detector being configured for generating compressive force signals that are representative of detected compressive forces applied by the palm of the person's hand to the palm rest towards the top side of the body; and wherein the signal transmitter is configured for communicating the compressive force signals to the external electronic processor.

10. The apparatus of claim 1, further including a rotational-displacement detector being configured for generating rotational displacement signals that are representative of detected rotational displacements of the body in the two-dimensional directions over the working surface, wherein the signal transmitter is configured for communicating the rotational displacement signals to the external electronic processor.

11. A system, comprising:
a digit-controllable signal-generating device for generating digit signals; and
a hand-controllable signal-generating device, including a body having a top side, and having a bottom side spaced apart by a distance from and facing away from the top side, the bottom side being configured for facilitating displacements of the body over a working surface in two-dimensional directions with the bottom side facing the working surface, the body having a biaxial-displacement detector that is configured for generating biaxial displacement signals that are representative of detected displacements of the body in the two-dimensional directions over the working surface; and
a signal transmitter configured for communicating the biaxial displacement signals and the digit signals to an external electronic processor; and
a joystick on the top side of the body, the joystick including an angular-displacement detector;
wherein the body has a palm rest being pivotally mounted on the joystick over the top side of the body, the palm rest including a palm contact surface, the palm contact surface having a contour for receiving a portion of a palm of a person's hand into contact at a position on the palm contact surface, the hand having one digit or a plurality of digits;
wherein the angular-displacement detector is configured for generating angular-displacement signals that are representative of detected angular displacements of the palm rest over the top side of the body, and the signal transmitter is configured for communicating the angular-displacement signals to the external electronic processor; and
wherein the contour of the palm contact surface of the palm rest is configured for facilitating control of the digit-controllable signal-generating device for generating digit signals by the person's hand simultaneously with facilitating control by the portion of the palm of the person's hand, being in contact at the position on the palm contact surface, of the displacements of the body in the two-dimensional directions over the working surface without the one digit or any of the plurality of the digits being in contact with the hand-controllable signal-generating device.

12. The system of claim 11, wherein the digit-controllable signal-generating device includes a keyboard having a plurality of digit-controllable keys.

13. The system of claim 12, wherein the plurality of the digit-controllable keys are arranged in a plurality of rows; and wherein the plurality of the rows of the digit-controllable keys are arranged in a concave arc configured for placing each one of the plurality of the digit-controllable keys in a position suitable for being controlled by the one digit or by a one of the plurality of the digits of the person's hand simultaneously with the portion of the palm of the person's hand being in contact at the position on the palm contact surface.

14. The system of claim 11, further including another joystick, wherein the digit-controllable signal-generating device includes the another joystick, being a thumb-controllable joystick.

15. The system of claim 11, wherein the contour of the palm contact surface of the palm rest is configured for guiding the one digit or the plurality of the digits of the person's hand away from the palm contact surface simultaneously while receiving the portion of the palm of the person's hand into contact at the position on the palm contact surface.

16. The system of claim 11, wherein the contour of the palm contact surface of the palm rest is configured for positioning the one digit or the plurality of the digits of the person's hand as being substantially unencumbered by the palm contact surface when the portion of the palm of the person's hand is in contact at the position on the palm contact surface.

17. The system of claim 11, wherein the contour of the palm contact surface of the palm rest is configured for receiving the portion of the palm of the person's hand into contact at a substantially-fixed position on the palm contact surface.

18. The system of claim 11, wherein: the palm contact surface of the palm rest includes a mound having a peak and downwardly-sloping sides; and the portion of the palm of the person's hand includes a first part of the palm that is nearest to a wrist of the person; and the first part of the palm is received into contact on a first portion of the downwardly-sloping sides of the mound when the portion of the palm is at the position on the palm contact surface; and the first portion of the downwardly-sloping sides of the mound has an attached upwardly-sloping lip.

19. The system of claim 18, wherein: the one digit or the plurality of the digits of the person's hand includes a thumb digit, and includes one non-thumb digit or a plurality of non-thumb digits; and wherein the portion of the palm of the person's hand includes a second part of the palm that is farthest from the person's thumb digit; and wherein the second part of the palm is received into contact on a second portion of the downwardly-sloping sides of the mound when the portion of the palm is at the position on the palm contact surface; and wherein the second portion of the downwardly-sloping sides of the mound has another attached upwardly-sloping lip.

20. The system of claim 19, wherein the palm of the person's hand includes another portion being nearest to the person's thumb digit, and wherein the palm contact surface is shaped for guiding the another portion of the palm away from the palm contact surface simultaneously while receiving the portion of the palm of the person's hand into contact at the position on the palm contact surface.

21. The system of claim 20, wherein the palm of the person's hand includes an additional portion being nearest to the one non-thumb digit or to the plurality of the non-thumb digits of the person's hand, and wherein the palm contact surface is shaped for guiding the additional portion of the palm away from the palm contact surface simultaneously while receiving the portion of the palm of the person's hand into contact at the position on the palm contact surface.

22. The system of claim 11, wherein the joystick includes a compressive force detector being configured for generating compressive force signals that are representative of detected compressive forces applied by the palm of the person's hand to the palm rest towards the top side of the body; and wherein the signal transmitter is configured for communicating the compressive force signals to the external electronic processor.

23. The system of claim 11, further including a rotational-displacement detector being configured for generating rotational displacement signals that are representative of detected rotational displacements of the body in the two-dimensional directions over the working surface, wherein the signal transmitter is configured for communicating the rotational displacement signals to the external electronic processor.

24. A process, comprising:
providing a hand-controllable signal-generating device including a body having a top side, a joystick being on the top side of the body, a palm rest being pivotally mounted on the joystick over the top side, the palm rest including a palm contact surface, the palm contact surface having a contour for receiving a portion of a palm of a person's hand into contact at a position on the palm contact surface, the hand having one digit or a plurality of digits, the body having a bottom side spaced apart by a distance from and facing away from the top side, the bottom side being configured for facilitating displacements of the body over a working surface in two-dimensional directions with the bottom side facing the working surface, the body having a biaxial-displacement detector that is configured for generating biaxial displacement signals that are representative of detected displacements of the body in the two-dimensional directions over the working surface, the joystick having an angular-displacement detector that is configured for generating angular-displacement signals being representative of detected angular displacements of the palm rest over the top side of the body; and
providing a signal transmitter configured for communicating the biaxial displacement signals and the angular-displacement signals to an external electronic processor; and
facilitating the generation, by a portion of a palm of a person's hand being in contact at the position on the palm contact surface, of biaxial displacement signals and angular-displacement signals for communication to the external electronic processor, by facilitating control by the portion of the palm of the displacements of the body in the two-dimensional directions over the working surface without the one digit or any of the plurality of the digits being in contact with the hand-controllable signal-generating device.

25. A process, comprising
providing a digit-controllable signal-generating device for generating digit signals; and
providing a hand-controllable signal-generating device including a body having a top side, a joystick being on the top side of the body, a palm rest being pivotally mounted on the joystick over the top side, the palm rest including a palm contact surface, the palm contact surface having a contour for receiving a portion of a palm of a person's hand into contact at a position on the palm contact surface, the hand having one digit or a plurality of digits, the body having a bottom side spaced apart by a distance from and facing away from the top side, the bottom side being configured for facilitating displacements of the body over a working surface in two-dimensional directions with the bottom side facing the working surface, the body having a biaxial-displacement detector that is configured for generating biaxial displacement signals that are representative of detected displacements of the body in the two-dimensional directions over the working surface, the joystick having an angular-displacement detector that is configured for generating angular-displacement signals being representative of detected angular displacements of the palm rest over the top side of the body; and
providing a signal transmitter configured for communicating the biaxial displacement signals and the digit signals and the angular-displacement signals to an external electronic processor; and
facilitating the generation, by a portion of a palm of a person's hand being in contact at the position on the palm contact surface, of biaxial displacement signals and angular-displacement signals for communication to the external electronic processor, by facilitating control by the portion of the palm of the displacements of the body in the two-dimensional directions over the working surface without the one digit or any of the plurality of the digits being in contact with the hand-controllable signal-generating device; and facilitating the generation of digit signals by control of the digit-controllable signal-generating device by the person's hand.

* * * * *